(12) United States Patent
Sugibayashi

(10) Patent No.: US 11,245,802 B2
(45) Date of Patent: Feb. 8, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Yutaro Sugibayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/540,062

(22) Filed: Aug. 14, 2019

(65) Prior Publication Data
US 2020/0228671 A1  Jul. 16, 2020

(30) Foreign Application Priority Data

Jan. 11, 2019  (JP) .............................. JP2019-003078

(51) Int. Cl.
*H04N 1/00* (2006.01)
(52) U.S. Cl.
CPC ..... *H04N 1/00474* (2013.01); *H04N 1/00411* (2013.01); *H04N 1/00413* (2013.01); *H04N 2201/0094* (2013.01)

(58) Field of Classification Search
CPC ........... H04N 1/00474; H04N 1/00411; H04N 1/00413; H04N 2201/0094
USPC ...... 358/1.13, 1.15, 1.9, 1.18, 448, 452, 453
See application file for complete search history.

(56) References Cited

U.S. PATENT DOCUMENTS

| 2014/0118781 | A1* | 5/2014 | Kobayashi | ............ G06F 3/0486 358/1.15 |
| 2019/0075209 | A1* | 3/2019 | Sheng | ...................... H04N 1/04 |

FOREIGN PATENT DOCUMENTS

| EP | 1089161 A2 * | 4/2001 | ........... H04N 1/0044 |
| JP | 2017021408 | 1/2017 | |

* cited by examiner

*Primary Examiner* — Quang N Vo
(74) *Attorney, Agent, or Firm* — JCIPRNET

(57) ABSTRACT

An information processing apparatus includes a display. The display displays different values set for a first graphic image and a second graphic image in response to detecting a predetermined operation performed on the first graphic image and the second graphic image. Each of the first graphic image and the second graphic image is a graphic image for which at least a value is set by a user.

16 Claims, 36 Drawing Sheets

TO FIG. 36B

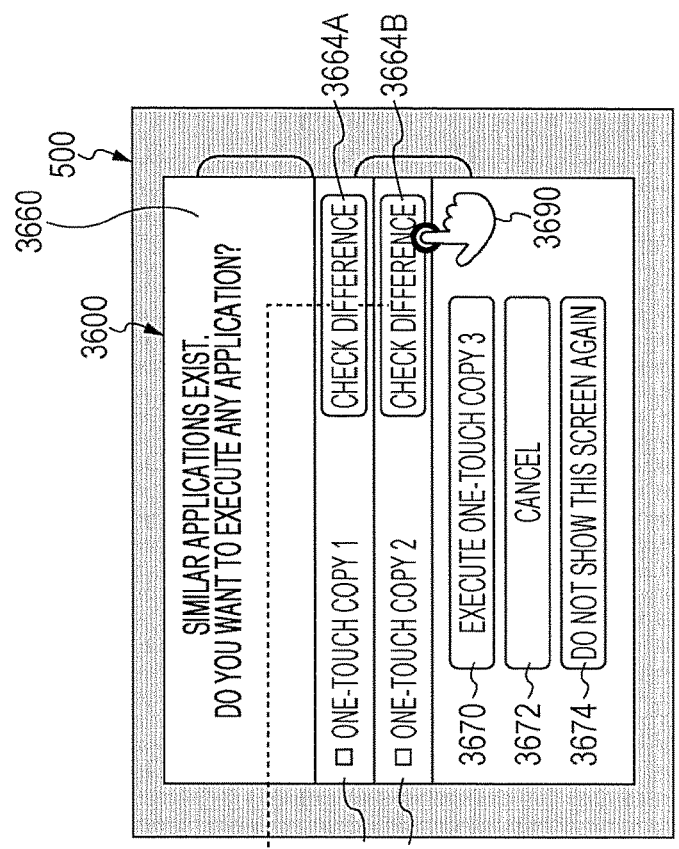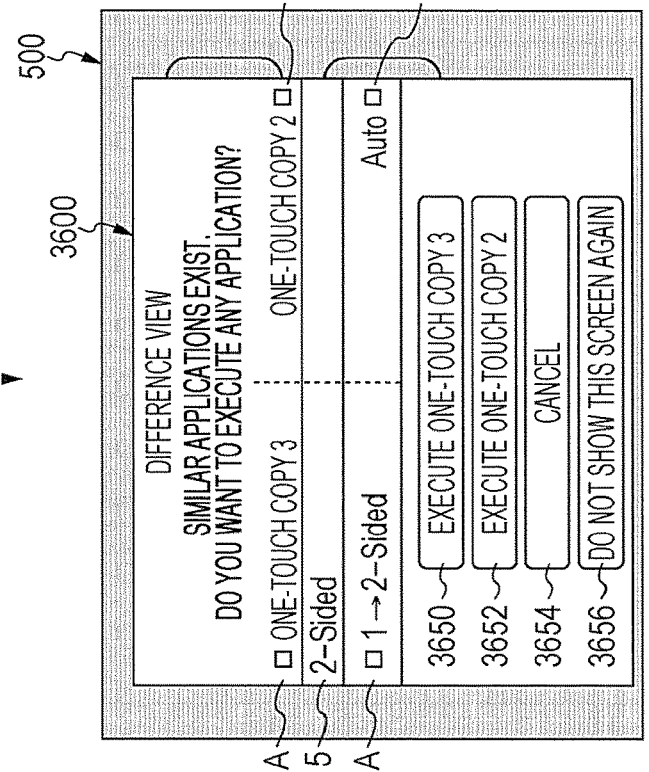

TO FIG. 38B

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-003078 filed Jan. 11, 2019.

BACKGROUND

(i) Technical Field

The present disclosure relates to an information processing apparatus and a non-transitory computer readable medium.

(ii) Related Art

Japanese Unexamined Patent Application Publication No. 2017-021408 discloses an information processing apparatus for generating a display element in accordance with an instruction, even though a function and settings associated with the display element to be generated in accordance with the instruction are the same as a function and settings associated with a display element that has been generated, if both display elements have different operation attributes. In the information processing apparatus, an operation acceptance unit accepts a generation instruction operation for providing an instruction to generate a display element associated with a function of the information processing apparatus and settings for the function, and a designation operation for designating an operation attribute of a display element, which indicates whether the display element is operated by an operator other than a specific operator. In the information processing apparatus, a function button information update unit generates a first display element, which is generated in accordance with the instruction in the generation instruction operation, when a function and settings associated with the first display element are the same as a function and settings associated with a second display element that has been generated and when the first display element has a different operation attribute from the operation attribute of the second display element.

SUMMARY

In the related art, a value is set by a user in advance, and a new graphic image indicating a process performed with the set value is created.

When similar graphic images are created, it may be difficult to identify which of the graphic images corresponds to a set value desired by the user.

Aspects of non-limiting embodiments of the present disclosure relate to an information processing apparatus and a non-transitory computer readable medium that present a difference between a value set for a first graphic image and a value set for a second graphic image to an operator.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including a display. The display displays different values set for a first graphic image and a second graphic image in response to detecting a predetermined operation performed on the first graphic image and the second graphic image. Each of the first graphic image and the second graphic image is a graphic image for which at least a value is set by a user.

BRIEF DESCRIPTION OF THE DRAWINGS

An exemplary embodiment of the present disclosure will be described in detail based on the following figures, wherein:

FIGS. 36A to 36C illustrate an example process according to this exemplary embodiment;

DETAILED DESCRIPTION

The following describes an exemplary embodiment of the present disclosure with reference to the drawings.

Figure 1:
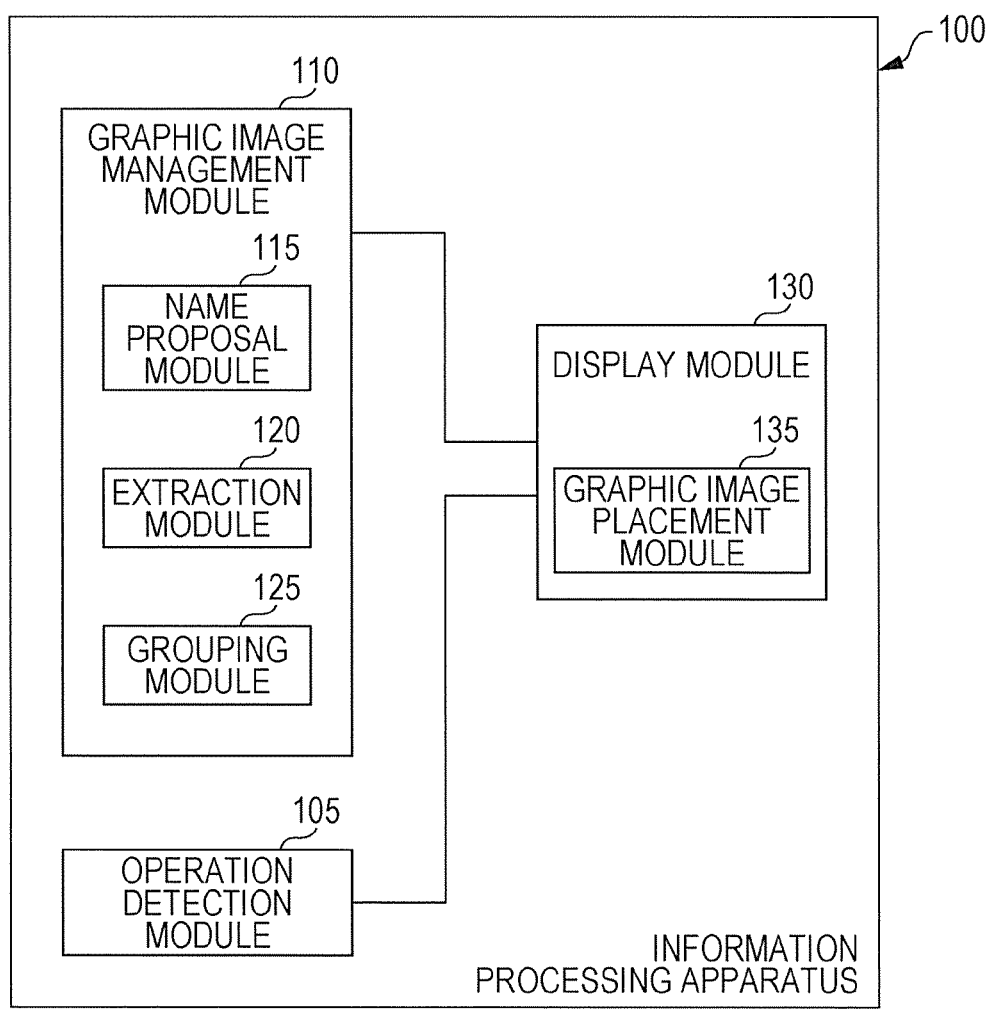
FIG. 1 is a conceptual module configuration diagram illustrating an example configuration according to this exemplary embodiment.

FIG. 1 is a conceptual module configuration diagram illustrating an example configuration of an information processing apparatus according to this exemplary embodiment.

The term "module" generally refers to a logically separable component such as a software (a computer program is included as an interpretation of "software") or hardware component. Thus, each module in this exemplary embodiment refers not only to a module in a computer program but also to a module in a hardware configuration. Accordingly, this exemplary embodiment is also directed to a computer program for causing a computer to function as these modules (e.g., a program for causing the computer to execute the respective procedures, a program for causing the computer to function as the respective means, or a program for causing the computer to implement the respective functions), as well as to a system and a method. While the expressions "store data" and "data is stored" and their equivalent expressions are used for convenience of description, such expressions have a meaning of making a storage device store data or controlling a storage device to store data if an exemplary embodiment is directed to a computer program. While each module may be given a single function, each module may be constituted by a single program or a plurality of modules may be constituted by a single program in actual implementation. Conversely, a single module may be constituted by a plurality of programs. In addition, a plurality of modules may be executed by a single computer, or a single module may be executed by a plurality of computers in a distributed or parallel environment. As an alternative, a single module may include another module. In the following, the term "connection" refers not only to a physical connection but also to a logical connection (such as exchanging of data, sending instructions, a reference relationship between data, and login). The term "predetermined" refers to a state in which certain information is determined before intended processing is to be performed, and is used to include not only a state in which such information is determined at a time point prior to the commencement of processing according to this exemplary embodiment but also a state in which the information is determined at a time point prior to intended processing even after the processing according to this exemplary embodiment has commenced, depending on the condition or the state at that time or depending on the condition or the state until that time. When there is a plurality of "predetermined values", the values may be different or two or more (or all) of the values may be identical. A description having a meaning of "if A, then B" is used to mean: "it is determined whether or not A, and B if it is determined that A" unless the determination of whether or not A is required. Further, when elements are enumerated, such as "A, B, and C", the enumerated elements are examples unless otherwise stated, and the enumeration is used to also include selection of only one of them (e.g., only A).

Furthermore, the term "system", "apparatus", or "device" is used to include a configuration in which a plurality of computers, hardware components, apparatuses, devices, or other suitable elements are connected to each other via a communication means such as a network (including one-to-one communication connections), and what is implemented by a single computer, hardware component, apparatus, device, or suitable element. The terms "apparatus", "device", and "system" are used synonymously. It is to be understood that the term "system" does not include what is merely a social "mechanism" (social system), which is a kind of artificial arrangement.

Moreover, target information is read from a storage device for each processing operation that is to be performed by an individual module or, if a plurality of processing operations are to be performed within a module, for each of the plurality of processing operations. After the processing is performed, the result of the processing is written to the storage device. Thus, the reading of information from the storage device before the processing of the information is to be performed and the writing of information to the storage device after the processing of the information has been performed will not be described in some cases. Examples of the storage device used here may include a hard disk, a random access memory (RAM), an external storage medium, a storage device connected via a communication line, and a register within a central processing unit (CPU).

An information processing apparatus 100 according to this exemplary embodiment has a function of displaying a graphic image. As in an example illustrated in FIG. 1, the information processing apparatus 100 includes an operation detection module 105, a graphic image management module 110, and a display module 130.

The term "graphic image", as used herein, refers to a graphic representation of a process, a picture, a symbol, or the like, and a graphic image is generally termed an icon. In the following, specific examples will be described using icons.

The operation detection module 105 is connected to the display module 130. The operation detection module 105 detects an operation performed by an operator. For example, the operation detection module 105 controls a display device serving also as a touch panel to detect a user's operation. The user's operation is an operation performed on the touch panel by the user with their finger or a pen. Any other operation performed by the user with a device such as a mouse, a keyboard, a camera, or a microphone may be detected. Specific examples of the operation performed by the user may include the user's line of sight, gesture, and speech.

The display module 130 includes a graphic image placement module 135 and is connected to the operation detection module 105 and the graphic image management module 110. The display module 130 displays different values set for a first graphic image and a second graphic image, each of which is a graphic image for which at least a value is set by a user, upon detection of a predetermined operation performed on the first graphic image and the second graphic image.

It is desirable that one of the first graphic image and the second graphic image have set therefor values by a user. For example, one of the first graphic image and the second graphic image may be a "graphic image for which no value is set by a user". The "graphic image for which no value is set by a user" may be a graphic image prepared in advance by the information processing apparatus 100. Specific examples of the "graphic image for which no value is set by a user" include a default graphic image such as a copy icon when the information processing apparatus 100 is an image processing apparatus 200 described below.

It should be noted that each of the first graphic image and the second graphic image may have set therefor values by a user. The "user who has set the values for the first graphic image" and the "user who has set the values for the second graphic image" may be the same or different.

The values may be set by an operating user (i.e., an operator who is viewing the first graphic image or the like) or by any other person. In particular, when the values are set by any other person, in many cases, the operating user does not know which values have been set for the two graphic images and may thus desire to display the set values for comparison.

The set values are values necessary to execute a function and are generally termed parameters. The set values are hereinafter also referred to as parameters.

Examples of the graphic image for which values have been set by a user include an icon indicating a one-touch application. The one-touch application refers to a function of saving setting parameters for executing a service in association with an icon so that a job based on the saved setting parameters can be executed using a few steps, or refers to the service to be executed. Specific examples of the one-touch application include a copy icon for which a predetermined scale factor is set in the case of the image processing apparatus 200 described below. When the copy icon is selected, a copying operation with the set scale factor is performed without setting a scale factor. Examples of the predetermined scale factor include a commonly used scale factor, such as 71%.

Examples of displaying different values set for the first graphic image and the second graphic image include:

displaying information concerning a set value for the first graphic image and information concerning a set value for the second graphic image on the same window;

displaying the name of a single item indicating a set value for the first graphic image and a set value for the second graphic image, and further displaying set values related to the name of the item in parallel; and simultaneously displaying information concerning a set value for the first graphic image and information concerning a set value for the second graphic image.

The set values may be displayed in such a manner that set values for a reference graphic image are displayed on the left side and set values for a graphic image to be compared with the reference graphic image are displayed on the right side. The set values may be interchanged in position. Alternatively, the set values for the reference graphic image may be displayed on the upper side, and the set values for the graphic image to be compared with the reference graphic image may be displayed on the lower side. The set values may be interchanged in position.

As an alternative display pattern, the positions of the graphic images on a screen may be reflected. For example, set values for a graphic image that is relatively positioned to the left on the screen may be displayed on the left side, and set values for a graphic image that is relatively positioned to the right on the screen may be displayed on the right side.

Alternatively, the set values may be displayed in a pop-up fashion or displayed in separate areas.

The "predetermined operation" may be an operation of selecting the second graphic image while an operation is being performed on the first graphic image.

The "predetermined operation" may include:

an operation that is performed on a graphic image and that is different from an operation of checking a set value for the graphic image, the operation being at least different from an operation of displaying the attribute, or property, of the graphic image; and an operation that is performed on the first graphic image and an operation that is performed on the second graphic image and that is different from the operation performed on the first graphic image.

More specifically, the predetermined operation may be either (1) an operation of selecting the first graphic image and the second graphic image, or (2) an operation of moving the first graphic image to overlay the first graphic image on top of the second graphic image.

A specific example of the operation (1) is an operation of selecting the second graphic image while selecting the first graphic image. In this specific example, the operation to be performed on the first graphic image is an "operation of, while selecting the first graphic image, selecting any other graphic image", and the operation to be performed on the second graphic image is an "operation of selecting the second graphic image". That is, different operations are performed on the first graphic image and the second graphic image.

A specific example of the operation (2) is an operation of copying the first graphic image onto the second graphic image. In this specific example, the operation to be performed on the first graphic image is an "operation of, while selecting the first graphic image, moving the first graphic image". The second graphic image is the destination to which the first graphic image is moved, and undergoes an "operation of selecting the second graphic image on which the first graphic image is superimposed". That is, different operations are performed on the first graphic image and the second graphic image.

The display module 130 may display a set value associated with the first graphic image and a set value associated with the second graphic image in a comparable way on condition that a function set for the first graphic image and a function set for the second graphic image are in the same category.

The term "functions in the same category" is used to indicate that functions set for graphic images are classified in the same group or are of the same type. For example, when the information processing apparatus 100 is the image processing apparatus 200 described below, functions in the same category of the image processing apparatus 200 refer to functions implementing the same fundamental operation such as copying, printing, reading (or scanning), or facsimile transmission. For example, copying with 141% enlargement and copying with 70% reduction are in the same category, and copying with 141% enlargement and scanning with 70% reduction are in different categories.

When the set value associated with the first graphic image and the set value associated with the second graphic image are identical, the display module 130 may not display the set value associated with the first graphic image and the set value associated with the second graphic image.

Upon detection of selection of the first graphic image, the graphic image placement module 135 places a graphic image in the same category as the category of the first graphic image near the first graphic image.

The "selection of the first graphic image" may be, for example, the selection of a single graphic image by performing an operation different from an operation of selecting a graphic image. Specific examples of the "operation different from an operation of selecting a graphic image" include "pressing and holding" the graphic image.

After the graphic image placement module 135 places a graphic image in the same category as the category of the first graphic image near the first graphic image, if the selection of the first graphic image is canceled without performing any operation on the placed graphic image, the original state before the graphic image placement module 135 places the graphic image may be restored.

Alternatively, upon detection of selection of the first graphic image, the display module 130 may display only a graphic image or images in the same category as the category of the first graphic image. This display process is referred to as display process A.

The "selection of the first graphic image" may be, for example, the selection of the first graphic image by pressing and holding the first graphic image.

After the display module 130 performs the display process A, if the selection of the first graphic image is canceled without performing any operation on the graphic image or images other than the first graphic image, the original state before the display process A may be restored.

Alternatively, upon detection of selection of the first graphic image, the display module 130 may hide a graphic image or images in any different category from the category of the first graphic image. This display process is referred to as display process B.

The "selection of the first graphic image" may be, for example, the selection of the first graphic image by pressing and holding the first graphic image.

After the display module 130 performs the display process B, if the selection of the first graphic image is canceled without performing any operation on the graphic image or images other than the first graphic image, the original state before the display process B may be restored.

Alternatively, upon detection of selection of the first graphic image, the display module 130 may display the number of values set for a graphic image other than the first graphic image, which are different from the values set for the first graphic image, on top of or near the graphic image other than the first graphic image.

The "selection of the first graphic image" may be, for example, the selection of the first graphic image by pressing and holding the first graphic image.

Examples of the term "being displayed on top of a graphic image" include being superimposed on the graphic image. Specific examples include being displayed as a badge.

Additionally, the display module 130 may rearrange and display graphic images other than the first graphic image in ascending order from the smallest to the largest number of different set values.

Alternatively, upon detection of selection of the first graphic image, the display module 130 may display a graphic image for which the number of set values different from values set for the first graphic image is greater than a predetermined number and a graphic image for which the number of set values different from the values set for the first graphic image is less than or equal to the predetermined number in different styles, or display a graphic image for which the number of set values different from values set for the first graphic image is greater than or equal to the predetermined number and a graphic image for which the number of set values different from the values set for the first graphic image is less than the predetermined number in different styles.

The "selection of the first graphic image" may be, for example, the selection of the first graphic image by pressing and holding the first graphic image.

As a specific example, a graphic image for which the number of set values different from values set for the first graphic image is greater than or equal to a predetermined number may be hidden, and a graphic image for which the number of different set values is less than the predetermined number may be displayed. A graphic image for which the number of set values different from values set for the first graphic image is greater than or equal to a predetermined number may be displayed in a lighter shade, and a graphic image for which the number of different set values is less than the predetermined number may be displayed with the shade unchanged.

The graphic image management module 110 includes a name proposal module 115, an extraction module 120, and a grouping module 125, and is connected to the display module 130. The graphic image management module 110 manages graphic images to be displayed by the information processing apparatus 100. For example, each graphic image is stored in association with values set for the graphic image, the name of the graphic image, and so on.

The name proposal module 115 proposes the name of the first graphic image or the second graphic image.

For example, the name proposal module 115 proposes different names of the values set for the first graphic image and the second graphic image or different names including the values set for the first graphic image and the second graphic image.

In particular, the first graphic image may be configured such that, when selected, the function associated with the first graphic image is executed immediately.

The extraction module 120 extracts a graphic image for which the number of set values different from values set for the first graphic image is less than or equal to or less than a predetermined number.

When the first graphic image is selected, the display module 130 may display a set value associated with the first graphic image and a set value associated with the graphic image extracted by the extraction module 120 in a comparable way before the function associated with the first graphic image is executed.

The extraction module 120 may extract a graphic image associated with a function in the same category as the category of the function set for the first graphic image.

The grouping module 125 groups the first graphic image and the graphic image extracted by the extraction module 120 into a single group.

The term "grouping", as used herein, refers to collecting locations where a plurality of graphic images are placed or collecting a plurality of graphic images. Specifically, the term "grouping" is used to indicate that a plurality of graphic images are stored in a folder or that a plurality of graphic images are converted into a single graphic image and, when the single graphic image is selected, only different set values are selected. In a specific operation of "storing a plurality of graphic images in a folder", the plurality of graphic images may be placed in the same position. In a specific operation of "converting a plurality of graphic images into a single graphic image and selecting only different set values when the single graphic image is selected", when the single graphic image is selected, different parameters of the individual graphic images may be collectively selected. In the grouping process, a condition, such as that graphic images in the same category are grouped, may be set.

Figure 2A:
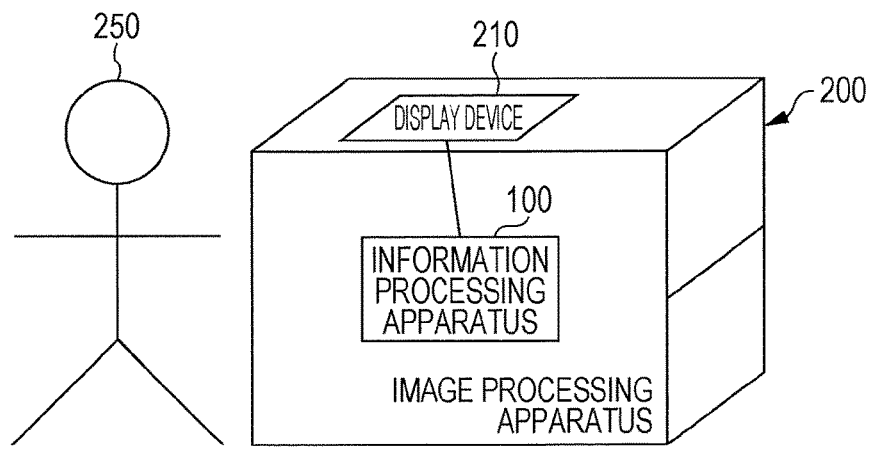
FIGS. 2A and 2B illustrate an example configuration of systems according to this exemplary embodiment.
Figure 2B:
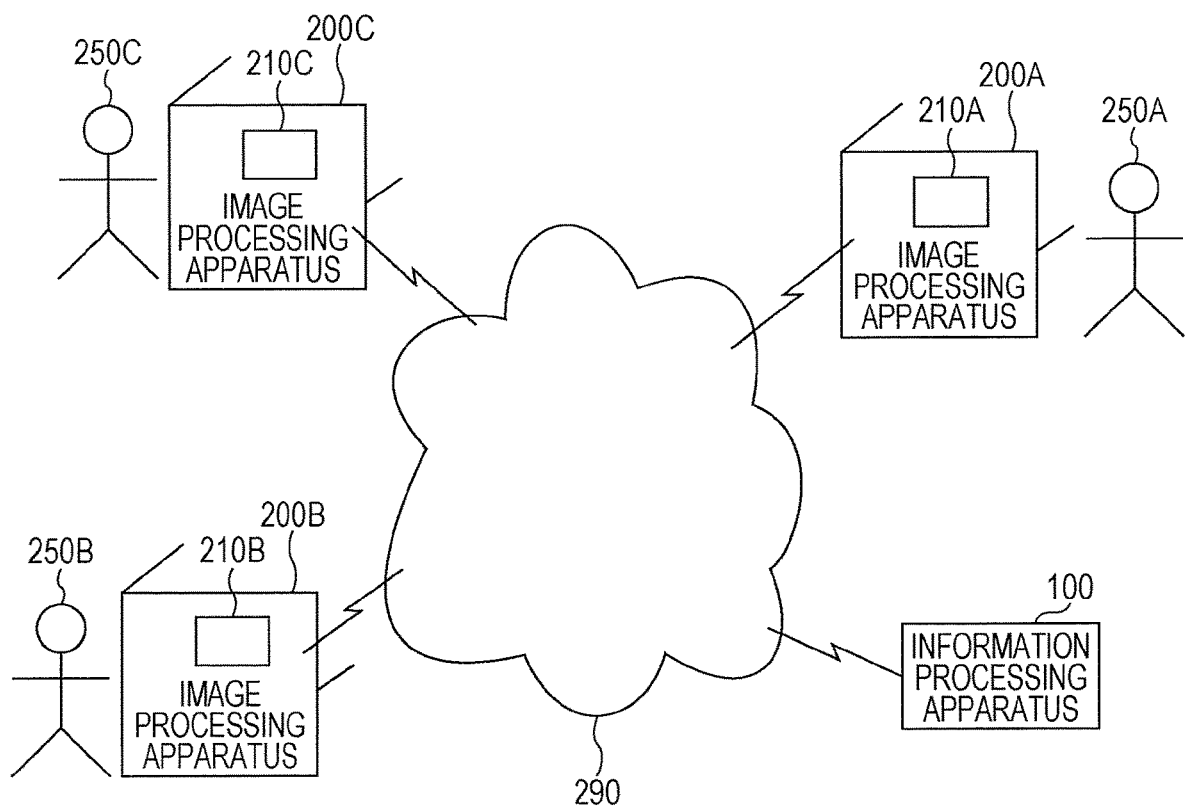

FIGS. 2A and 2B illustrate an example configuration of systems according to this exemplary embodiment.

FIG. 2A illustrates an example configuration of a stand-alone system in which the information processing apparatus 100 is incorporated in an image processing apparatus 200. Examples of the image processing apparatus 200 include a copying machine, a facsimile machine, a scanner, a printer, and a multifunction peripheral. The multifunction peripheral is an image processing apparatus having functions of two or more of devices such as a scanner, a printer, a copying machine, and a facsimile machine.

The image processing apparatus 200 includes the information processing apparatus 100 and a display device 210. Examples of the display device 210 include a liquid crystal display and an organic electroluminescent (EL) display, each of which also functions as a touch panel. A user 250 performs an operation on the display device 210 and uses the image processing apparatus 200 to perform processing. In accordance with the operation of the user 250, the display of graphic images on the display device 210 is controlled.

FIG. 2B illustrates an example configuration of a network system in which the information processing apparatus 100 and image processing apparatuses 200A to 200C are connected via a communication network 290. The image processing apparatuses 200A to 200C include display devices 210A to 210C, respectively. The communication network 290 may be a wireless network, a wired network, or a combination thereof. Examples of the communication network 290 may include the Internet as a communication infrastructure, and an intranet. The function of the information processing apparatus 100 may be implemented as a cloud service.

The information processing apparatus 100 receives operations performed on the image processing apparatuses 200A to 200C by users 250A to 250C, respectively, and controls the display devices 210A to 210C of the image processing apparatuses 200A to 200C to display graphic images. In the following description, the image processing apparatuses 200A to 200C, the display devices 210A to 210C, and the users 250A to 250C are collectively referred to as the image processing apparatus 200, the display device 210, and the user 250, respectively.

Figure 3:
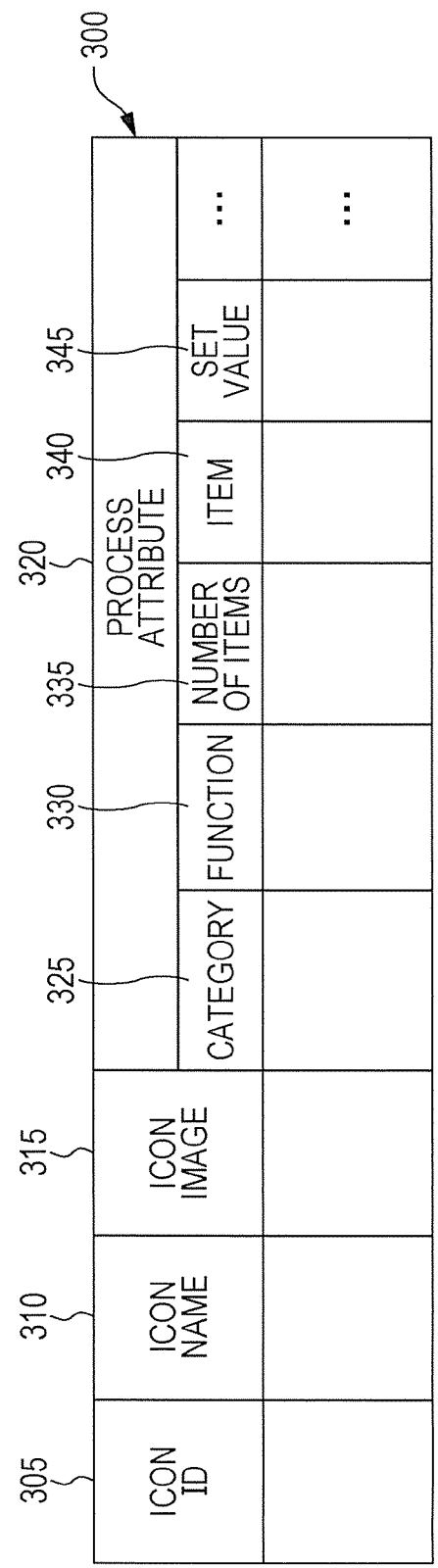
FIG. 3 illustrates an example data structure of an icon management table.

The following describes a specific example of graphic images using icons. FIG. 3 illustrates an example data structure of an icon management table 300. The icon management table 300 has an icon ID column 305, an icon name column 310, an icon image column 315, and a process attribute column 320, and the process attribute column 320 has a category column 325, a function column 330, a number-of-items column 335, an item column 340, and a set value column 345. In this exemplary embodiment, the icon ID column 305 stores information for uniquely identifying each icon. Examples of the information include the identification (ID) of the icon. The icon name column 310 stores the name of the icon. The icon image column 315 stores the image of the icon. The image of the icon is specifically an image displayed on the display device 210. The process attribute column 320 stores the process attribute of the icon. The process attribute include the following elements. The category column 325 stores the category of a function associated with the icon. The function column 330 stores the function associated with the icon. The number-of-items column 335 stores the number of items that can be set for the icon. The process attribute include a number of sets, each including the item column 340 and the set value column 345, the number of sets being equal to the value stored in the number-of-items column 335. The item column 340 stores an item that can be set for the icon. The set value column 345 stores a set value for the item. The icon management table 300 is managed by the graphic image management module 110.

Figure 4:
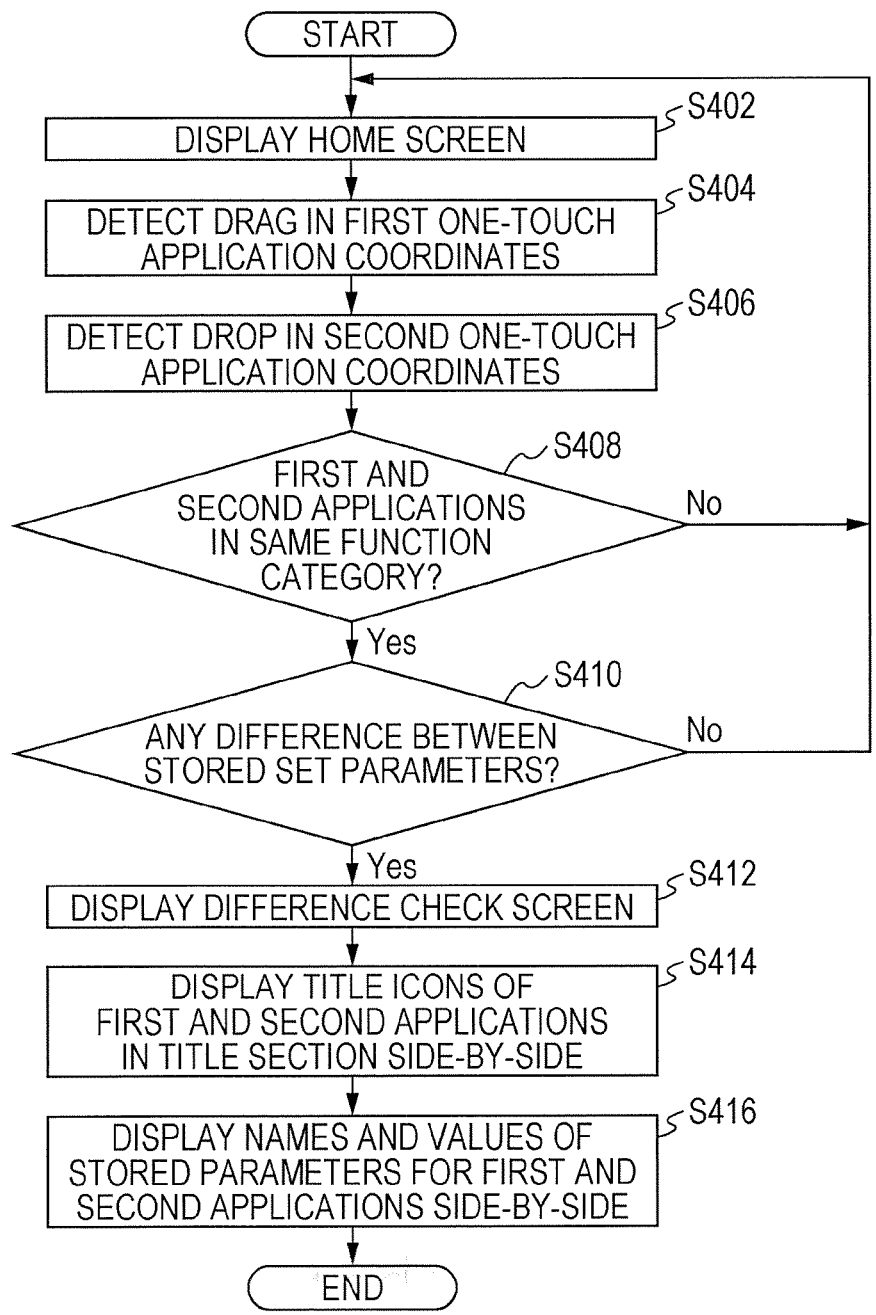
FIG. 4 is a flowchart illustrating an example process according to this exemplary embodiment.

FIG. 4 is a flowchart illustrating an example process according to this exemplary embodiment.

Figure 5:
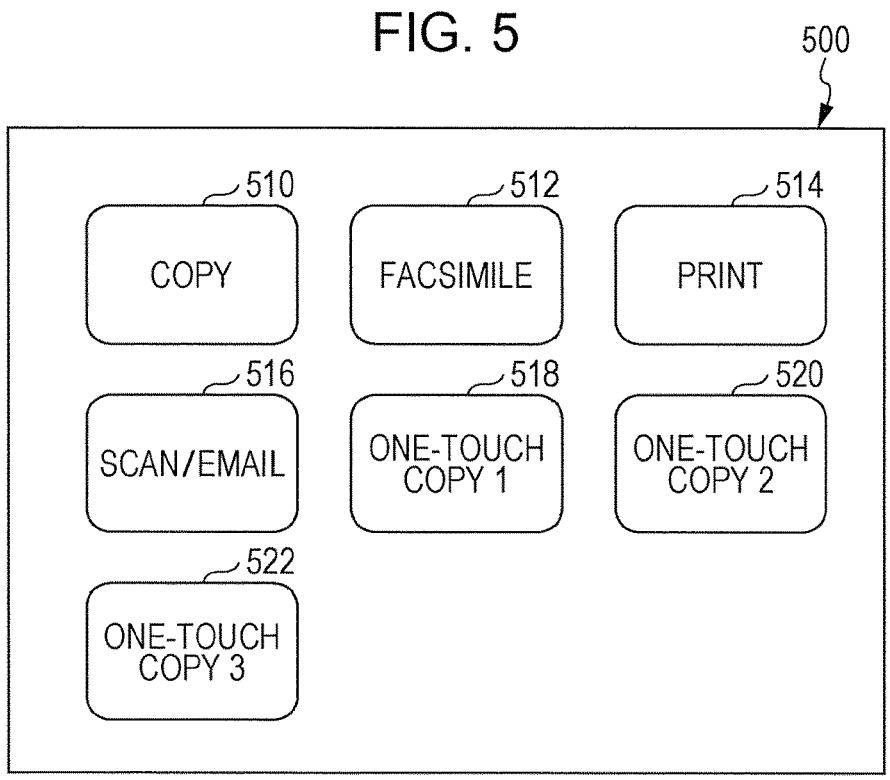
FIG. 5 illustrates an example process according to this exemplary embodiment.

In step S402, a home screen is displayed. An example display on the display device 210 of the image processing apparatus 200 described above will be described with reference to FIG. 5. FIG. 5 illustrates an example process according to this exemplary embodiment. For example, in the initial state, a screen 500 shows a copy button 510, a facsimile transmission button (hereinafter referred to as "facsimile button") 512, a print button 514, a scan/email button 516, a one-touch copy 1 button 518, a one-touch copy 2 button 520, and a one-touch copy 3 button 522. The copy button 510, the facsimile button 512, the print button 514, and the scan/email button 516 are each associated with a basic function of the image processing apparatus 200. When each of the copy button 510, the facsimile button 512, the print button 514, and the scan/email button 516 is selected, values need to be set before the process associated with the selected button is performed. In contrast, the one-touch copy 1 button 518, the one-touch copy 2 button 520, and the one-touch copy 3 button 522 are associated with a copy function and are each a specific example of a function that is executed immediately when the corresponding button is selected. For example, the one-touch copy 1 button 518 has set therefor a scale factor of 71%. When the one-touch copy 1 button 518 is selected, reduced copying with 71% is performed immediately. The selection for executing a function is to press the one-touch copy 1 button 518 by the user with their finger or a pen and then release the finger or pen from the pressed one-touch copy 1 button 518. That is, when the one-touch copy 1 button 518 is pressed by the user with their finger or a pen and is then dragged, the function associated with the one-touch copy 1 button 518 is not executed.

Figure 6:
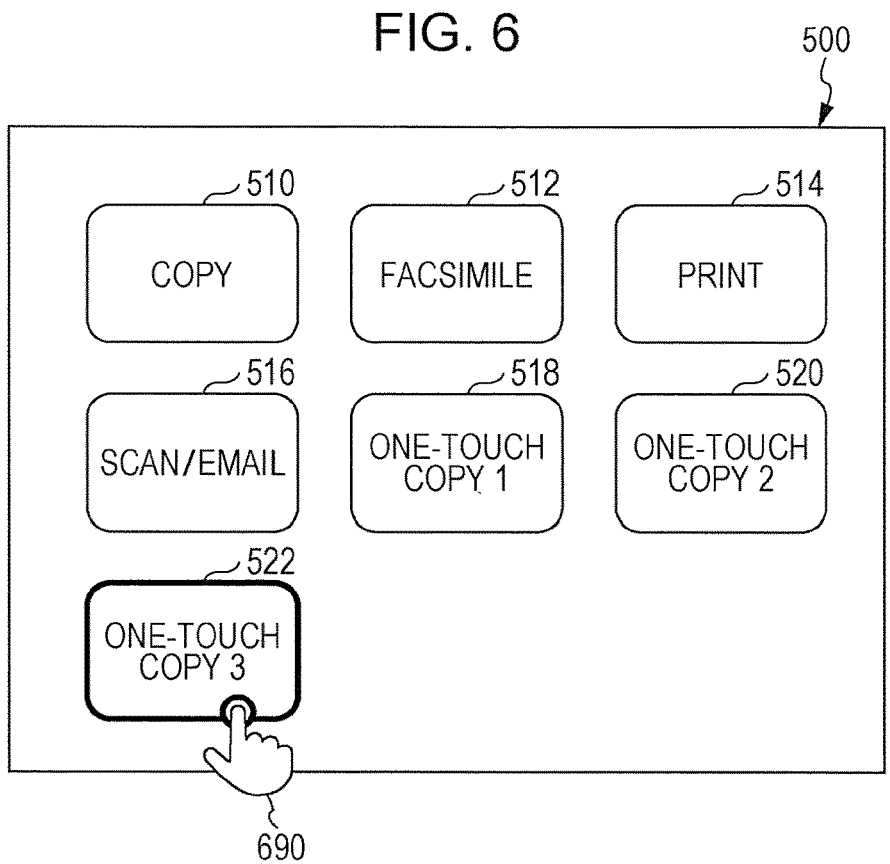
FIG. 6 illustrates the example process according to this exemplary embodiment.

In step S404, a drag is detected in the coordinates of a first one-touch application. This operation will be described with reference to an example illustrated in FIG. 6. For example, a press of the one-touch copy 3 button 522 by the user with an operating finger 690 is detected, and then a drag of the one-touch copy 3 button 522 is detected. More specifically, a press and hold of the one-touch copy 3 button 522 is detected, and then a drag of the one-touch copy 3 button 522 is detected. The appearance of the one-touch copy 3 button 522 may be changed to allow the user to identify the one-touch copy 3 button 522 as an object to be moved. For example, the perimeter of the one-touch copy 3 button 522 may be represented by a thicker line.

Figure 7:
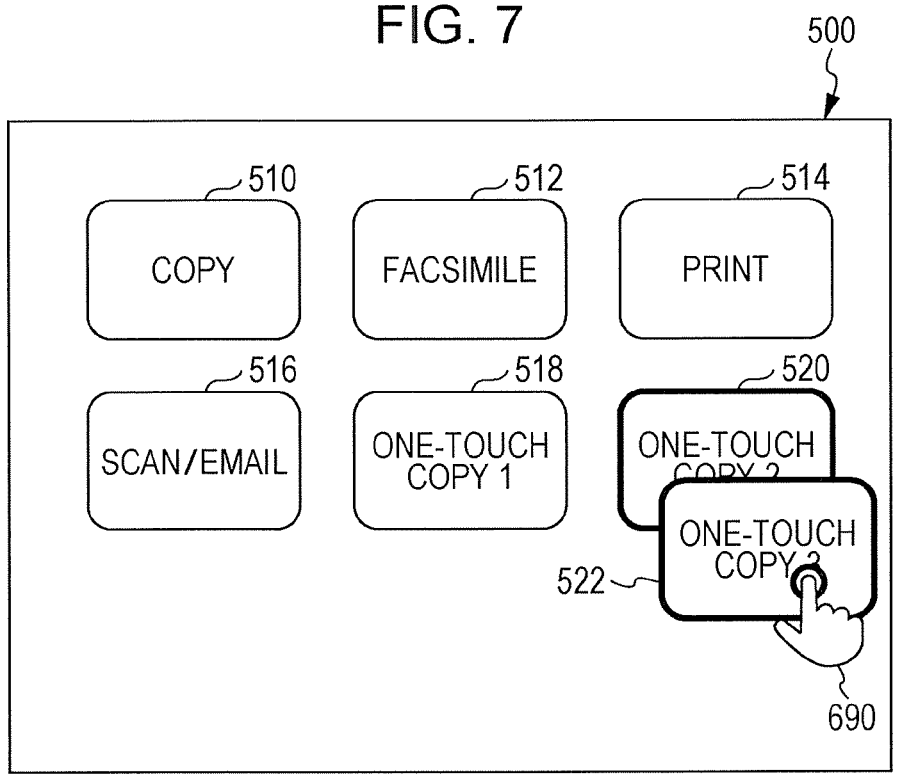
FIG. 7 illustrates the example process according to this exemplary embodiment.

In step S406, a drop is detected in the coordinates of a second one-touch application. This operation will be described with reference to an example illustrated in FIG. 7. For example, the user is assumed to be unable to distinguish between the one-touch copy 3 button 522 and the one-touch copy 2 button 520. Thus, the user drags and drops the one-touch copy 3 button 522 onto the one-touch copy 2 button 520. Specifically, a movement of the one-touch copy 3 button 522 and an operation of releasing the operating finger 690 when the one-touch copy 3 button 522 is overlaid on top of the one-touch copy 2 button 520 are detected. The appearance of the one-touch copy 2 button 520 may be changed to allow the user to identify the one-touch copy 2 button 520 as a comparison target. For example, like the one-touch copy 3 button 522, the perimeter of the one-touch copy 2 button 520 may be represented by a thicker line.

In step S408, it is determined whether the first and second applications are in the same function category. If both applications are in the same function category, the process proceeds to step S410. Otherwise, the process returns to step S402. In the example illustrated in FIG. 7, the category columns 325 of the icon management table 300 for the one-touch copy 3 button 522 and the one-touch copy 2 button 520 are referred to, and the one-touch copy 3 button 522 and the one-touch copy 2 button 520 are in the same category, or copy. Thus, the process proceeds to step S410.

In step S410, it is determined whether there is any difference between stored set parameters. If there is a difference, the process proceeds to step S412. Otherwise, the process returns to step S402.

In step S412, a difference check screen is displayed.

The applications to be compared are displayed in a comparable way so as to identify a difference between the names of the applications and a difference between the set values for the applications. For example, the applications may be displayed horizontally side-by-side or displayed vertically from top to bottom. Alternatively, the display of different set values and the display of all the set values including a common set value may be switched. In the display of all the set values, the different values may be highlighted.

In step S414, the title icons of the first and second applications are displayed in a title section side-by-side.

In step S416, the names and values of the stored parameters for the first and second applications are displayed side-by-side.

The processing of steps S412 to S416 will be described with reference to an example illustrated in FIG. 8.

Figure 8:
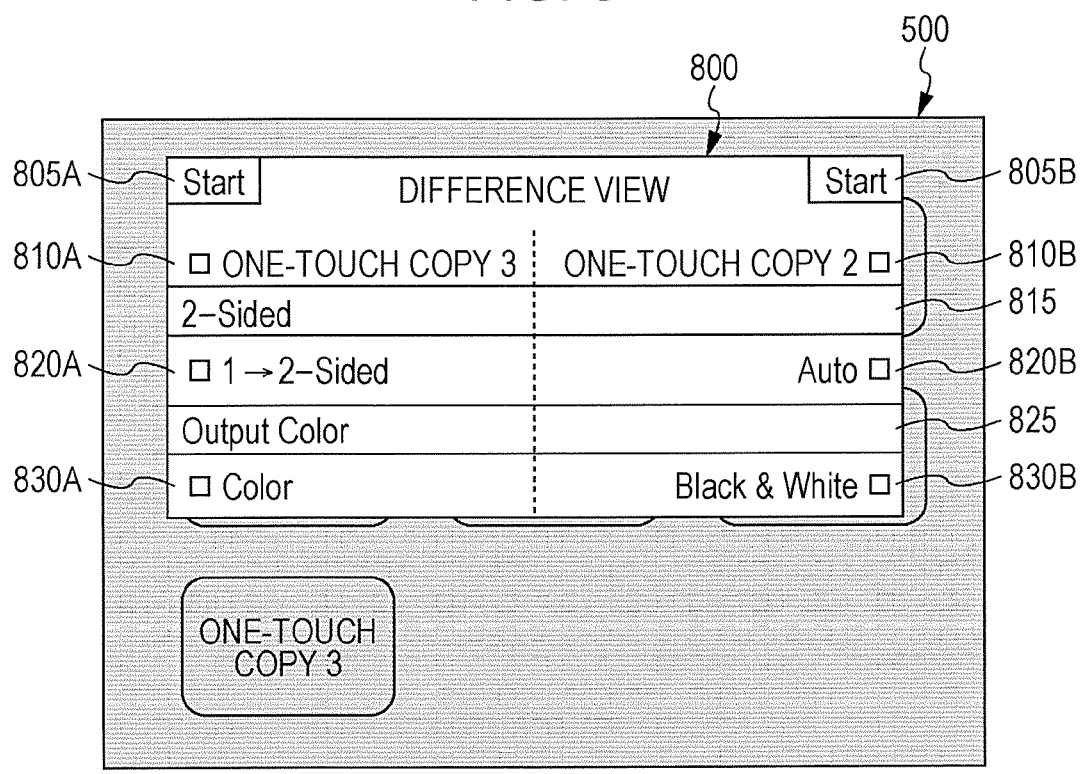
FIG. 8 illustrates the example process according to this exemplary embodiment.

In the example illustrated in FIG. 8, the screen 500 shows a difference view region 800. The difference view region 800 shows a start button 805A for starting the function of the one-touch copy 3 button 522, a start button 805B for starting the function of the one-touch copy 2 button 520, an icon A name display area 810A, an icon B name display area 810B, a duplex setting item display area 815, a duplex set value display area 820A, a duplex set value display area 820B, an output color item display area 825, an output-color set value display area 830A, and an output-color set value display area 830B. The start button 805A and the start button 805B are displayed horizontally side-by-side as a pair, the icon A name display area 810A and the icon B name display area 810B are displayed horizontally side-by-side as a pair, the duplex set value display area 820A and the sided set value display area 820B are displayed horizontally side-by-side as a pair, and the output-color set value display area 830A and the output-color set value display area 830B are displayed horizontally side-by-side as a pair. The duplex setting item display area 815 shows the item "2-Sided", for example. The duplex set value display area 820A shows the setting of "1→2-Sided" as a set value of the item "2-Sided". The duplex set value display area 820B shows the setting of "Auto" as a set value of the item "2-Sided".

The output color item display area 825 shows the item "Output Color", for example. The output-color set value display area 830A shows the setting of "Color" as a set value for the item "Output Color". The output-color set value display area 830B shows "Black & White" as a set value for the item "Output Color".

In the illustrated example, the one-touch copy 3 button 522, which is the initially selected icon, is located on the left side, and the one-touch copy 2 button 520, which is an icon at the dropped position, is located on the right side.

The original positions of the icons may be reflected. Specifically, in the example illustrated in FIG. 6, the one-touch copy 3 button 522 is located to the left of the screen 500, and the one-touch copy 2 button 520 is located to the right of the screen 500. These positions may be reflected.

Figure 9:
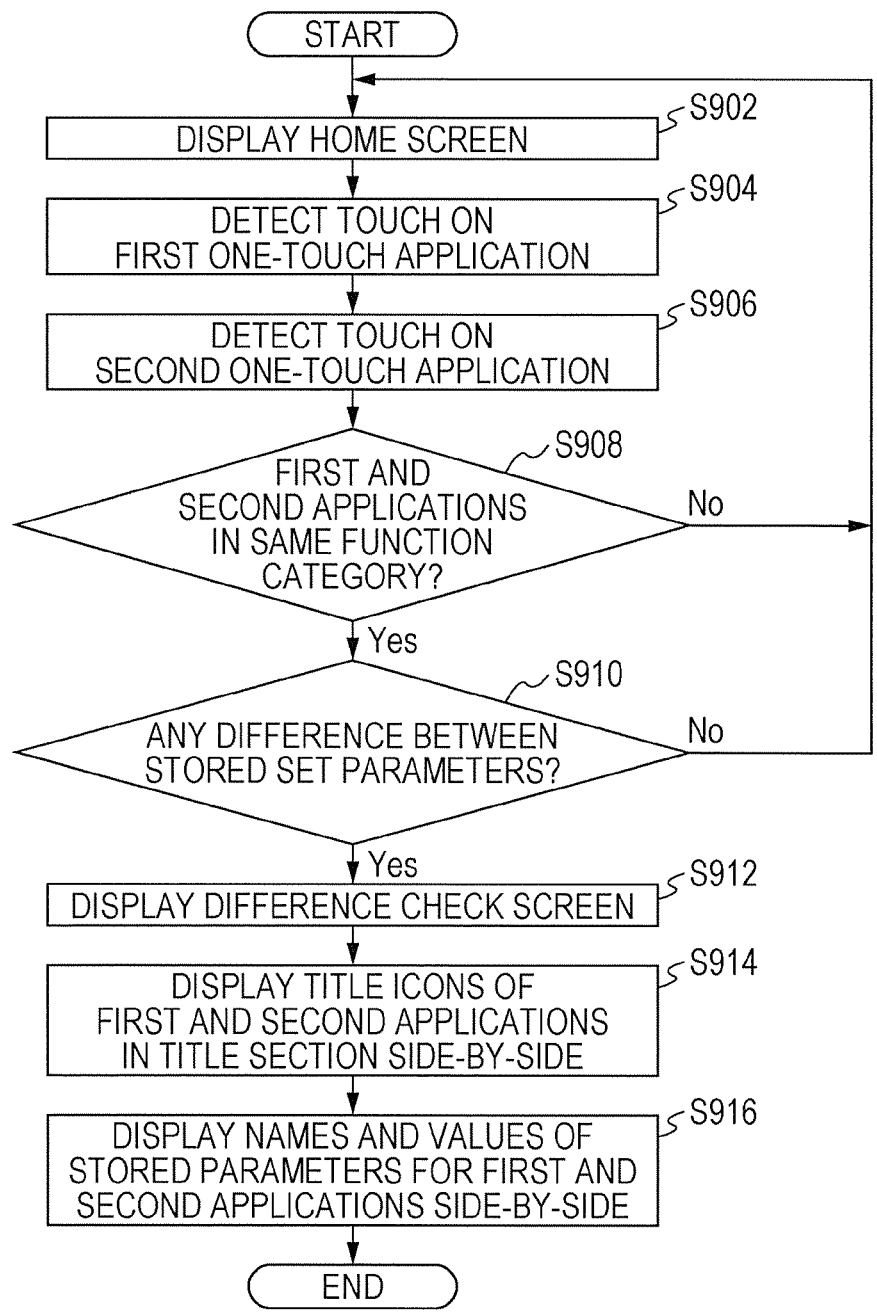
FIG. 9 is a flowchart illustrating an example process according to this exemplary embodiment.

FIG. 9 is a flowchart illustrating an example process according to this exemplary embodiment.

In the flowchart in the example illustrated in FIG. 9, steps S404 and S406 in the flowchart in the example illustrated in FIG. 4 are replaced with steps S904 and S906, respectively. In the example illustrated in FIG. 4, two icons are selected by using a drag-and-drop operation, whereas in the example illustrated in FIG. 9, two icons are selected by using a multi-touch operation.

In step S902, a home screen is displayed. The display is performed in a manner as in the example illustrated in FIG. 5 described above.

In step S904, a touch on a first one-touch application is detected.

Figure 10:
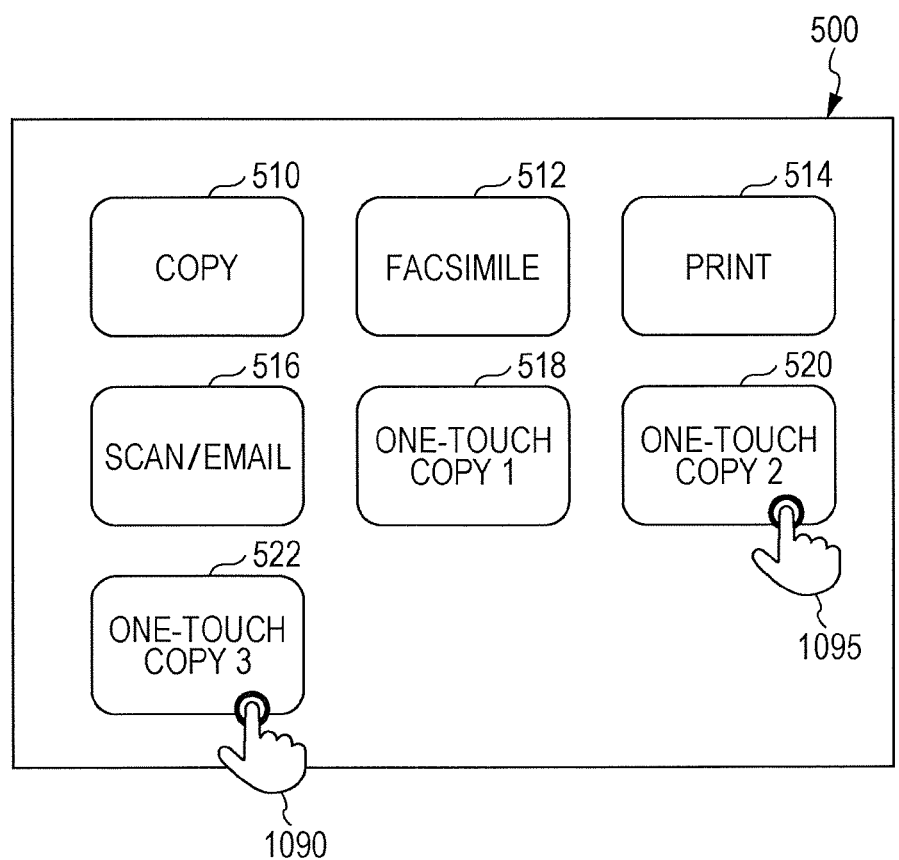
FIG. 10 illustrates an example process according to this exemplary embodiment.

In step S906, a touch on a second one-touch application is detected. This operation will be described with reference to an example illustrated in FIG. 10. As in the example illustrated in FIG. 5, for example, in the initial state, the screen 500 shows the copy button 510, the facsimile button 512, the print button 514, the scan/email button 516, the one-touch copy 1 button 518, the one-touch copy 2 button 520, and the one-touch copy 3 button 522. A selection of the one-touch copy 3 button 522 by the user with an operating finger 1090 is detected, and a selection of the one-touch copy 2 button 520 by the user with an operating finger 1095 is detected. Specifically, a press of two icons, namely, the one-touch copy 3 button 522 and the one-touch copy 2 button 520, by the multi-touch operation of the user is detected.

In step S908, it is determined whether the first and second applications are in the same function category. If both applications are in the same function category, the process proceeds to step S910. Otherwise, the process returns to step S902.

In step S910, it is determined whether there is any difference between stored set parameters. If there is a difference, the process proceeds to step S912. Otherwise, the process returns to step S902.

In step S912, a difference check screen is displayed.

In step S914, the title icons of the first and second applications are displayed in a title section side-by-side.

In step S916, the names and values of the stored parameters for the first and second applications are displayed side-by-side. The display is performed in a manner as in the example illustrated in FIG. 8 described above.

Figure 11:
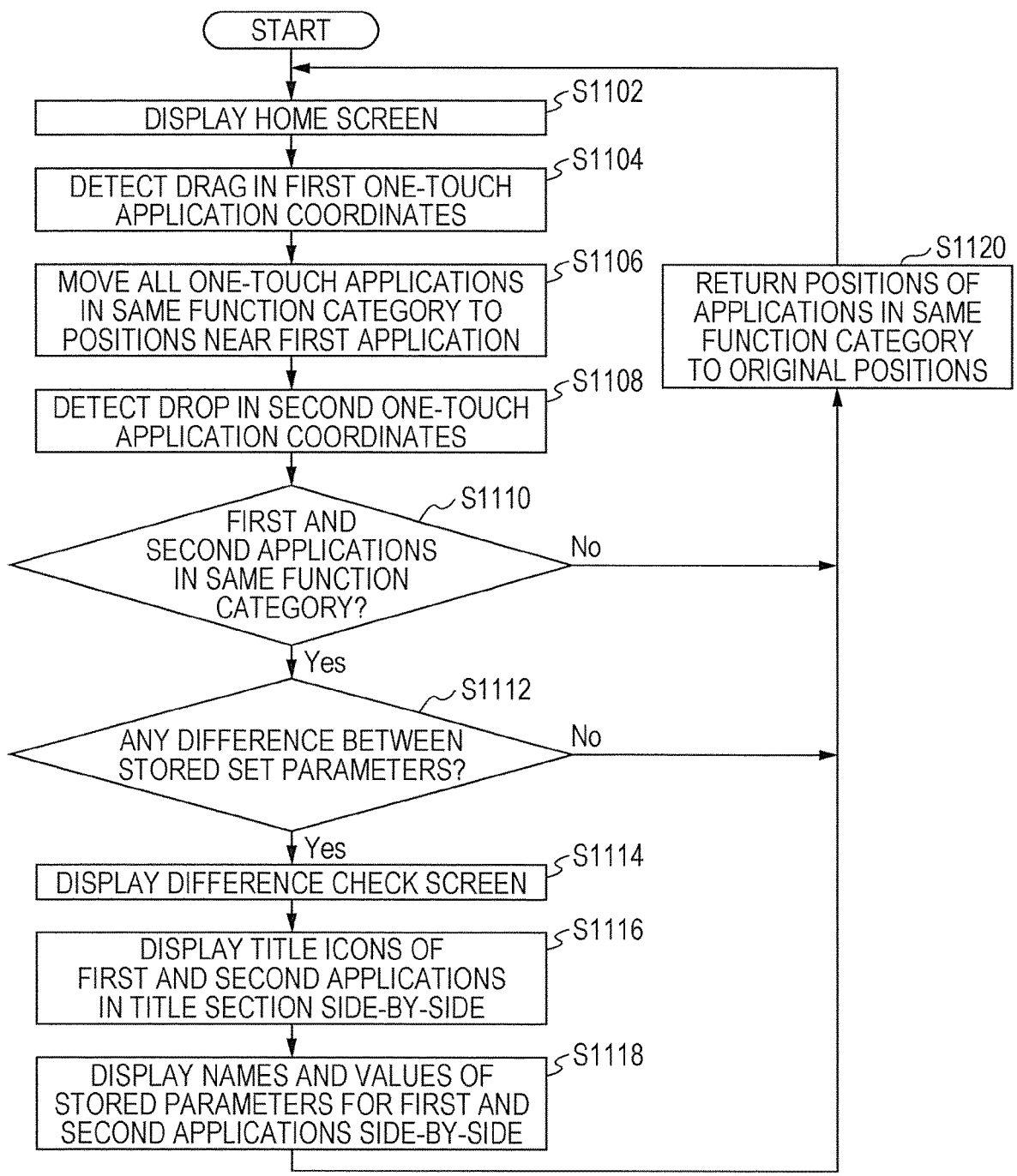
FIG. 11 is a flowchart illustrating an example process according to this exemplary embodiment.

FIG. 11 is a flowchart illustrating an example process according to this exemplary embodiment.

In the flowchart in the example illustrated in FIG. 11, steps S404 and S406 in the flowchart in the example illustrated in FIG. 4 are replaced with steps S1104 to S1108, and step S1120 is added.

Figure 12:
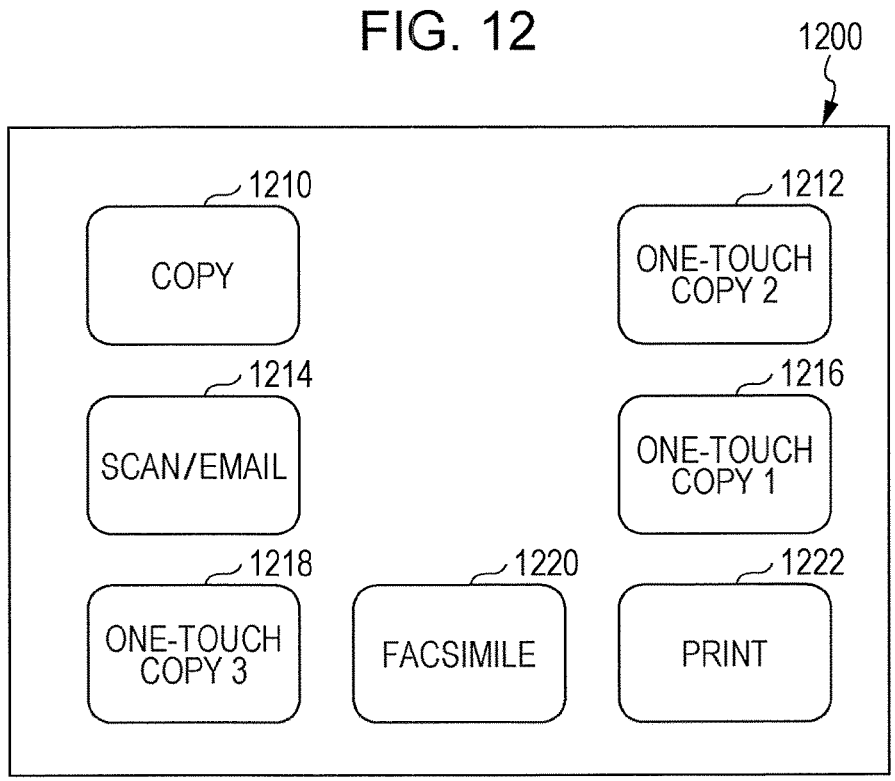
FIG. 12 illustrates an example process according to this exemplary embodiment.

In step S1102, a home screen is displayed. This operation will be described with reference to an example illustrated in FIG. 12. FIG. 12 illustrates an example process according to this exemplary embodiment. For example, a screen 1200 shows a copy button 1210, a one-touch copy 2 button 1212, a scan/email button 1214, a one-touch copy 1 button 1216, a one-touch copy 3 button 1218, a facsimile button 1220, and a print button 1222. In the illustrated example, the one-touch copy 2 button 1212 or the one-touch copy 1 button 1216 to be compared with the one-touch copy 3 button 1218 is away from the one-touch copy 3 button 1218.

Figure 13:
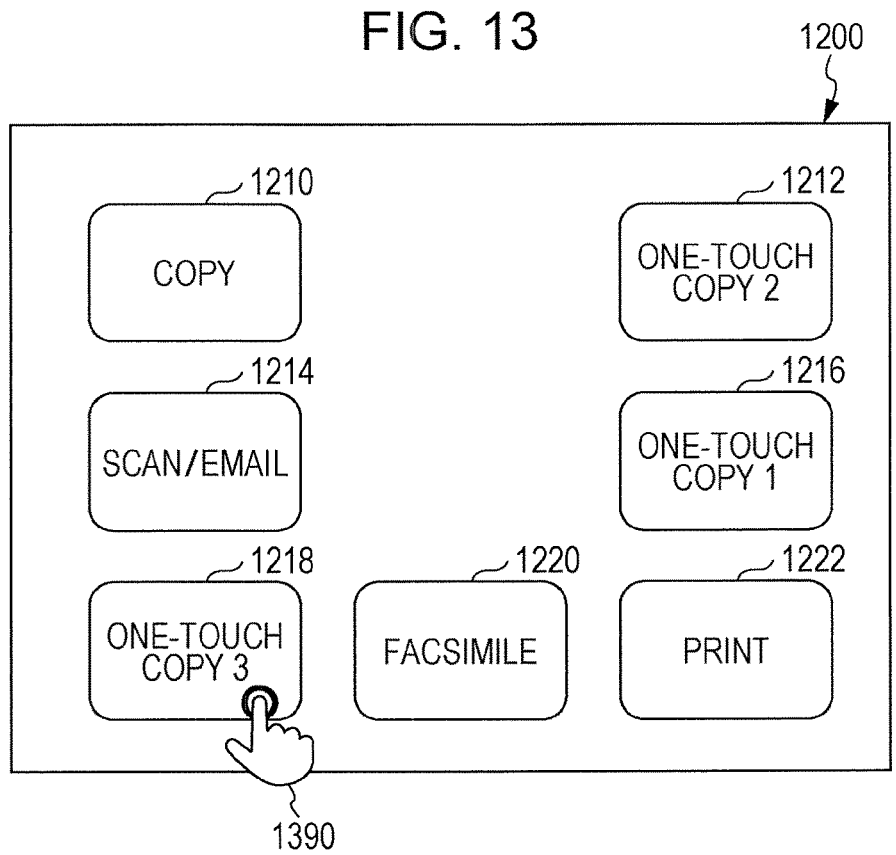
FIG. 13 illustrates the example process according to this exemplary embodiment.

In step S1104, a drag is detected in the coordinates of a first one-touch application. This operation will be described with reference to an example illustrated in FIG. 13. In the example illustrated in FIG. 13, a press and hold of the one-touch copy 3 button 1218 by the user with an operating finger 1390 is detected.

Figure 14:
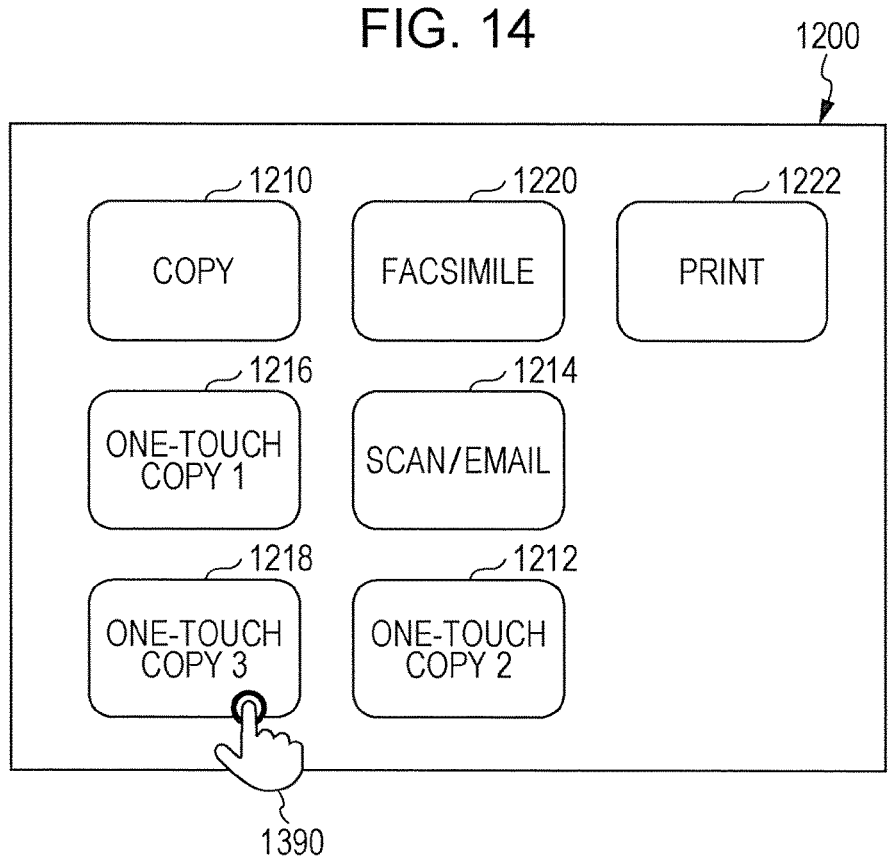
FIG. 14 illustrates the example process according to this exemplary embodiment.

In step S1106, all the one-touch applications in the same function category as that of the first one-touch application are moved to positions near the first one-touch application. This operation will be described with reference to an example illustrated in FIG. 14. In the example illustrated in FIG. 14, icons in the same function category, which are to be compared with each other, are moved close together. Specifically, the one-touch copy 2 button 1212 and the one-touch copy 1 button 1216 are moved near the one-touch copy 3 button 1218. In accordance with the movement, the other icons, that is, the copy button 1210, the scan/email button 1214, the facsimile button 1220, and the print button 1222 may be moved. For example, an icon not in the same function category may be moved away from the one-touch copy 3 button 1218.

When a release of the operating finger 1390 from the one-touch copy 3 button 1218 is detected, the original state given in the example illustrated in FIG. 12 may be restored.

Figure 15:
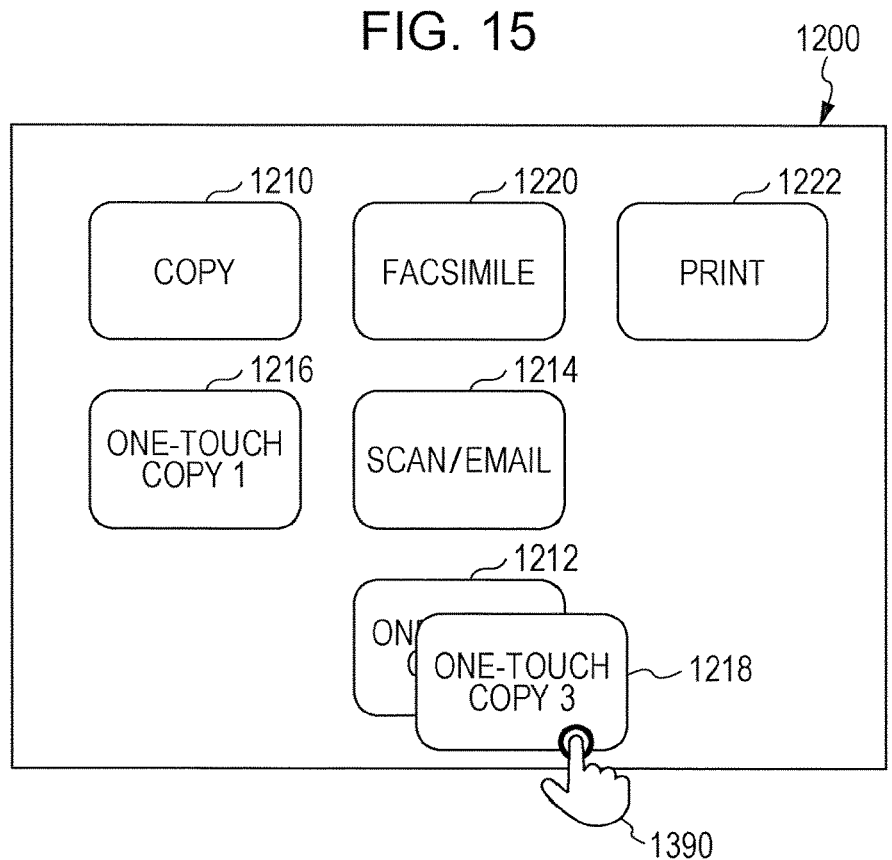
FIG. 15 illustrates the example process according to this exemplary embodiment.

In step S1108, a drop is detected in the coordinates of a second one-touch application. This operation will be described with reference to an example illustrated in FIG. 15. In the example illustrated in FIG. 15, the one-touch copy 3 button 1218 is dragged and dropped onto the position of the one-touch copy 2 button 1212. In the example illustrated in FIG. 15, the one-touch copy 3 button 1218 is moved to the position of the one-touch copy 2 button 1212, which is adjacent to the one-touch copy 3 button 1218, with the distance by which the one-touch copy 3 button 1218 is moved to the one-touch copy 2 button 1212 being shorter than that in the example illustrated in FIG. 12.

In step S1110, it is determined whether the first and second applications are in the same function category. If both applications are in the same function category, the process proceeds to step S1112. Otherwise, the process proceeds to step S1120.

In step S1112, it is determined whether there is any difference between stored set parameters. If there is a difference, the process proceeds to step S1114. Otherwise, the process proceeds to step S1120.

In step S1114, a difference check screen is displayed. The display is performed in a manner as in the example illustrated in FIG. 8 described above.

In step S1116, the title icons of the first and second applications are displayed in a title section side-by-side.

In step S1118, the names and values of the stored parameters for the first and second applications are displayed side-by-side.

In step S1120, the positions of the applications in the same function category are returned to the original positions, and then the process returns to step S1102. That is, the state before the processing of step S1106 is performed is restored.

Figure 16:
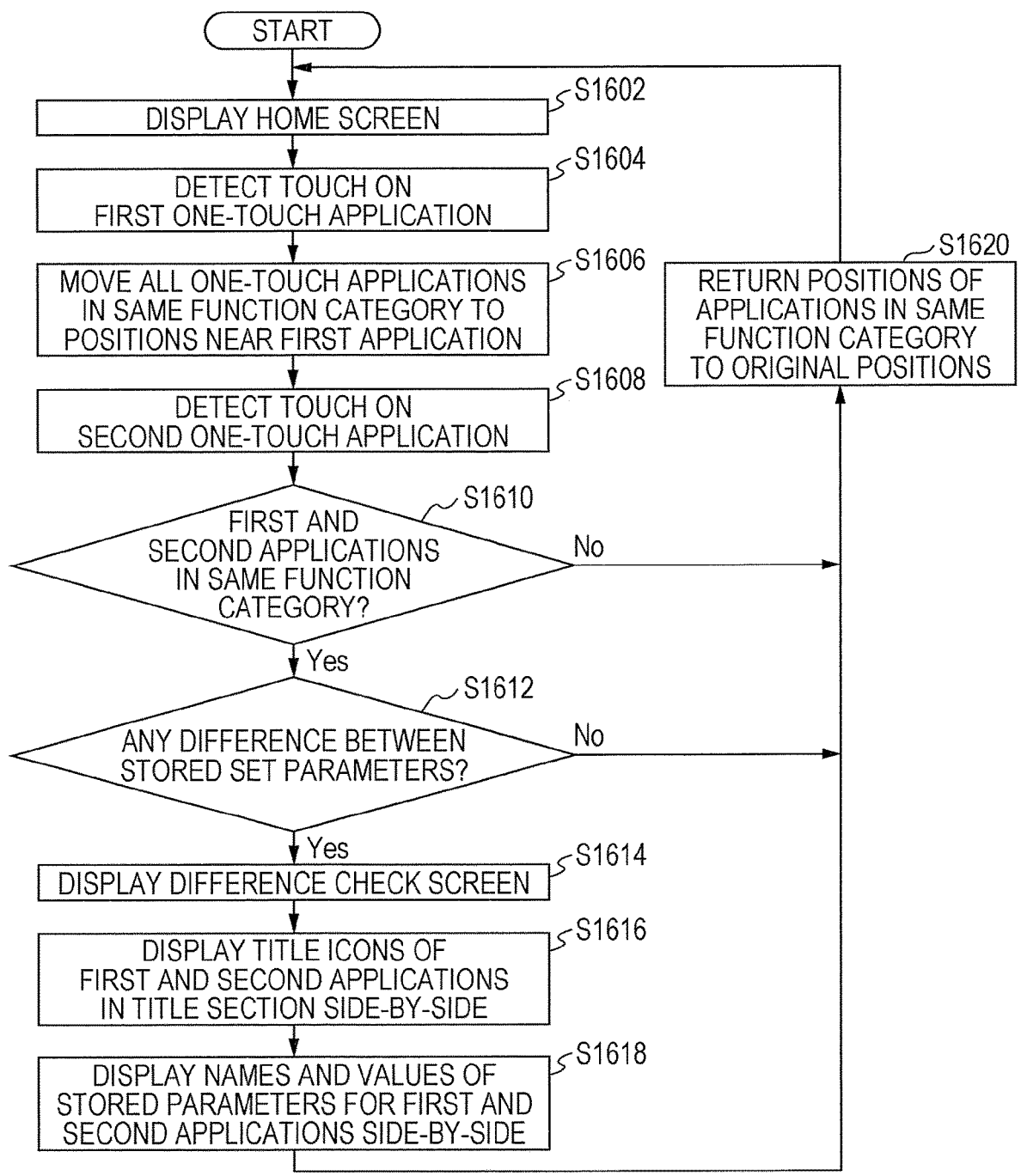
FIG. 16 is a flowchart illustrating an example process according to this exemplary embodiment.

FIG. 16 is a flowchart illustrating an example process according to this exemplary embodiment.

In the flowchart in the example illustrated in FIG. 16, steps S404 and S406 in the flowchart in the example illustrated in FIG. 4 are replaced with steps S1604 to S1608, and step S1620 is added. In the example illustrated in FIG. 11, two icons are selected by using a drag-and-drop operation, whereas in the example illustrated in FIG. 16, two icons are selected by using a multi-touch operation.

In step S1602, a home screen is displayed. The display is performed in a manner as in the example illustrated in FIG. 5 described above.

In step S1604, a touch on a first one-touch application is detected.

In step S1606, all the one-touch applications in the same function category as that of the first one-touch application are moved to positions near the first one-touch application.

In step S1608, a touch on a second one-touch application is detected. The display is performed in a manner as in the example illustrated in FIG. 10 described above. At this point in time, a selection of two icons has been detected, and a so-called multi-touch operation is detected.

In step S1610, it is determined whether the first and second applications are in the same function category. If both applications are in the same function category, the process proceeds to step S1612. Otherwise, the process proceeds to step S1620.

In step S1612, it is determined whether there is any difference between stored set parameters. If there is a difference, the process proceeds to step S1614. Otherwise, the process proceeds to step S1620.

In step S1614, a difference check screen is displayed. The display is performed in a manner as in the example illustrated in FIG. 8 described above.

In step S1616, the title icons of the first and second applications are displayed in a title section side-by-side.

In step S1618, the names and values of the stored parameters for the first and second applications are displayed side-by-side.

In step S1620, the positions of the applications in the same function category are returned to the original positions, and then the process returns to step S1602.

Figure 17:
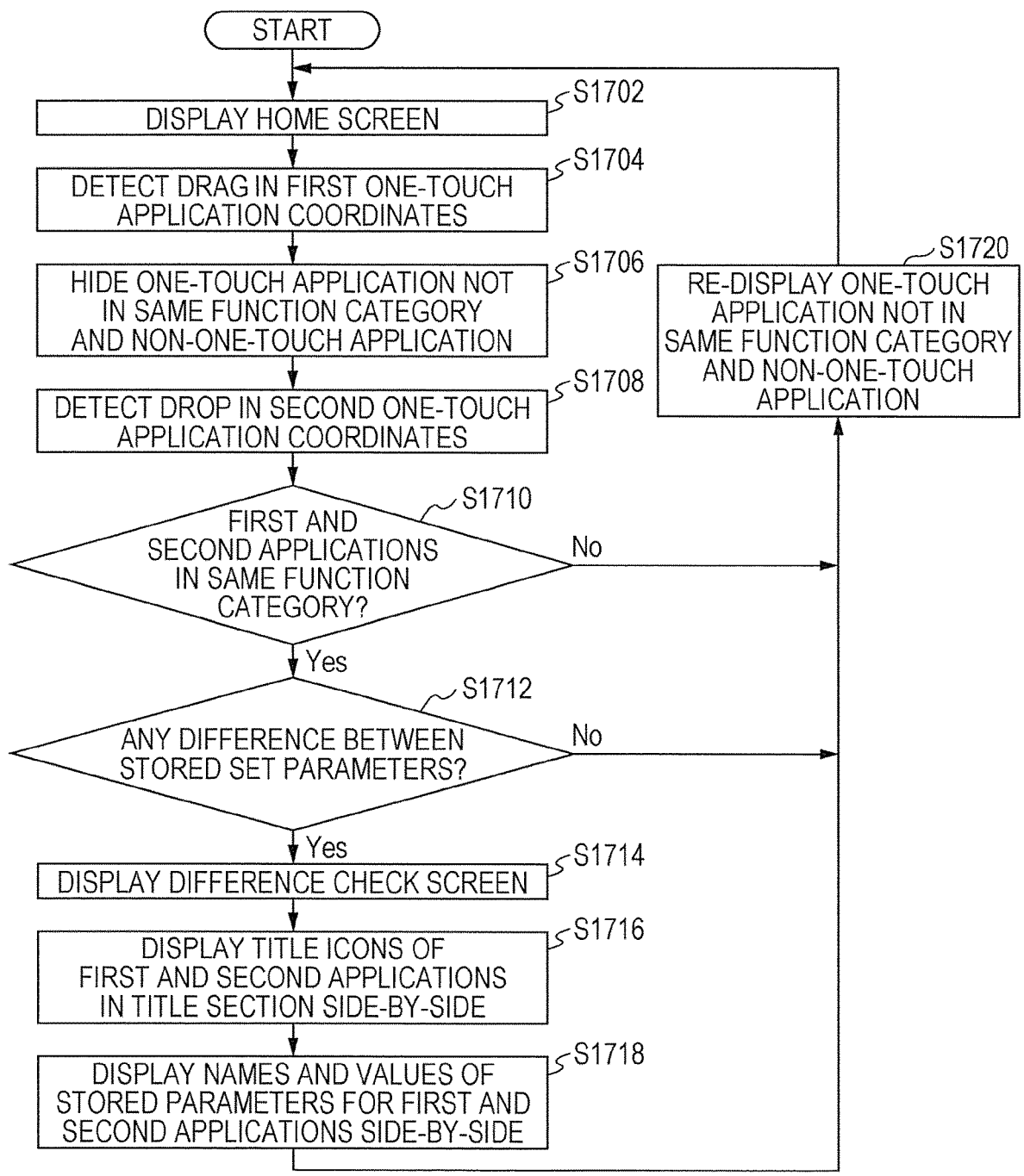
FIG. 17 is a flowchart illustrating an example process according to this exemplary embodiment.

FIG. 17 is a flowchart illustrating an example process according to this exemplary embodiment.

In the flowchart in the example illustrated in FIG. 17, steps S404 and S406 in the flowchart in the example illustrated in FIG. 4 are replaced with steps S1704 to S1708, and step S1720 is added.

Figure 18:
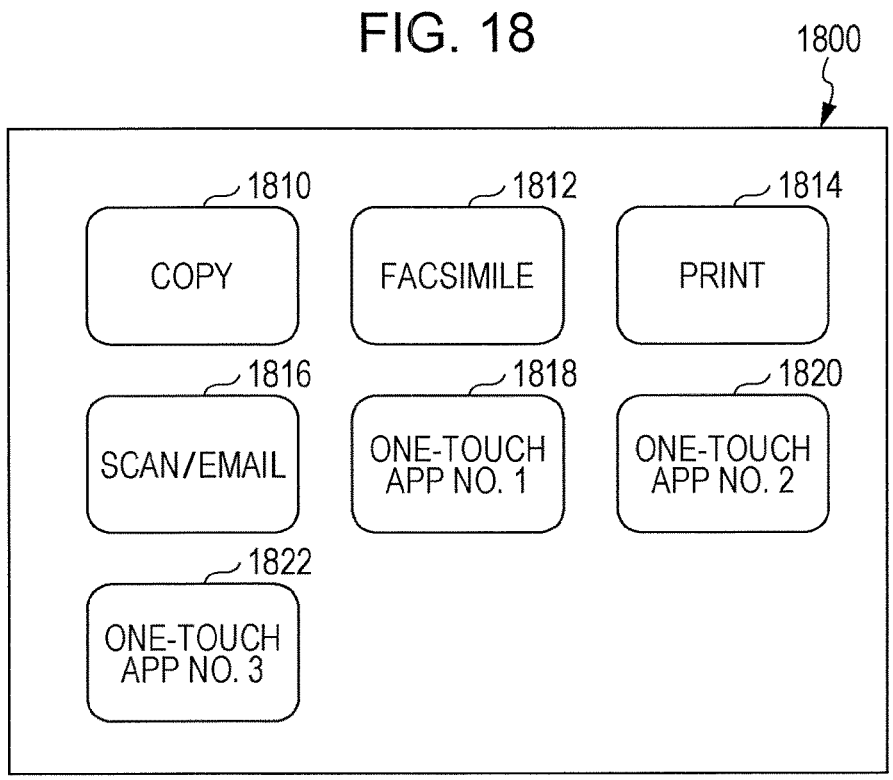
FIG. 18 illustrates an example process according to this exemplary embodiment.

In step S1702, a home screen is displayed. This operation will be described with reference to an example illustrated in FIG. 18. For example, in the initial state, a screen 1800 shows a copy button 1810, a facsimile button 1812, a print button 1814, a scan/email button 1816, a one-touch application (app) No. 1 button 1818, a one-touch app No. 2 button 1820, and a one-touch app No. 3 button 1822. The one-touch app No. 1 button 1818 is in a facsimile transmission category. The one-touch app No. 2 button 1820 is in a copy category. The one-touch app No. 3 button 1822 is in the copy category. Accordingly, the values set for the one-touch app No. 3 button 1822 and the values set for the one-touch app No. 2 button 1820 can be compared, whereas the comparison between the values set for the one-touch app No. 3 button 1822 and the values set for the one-touch app No. 1 button 1818 is meaningless, and the display of such set values in a comparable way is disabled.

Figure 19:
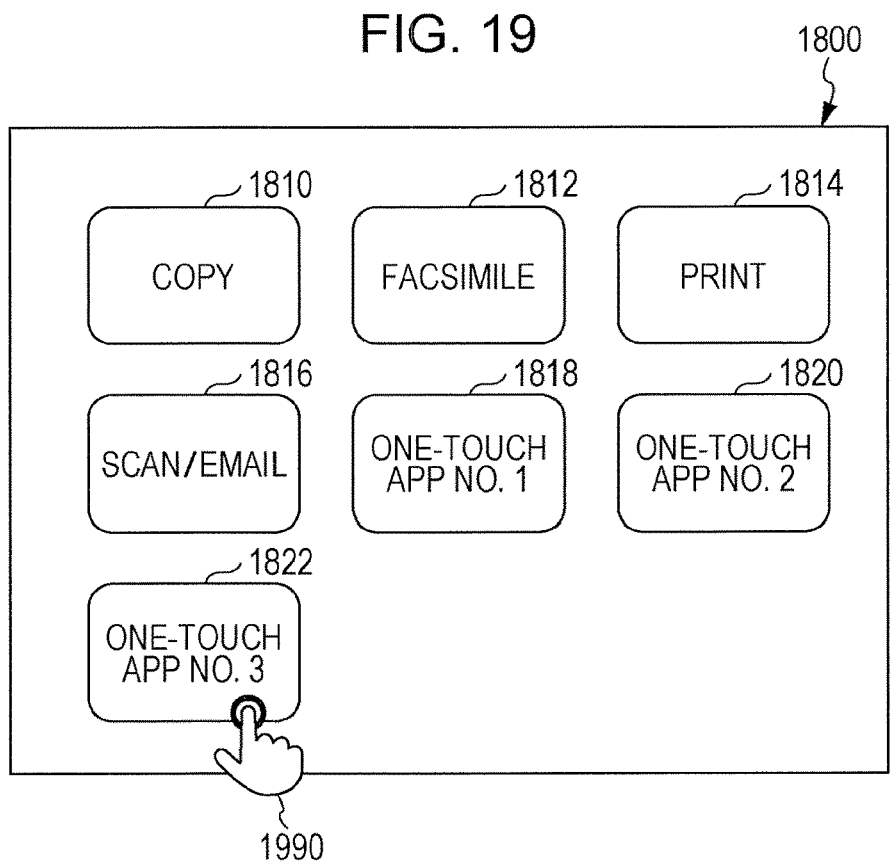
FIG. 19 illustrates the example process according to this exemplary embodiment.

In step S1704, a drag is detected in the coordinates of a first one-touch application. This operation will be described with reference to an example illustrated in FIG. 19. As given in the example illustrated in FIG. 19, a drag of the one-touch app No. 3 button 1822 or a press and hold of the one-touch app No. 3 button 1822, which is pre-processing of dragging, by the user with an operating finger 1990 is detected.

Figure 20:
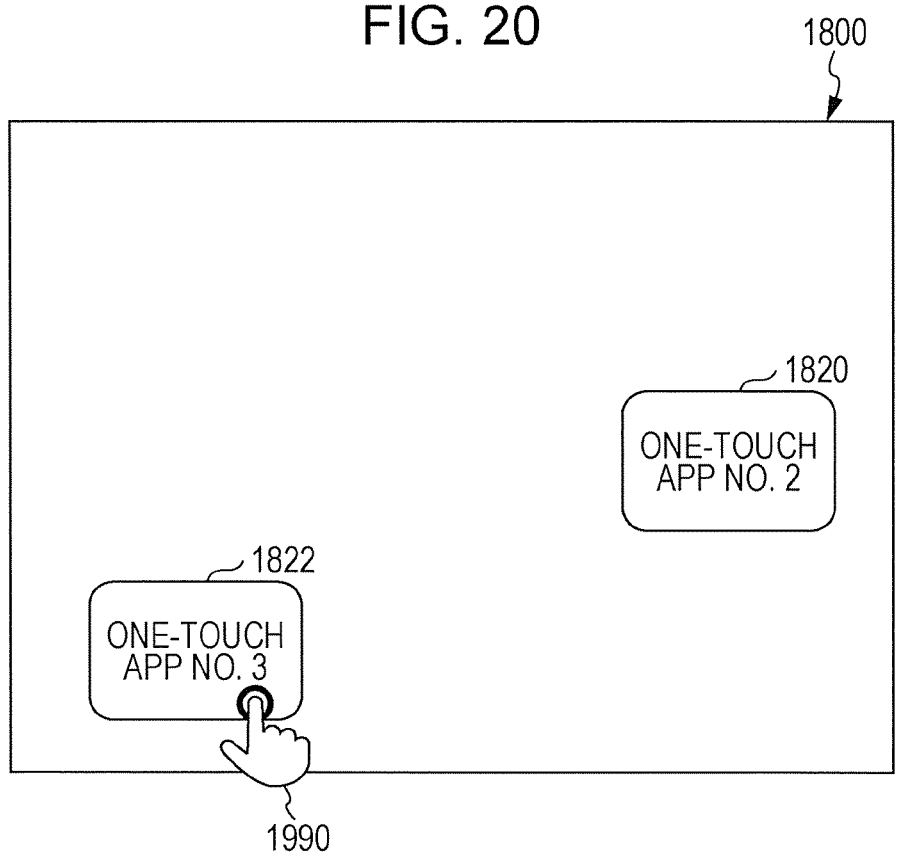
FIG. 20 illustrates the example process according to this exemplary embodiment.

In step S1706, a one-touch application not in the same function category as that of the first one-touch application and a non-one-touch application are hidden. This operation will be described with reference to an example illustrated in FIG. 20. As illustrated in FIG. 20, only the one-touch app No. 2 button 1820, which is in the same category as that of the one-touch app No. 3 button 1822, is displayed. The other icons are not displayed. That is, the display of the other buttons, such as the copy button 1810 and the one-touch app No. 1 button 1818, is removed from the screen 1800.

Figure 21:
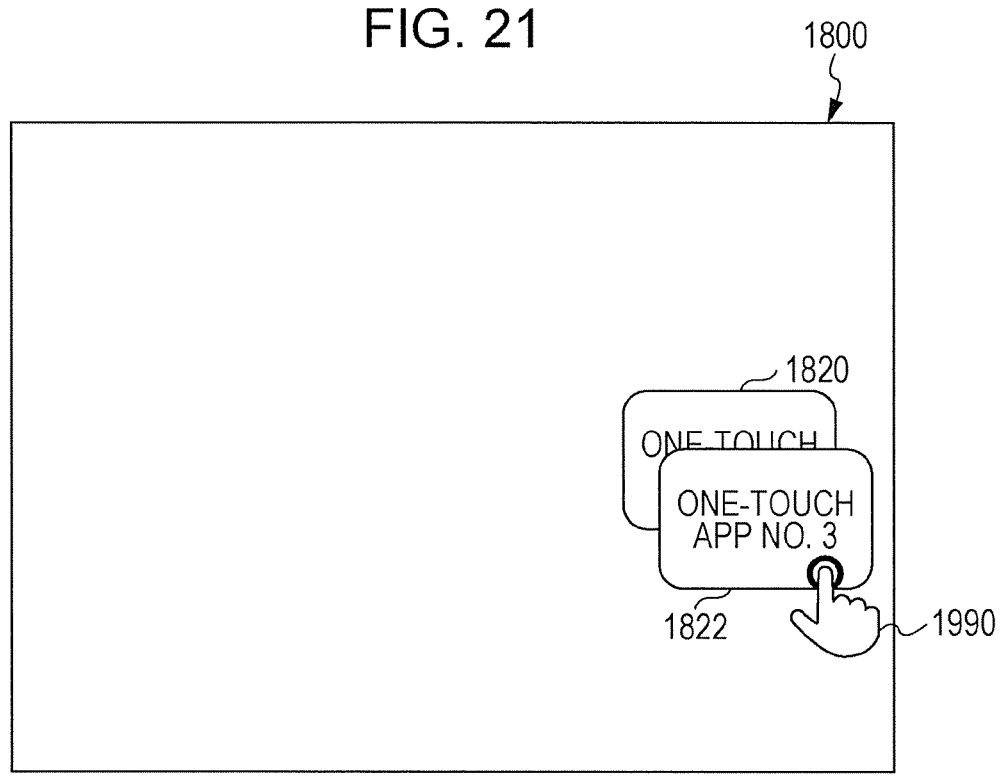
FIG. 21 illustrates the example process according to this exemplary embodiment.

In step S1708, a drop is detected in the coordinates of a second one-touch application. This operation will be described with reference to an example illustrated in FIG. 21. An operation of dragging and dropping the one-touch app No. 3 button 1822 onto the position of the one-touch app No. 2 button 1820 by the user with the operating finger 1990 is detected.

In step S1710, it is determined whether the first and second applications are in the same function category. If both applications are in the same function category, the process proceeds to step S1712. Otherwise, the process proceeds to step S1720.

In step S1712, it is determined whether there is any difference between stored set parameters. If there is a difference, the process proceeds to step S1714. Otherwise, the process proceeds to step S1720.

In step S1714, a difference check screen is displayed. The display is performed in a manner as in the example illustrated in FIG. 8 described above.

In step S1716, the title icons of the first and second applications are displayed in a title section side-by-side.

In step S1718, the names and values of the stored parameters for the first and second applications are displayed side-by-side.

In step S1720, the one-touch application not in the same function category as that of the first one-touch application and the non-one-touch application are displayed again, and then the process returns to step S1702.

Figure 22:
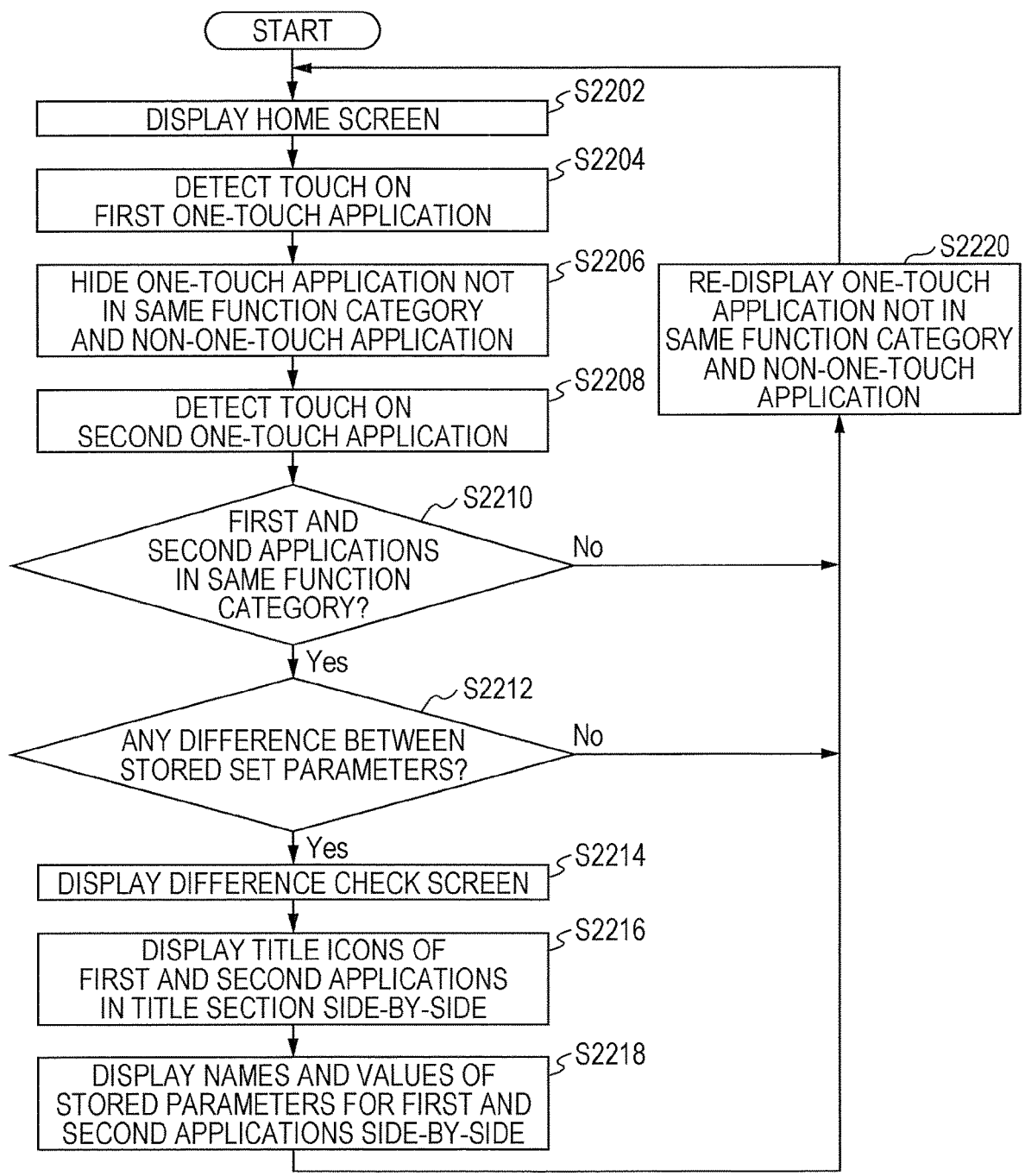
FIG. 22 is a flowchart illustrating an example process according to this exemplary embodiment.

FIG. 22 is a flowchart illustrating an example process according to this exemplary embodiment.

In the flowchart in the example illustrated in FIG. 22, steps S404 and S406 in the flowchart in the example illustrated in FIG. 4 are replaced with steps S2204 to S2208, and step S2220 is added. In the example illustrated in FIG. 17, two icons are selected by using a drag-and-drop operation, whereas in the example illustrated in FIG. 22, two icons are selected by using a multi-touch operation.

In step S2202, a home screen is displayed. The display is performed in a manner as in the example illustrated in FIG. 18 described above.

In step S2204, a touch on a first one-touch application is detected. The display is performed in a manner as in the example illustrated in FIG. 19 described above.

In step S2206, a one-touch application not in the same function category as that of the first one-touch application and a non-one-touch application are hidden. The display is performed in a manner as in the example illustrated in FIG. 20 described above.

In step S2208, a touch on a second one-touch application is detected. In the display given in the example illustrated in FIG. 20 described above, both the one-touch app No. 3 button 1822 and the one-touch app No. 2 button 1820 are selected. At this point in time, a selection of two icons has been detected, and a so-called multi-touch operation is detected.

In step S2210, it is determined whether the first and second applications are in the same function category. If both applications are in the same function category, the process proceeds to step S2212. Otherwise, the process proceeds to step S2220.

In step S2212, it is determined whether there is any difference between stored set parameters. If there is a difference, the process proceeds to step S2214. Otherwise, the process proceeds to step S2220.

In step S2214, a difference check screen is displayed. The display is performed in a manner as in the example illustrated in FIG. 8 described above.

In step S2216, the title icons of the first and second applications are displayed in a title section side-by-side.

In step S2218, the names and values of the stored parameters for the first and second applications are displayed side-by-side.

In step S2220, the one-touch application not in the same function category as that of the first one-touch application and the non-one-touch application are displayed again, and then the process returns to step S2202.

Figure 23:
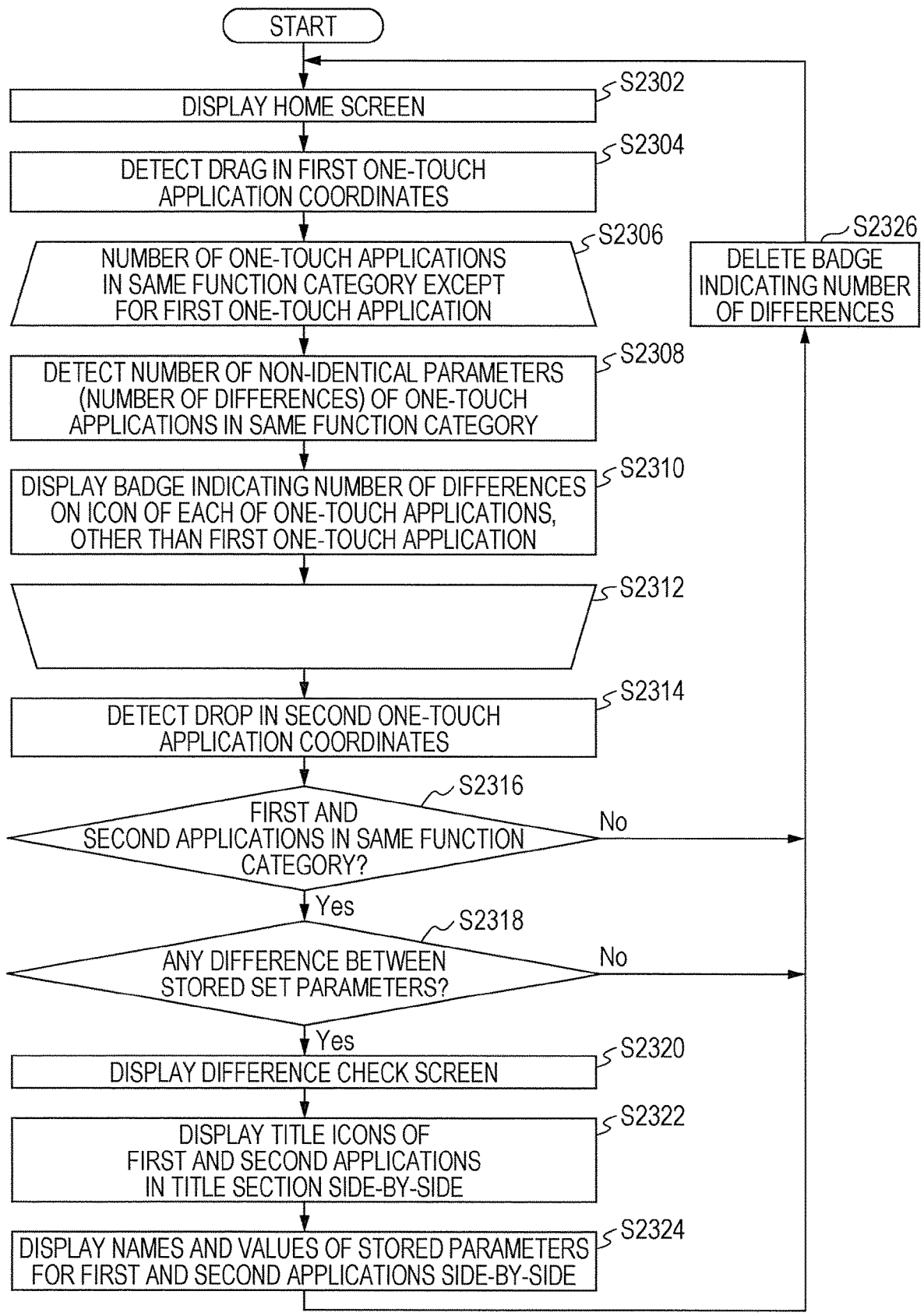
FIG. 23 is a flowchart illustrating an example process according to this exemplary embodiment.

FIG. 23 is a flowchart illustrating an example process according to this exemplary embodiment.

In the flowchart in the example illustrated in FIG. 23, steps S404 and S406 in the flowchart in the example illustrated in FIG. 4 are replaced with steps S2304 to S2314, and step S2326 is added.

In step S2302, a home screen is displayed. The display is performed in a manner as in the example illustrated in FIG. 18 described above.

In step S2304, a drag is detected in the coordinates of a first one-touch application. The display is performed in a manner as in the example illustrated in FIG. 19 described above.

In step S2306, the processing up to step S2312 is repeated the number of times equal to the number of one-touch applications in the same function category as that of the first one-touch application, except for the first one-touch application. The one-touch app No. 1 button 1818 and the one-touch app No. 2 button 1820 are assumed to be one-touch applications in the same function category as that of the one-touch app No. 3 button 1822.

In step S2308, the number of non-identical parameters (the number of differences) of one-touch applications in the same function category as that of the first one-touch application is detected. Specifically, the set values of settings of applications related with two icons are compared, and the number of different set values may be counted.

Figure 24:
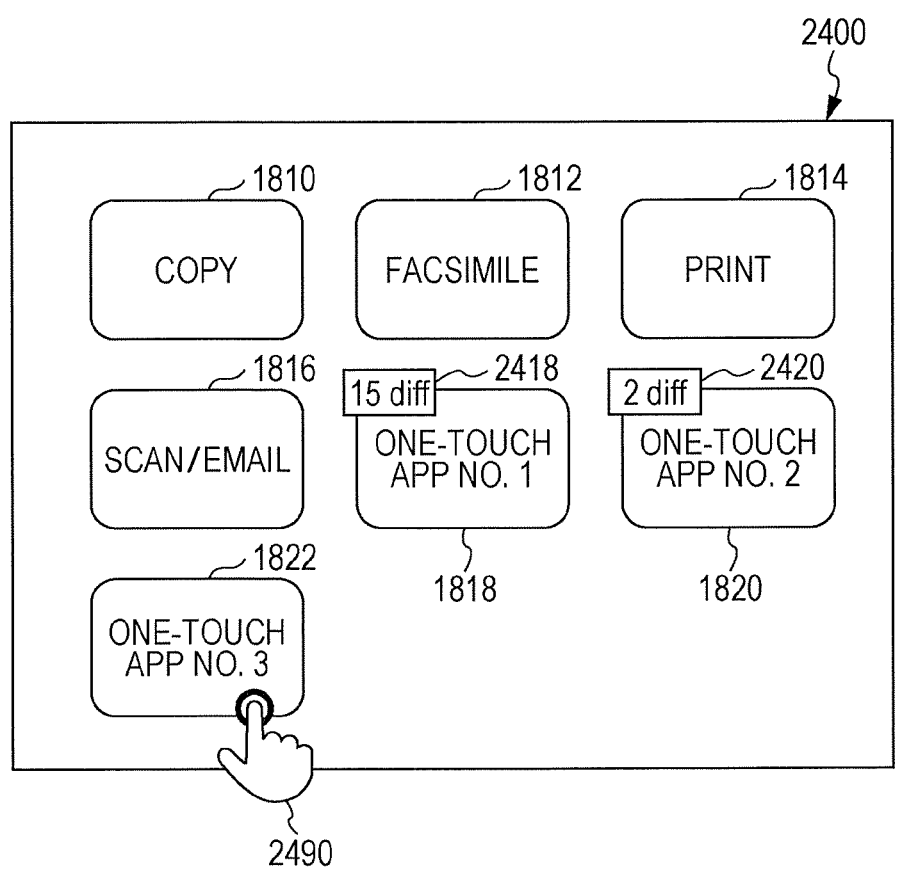
FIG. 24 illustrates an example process according to this exemplary embodiment.

In step S2310, a badge indicating the number of differences is displayed on an icon of each of the one-touch applications, other than the first one-touch application. This operation will be described with reference to an example illustrated in FIG. 24. FIG. 24 illustrates an example process according to this exemplary embodiment. Only the applications in the same category are each displayed with the number of differences, by way of example. A screen 2400 shows the copy button 1810, the facsimile button 1812, the print button 1814, the scan/email button 1816, the one-touch app No. 1 button 1818, the one-touch app No. 2 button 1820, and the one-touch app No. 3 button 1822. The one-touch app No. 1 button 1818 is displayed with a badge 2418, and the one-touch app No. 2 button 1820 is displayed with a badge 2420. That is, in the example illustrated in FIG. 24, the one-touch app No. 1 button 1818, which is in the same function category as that of the one-touch app No. 3 button 1822, is displayed with the badge 2418. The badge 2418 indicates that "15 set values are different". The one-touch app No. 2 button 1820, which is in the same function category as that of the one-touch app No. 3 button 1822, is displayed with the badge 2420. The badge 2420 indicates that "two set values are different".

In step S2312, the processing from step S2306 is repeated until the processing of all the one-touch applications in the same function category as that of the first one-touch application, except for the first one-touch application, is completed.

In step S2314, a drop is detected in the coordinates of a second one-touch application. Specifically, the one-touch app No. 3 button 1822 is moved to the position of the one-touch app No. 2 button 1820, and an operation of releasing an operating finger 2490 from the one-touch app No. 3 button 1822, with the one-touch app No. 3 button 1822 and the one-touch app No. 2 button 1820 overlaid on top of each other, is detected.

In step S2316, it is determined whether the first and second applications are in the same function category. If both applications are in the same function category, the process proceeds to step S2318. Otherwise, the process proceeds to step S2326.

In step S2318, it is determined whether there is any difference between stored set parameters. If there is a difference, the process proceeds to step S2320. Otherwise, the process proceeds to step S2326.

In step S2320, a difference check screen is displayed. The display is performed in a manner as in the example illustrated in FIG. 8 described above.

In step S2322, the title icons of the first and second applications are displayed in a title section side-by-side.

In step S2324, the names and values of the stored parameters for the first and second applications are displayed side-by-side.

In step S2326, the badge indicating the number of differences is deleted, and then the process returns to step S2302. Specifically, the badge 2418 and the badge 2420 are deleted, and the initial display state is restored.

Figure 25:
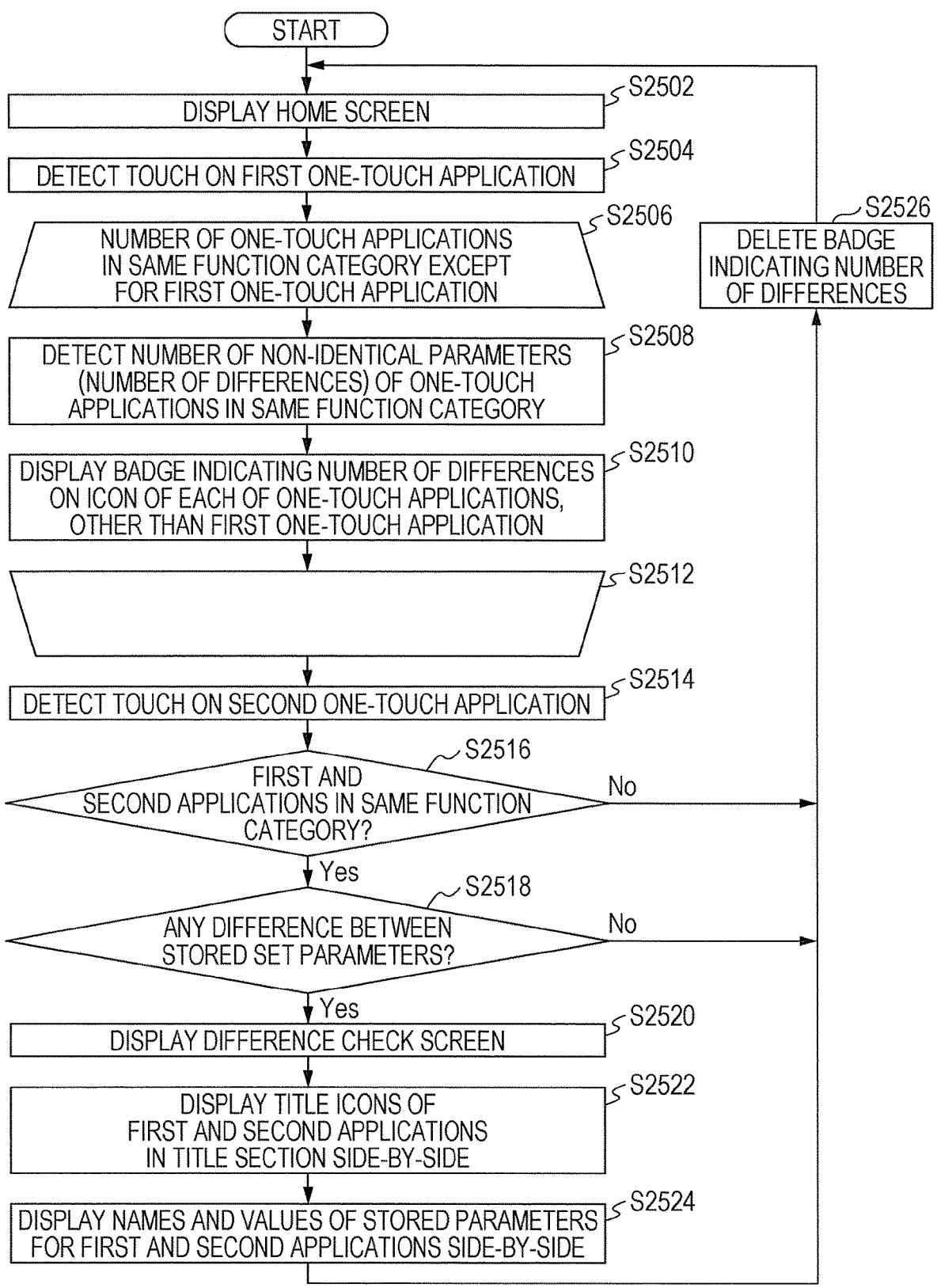
FIG. 25 is a flowchart illustrating an example process according to this exemplary embodiment.

FIG. 25 is a flowchart illustrating an example process according to this exemplary embodiment.

In the flowchart in the example illustrated in FIG. 25, steps S404 and S406 in the flowchart in the example illustrated in FIG. 4 are replaced with steps S2504 to S2514, and step S2526 is added. In the example illustrated in FIG. 23, two icons are selected by using a drag-and-drop operation, whereas in the example illustrated in FIG. 25, two icons are selected by using a multi-touch operation.

In step S2502, a home screen is displayed. The display is performed in a manner as in the example illustrated in FIG. 18 described above.

In step S2504, a touch on a first one-touch application is detected. The display is performed in a manner as in the example illustrated in FIG. 19 described above.

In step S2506, the processing up to step S2512 is repeated the number of times equal to the number of one-touch applications in the same function category as that of the first one-touch application, except for the first one-touch application.

In step S2508, the number of non-identical parameters (the number of differences) of one-touch applications in the same function category as that of the first one-touch application is detected.

In step S2510, a badge indicating the number of differences is displayed on an icon of each of the one-touch applications, other than the first one-touch application. The display is performed in a manner as in the example illustrated in FIG. 24 described above.

In step S2512, the processing from step S2506 is repeated until the processing of all the one-touch applications in the same function category as that of the first one-touch application, except for the first one-touch application, is completed.

In step S2514, a touch on a second one-touch application is detected. In the display given in the example illustrated in FIG. 24 described above, both the one-touch app No. 3 button 1822 and the one-touch app No. 2 button 1820 are selected. At this point in time, a selection of two icons has been detected, and a so-called multi-touch operation is detected.

In step S2516, it is determined whether the first and second applications are in the same function category. If both applications are in the same function category, the process proceeds to step S2518. Otherwise, the process proceeds to step S2526.

In step S2518, it is determined whether there is any difference between stored set parameters. If there is a difference, the process proceeds to step S2520. Otherwise, the process proceeds to step S2526.

In step S2520, a difference check screen is displayed. The display is performed in a manner as in the example illustrated in FIG. 8 described above.

In step S2522, the title icons of the first and second applications are displayed in a title section side-by-side.

In step S2524, the names and values of the stored parameters for the first and second applications are displayed side-by-side.

In step S2526, the badge indicating the number of differences is deleted, and then the process returns to step S2502. Specifically, the badge 2418 and the badge 2420 are deleted, and the initial display state is restored.

Figure 26:
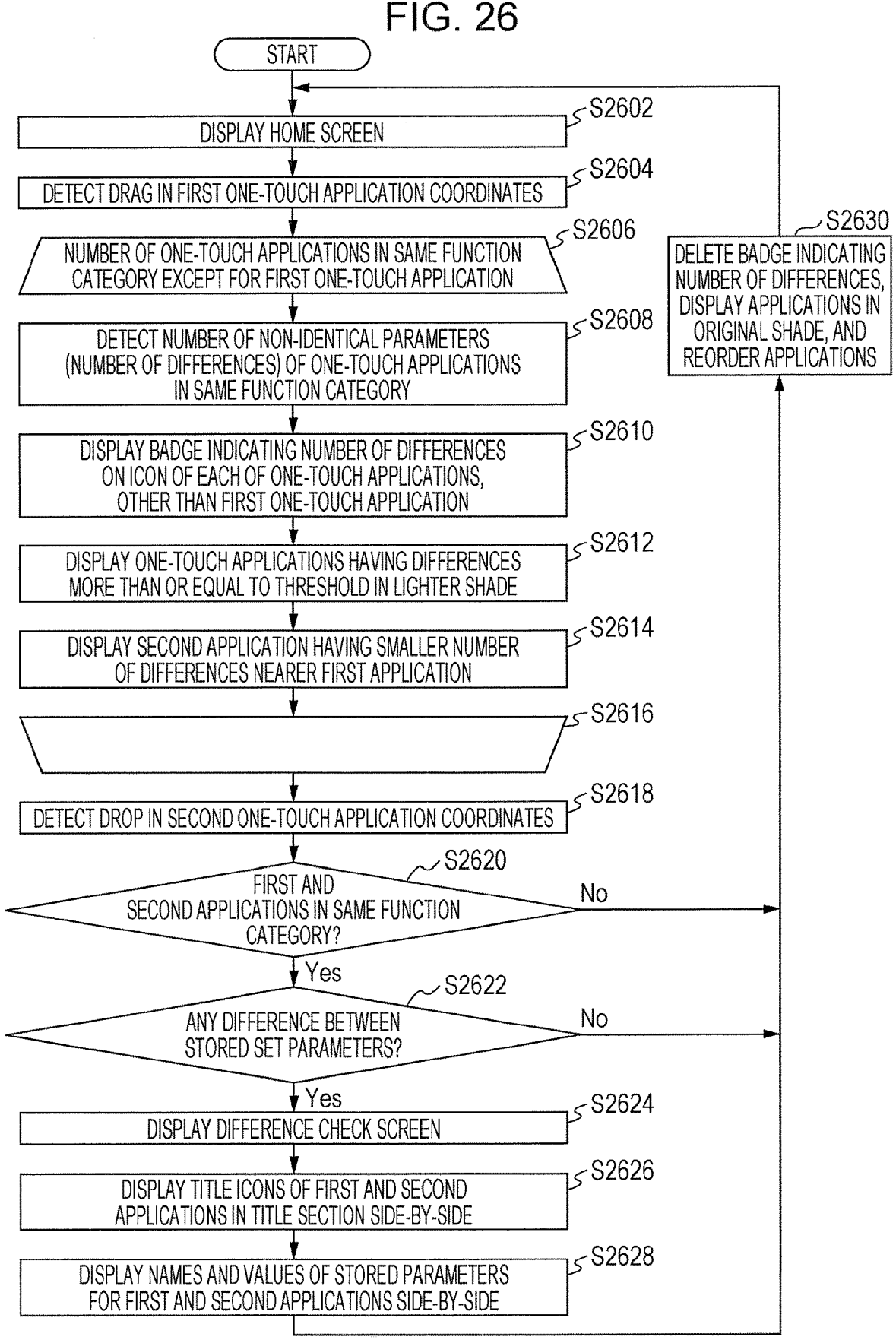
FIG. 26 is a flowchart illustrating an example process according to this exemplary embodiment.

FIG. 26 is a flowchart illustrating an example process according to this exemplary embodiment.

In the flowchart in the example illustrated in FIG. 26, steps S404 and S406 in the flowchart in the example illustrated in FIG. 4 are replaced with steps S2604 to S2618, and step S2630 is added. The number of different set values is displayed as a badge. An icon with the number of different set values larger than a threshold is displayed in a lighter shade, and an icon with the number of different set values smaller than the threshold is moved close to the first one-touch application. The icon with the number of different set values larger than a threshold is less likely to be a comparison target, and the icon with the number of different set values smaller than the threshold is more likely to be a comparison target.

Figure 27:
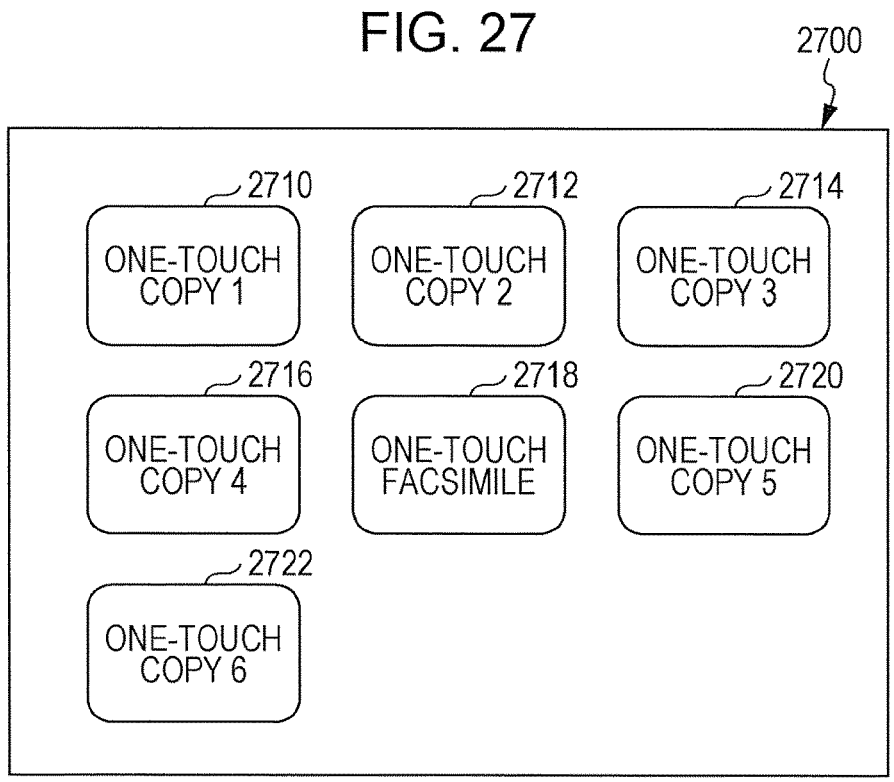
FIG. 27 illustrates an example process according to this exemplary embodiment.

In step S2602, a home screen is displayed. This operation will be described with reference to an example illustrated in FIG. 27. FIG. 27 illustrates an example process according to this exemplary embodiment. A screen 2700 shows a one-touch copy 1 button 2710, a one-touch copy 2 button 2712, a one-touch copy 3 button 2714, a one-touch copy 4 button 2716, a one-touch facsimile button 2718, a one-touch copy 5 button 2720, and a one-touch copy 6 button 2722. The illustrated example provides a larger number of buttons in the same category.

Figure 28:
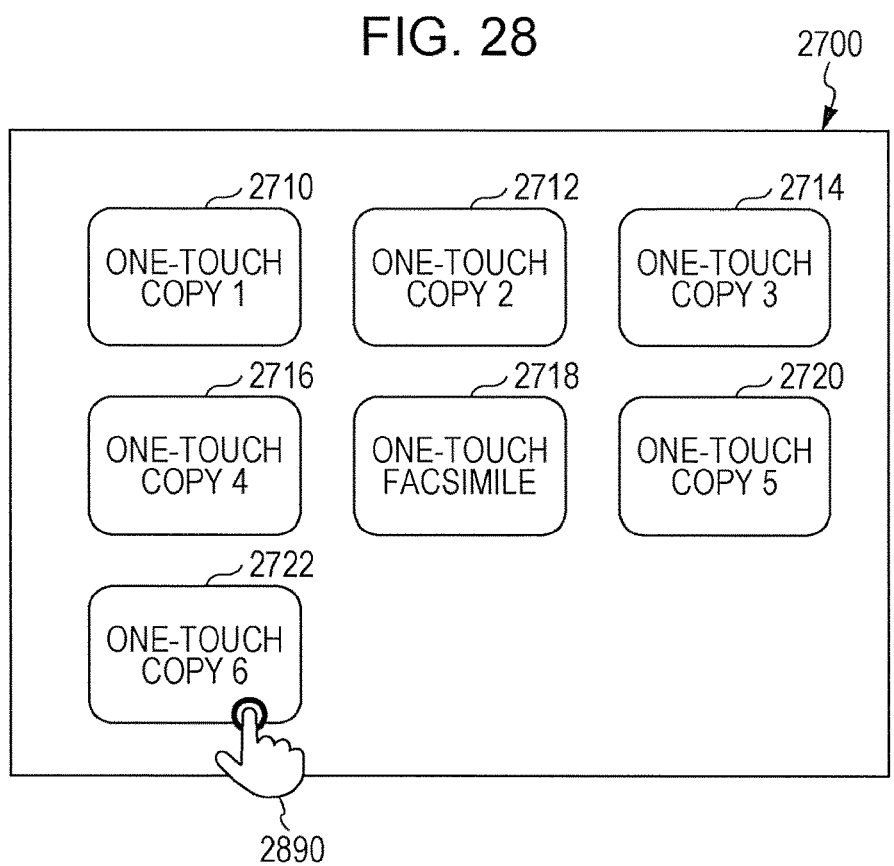
FIG. 28 illustrates the example process according to this exemplary embodiment.

In step S2604, a drag is detected in the coordinates of a first one-touch application. This operation will be described with reference to an example illustrated in FIG. 28. A press and hold of the one-touch copy 6 button 2722 with an operating finger 2890 is detected.

In step S2606, the processing up to step S2616 is repeated the number of times equal to the number of one-touch applications in the same function category as that of the first one-touch application, except for the first one-touch application.

In step S2608, the number of non-identical parameters (the number of differences) of one-touch applications in the same function category as that of the first one-touch application is detected. Processing equivalent to that of step S2308 in FIG. 23 described above may be performed.

In step S2610, a badge indicating the number of differences is displayed on an icon of each of the one-touch applications, other than the first one-touch application. Processing equivalent to that of step S2310 in FIG. 23 described above may be performed.

Figure 29:
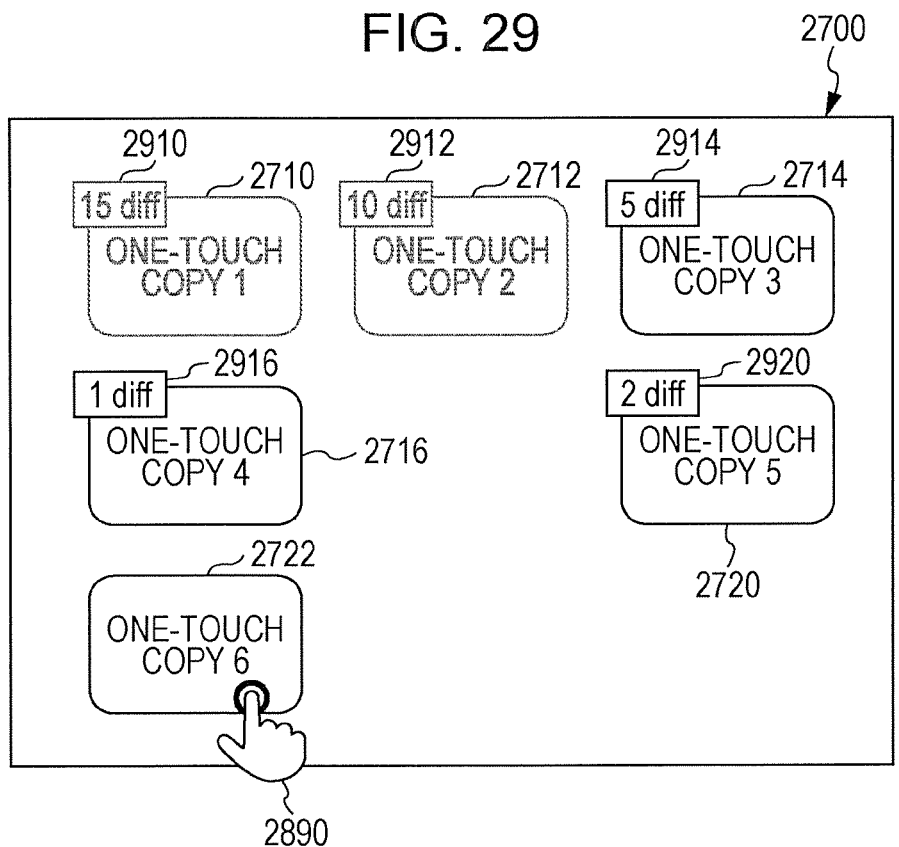
FIG. 29 illustrates the example process according to this exemplary embodiment.

In step S2612, a one-touch application having differences more than or equal to a threshold is displayed in a lighter shade. This operation will be described with reference to an example illustrated in FIG. 29. FIG. 29 illustrates an example process according to this exemplary embodiment. The one-touch copy 1 button 2710 is displayed with a badge 2910, the one-touch copy 2 button 2712 is displayed with a badge 2912, the one-touch copy 3 button 2714 is displayed with a badge 2914, the one-touch copy 4 button 2716 is displayed with a badge 2916, and the one-touch copy 5 button 2720 is displayed with a badge 2920. An icon having differences more than or equal to a threshold is displayed in a lighter shade. Specifically, the one-touch copy 1 button 2710 and the one-touch copy 2 button 2712 appear to be lighter. The one-touch facsimile button 2718, which is not in the same category as that of the one-touch copy 6 button 2722, is not displayed.

Figure 30:
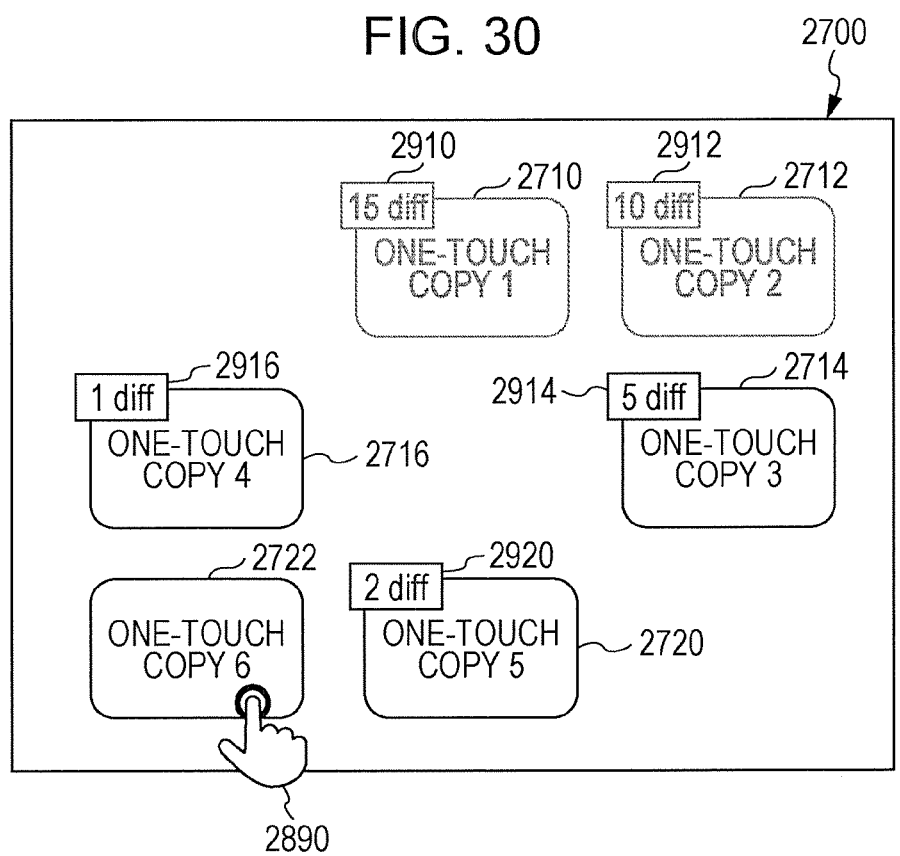
FIG. 30 illustrates the example process according to this exemplary embodiment.

In step S2614, a second application having a smaller number of differences is displayed nearer the first application. This operation will be described with reference to an example illustrated in FIG. 30. Specifically, the one-touch copy 4 button 2716, the one-touch copy 5 button 2720, and the one-touch copy 3 button 2714, which have a smaller number of differences, are moved near the one-touch copy 6 button 2722, whereas the one-touch copy 1 button 2710 and the one-touch copy 2 button 2712 are moved away from the one-touch copy 6 button 2722. Note that the one-touch copy 1 button 2710 and the one-touch copy 2 button 2712 are moved, with remaining in a lighter shade.

In step S2616, the processing from step S2606 is repeated until the processing of all the one-touch applications in the same function category as that of the first one-touch application, except for the first one-touch application, is completed.

In step S2618, a drop is detected in the coordinates of a second one-touch application. Specifically, an operation of moving the one-touch copy 6 button 2722 on top of an icon to be compared with the one-touch copy 6 button 2722 by the user is detected.

In step S2620, it is determined whether the first and second applications are in the same function category. If both applications are in the same function category, the process proceeds to step S2622. Otherwise, the process proceeds to step S2630.

In step S2622, it is determined whether there is any difference between stored set parameters. If there is a difference, the process proceeds to step S2624. Otherwise, the process proceeds to step S2630.

In step S2624, a difference check screen is displayed. The display is performed in a manner as in the example illustrated in FIG. 8 described above.

In step S2626, the title icons of the first and second applications are displayed in a title section side-by-side.

In step S2628, the names and values of the stored parameters for the first and second applications are displayed side-by-side.

In step S2630, the badge indicating the number of differences is deleted, and the one-touch applications are displayed in the original shade and are reordered. Then, the process returns to step S2602.

Figure 31:
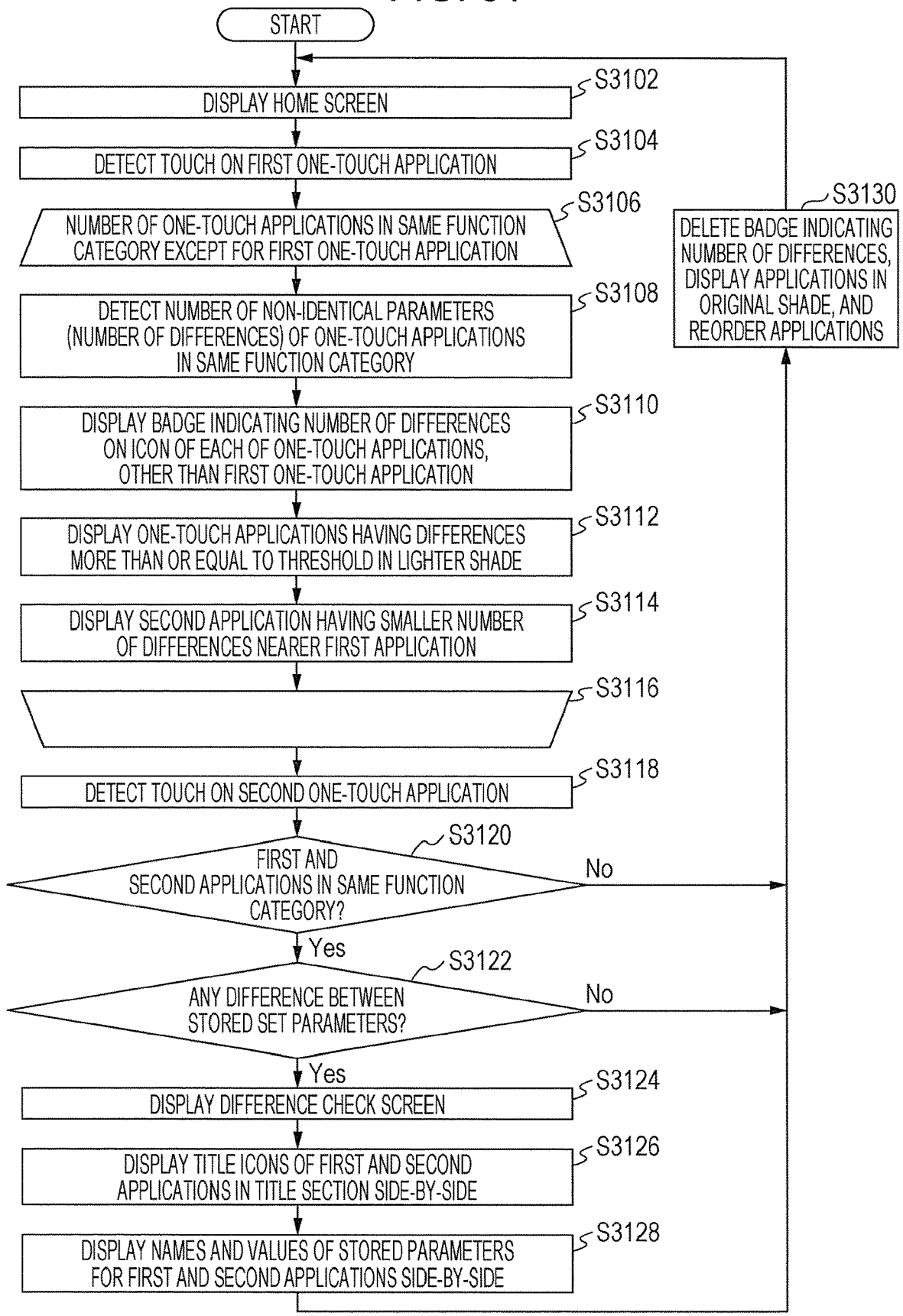
FIG. 31 is a flowchart illustrating an example process according to this exemplary embodiment.

FIG. 31 is a flowchart illustrating an example process according to this exemplary embodiment.

In the flowchart in the example illustrated in FIG. 31, steps S404 and S406 in the flowchart in the example illustrated in FIG. 4 are replaced with steps S3104 to S3118, and step S3130 is added. In the example illustrated in FIG. 26, two icons are selected by using a drag-and-drop operation, whereas in the example illustrated in FIG. 31, two icons are selected by using a multi-touch operation.

In step S3102, a home screen is displayed. The display is performed in a manner as in the example illustrated in FIG. 27 described above.

In step S3104, a touch on a first one-touch application is detected. The display is performed in a manner as in the example illustrated in FIG. 28 described above.

In step S3106, the processing up to step S3116 is repeated the number of times equal to the number of one-touch applications in the same function category as that of the first one-touch application, except for the first one-touch application.

In step S3108, the number of non-identical parameters (the number of differences) of one-touch applications in the same function category as that of the first one-touch application is detected. Processing equivalent to that of step S2308 in FIG. 23 described above may be performed.

In step S3110, a badge indicating the number of differences is displayed on an icon of each of the one-touch applications, other than the first one-touch application. Processing equivalent to that of step S2310 in FIG. 23 described above may be performed.

In step S3112, a one-touch application having differences more than or equal to a threshold is displayed in a lighter shade. The display is performed in a manner as in the example illustrated in FIG. 29 described above.

In step S3114, a second application having a smaller number of differences is displayed nearer the first application. The display is performed in a manner as in the example illustrated in FIG. 30 described above.

In step S3116, the processing from step S3106 is repeated until the processing of all the one-touch applications in the same function category as that of the first one-touch application, except for the first one-touch application, is completed.

In step S3118, a touch on a second one-touch application is detected. At this point in time, a selection of two icons has been detected, and a so-called multi-touch operation is detected.

In step S3120, it is determined whether the first and second applications are in the same function category. If both applications are in the same function category, the process proceeds to step S3122. Otherwise, the process proceeds to step S3130.

In step S3122, it is determined whether there is any difference between stored set parameters. If there is a difference, the process proceeds to step S3124. Otherwise, the process proceeds to step S2630.

In step S3124, a difference check screen is displayed. The display is performed in a manner as in the example illustrated in FIG. 8 described above.

In step S3126, the title icons of the first and second applications are displayed in a title section side-by-side.

In step S3128, the names and values of the stored parameters for the first and second applications are displayed side-by-side.

In step S3130, the badge indicating the number of differences is deleted, and the one-touch applications are displayed in the original shade and are reordered. Then, the process returns to step S3102.

Figure 32:
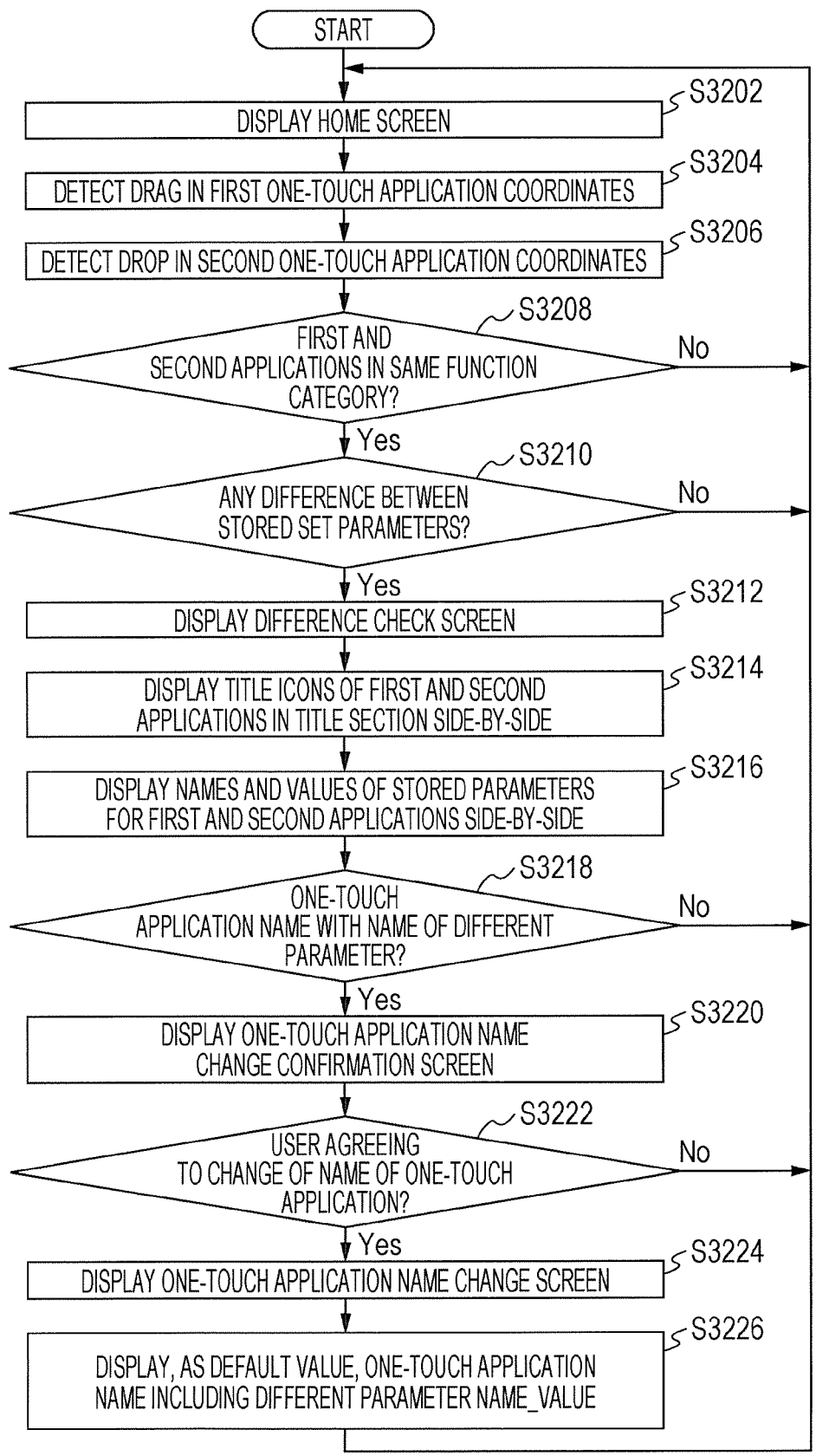
FIG. 32 is a flowchart illustrating an example process according to this exemplary embodiment.

FIG. 32 is a flowchart illustrating an example process according to this exemplary embodiment.

In the flowchart in the example illustrated in FIG. 32, steps S3218 to S3226 are added to the flowchart in the example illustrated in FIG. 4. Icons for which the set values are to be compared undergo a process for recommending changing the names of the icons. In the process, different names of the set values for both icons or different names including the respective set values for both icons are proposed as default names.

In step S3202, a home screen is displayed. The display is performed in a manner as in the example illustrated in FIG. 5 described above.

In step S3204, a drag is detected in the coordinates of a first one-touch application. The display is performed in a manner as in the example illustrated in FIG. 6 described above.

In step S3206, a drop is detected in the coordinates of a second one-touch application. The display is performed in a manner as in the example illustrated in FIG. 7 described above.

In step S3208, it is determined whether the first and second applications are in the same function category. If both applications are in the same function category, the process proceeds to step S3210. Otherwise, the process returns to step S3202.

In step S3210, it is determined whether there is any difference between stored set parameters. If there is a difference, the process proceeds to step S3212. Otherwise, the process returns to step S3202.

In step S3212, a difference check screen is displayed.

In step S3214, the title icons of the first and second applications are displayed in a title section side-by-side.

Figure 33A:
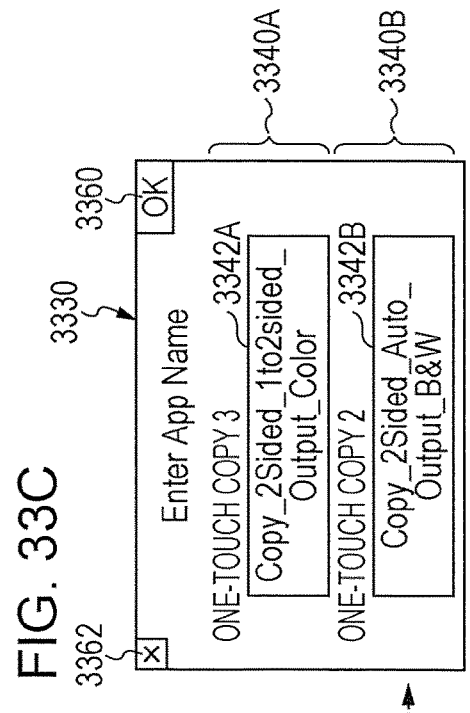
FIGS. 33A to 33C illustrate an example process according to this exemplary embodiment.

In step S3216, the names and values of the stored parameters for the first and second applications are displayed side-by-side. A screen is displayed in a manner as in an example illustrated in FIG. 33A. The displayed screen is equivalent to that illustrated in FIG. 8.

In step S3218, it is determined whether a one-touch application name with the name of a different parameter is present. If a one-touch application name with the name of a different parameter is present, the process proceeds to step S3220. Otherwise, the process returns to step S3202.

Figure 33B:
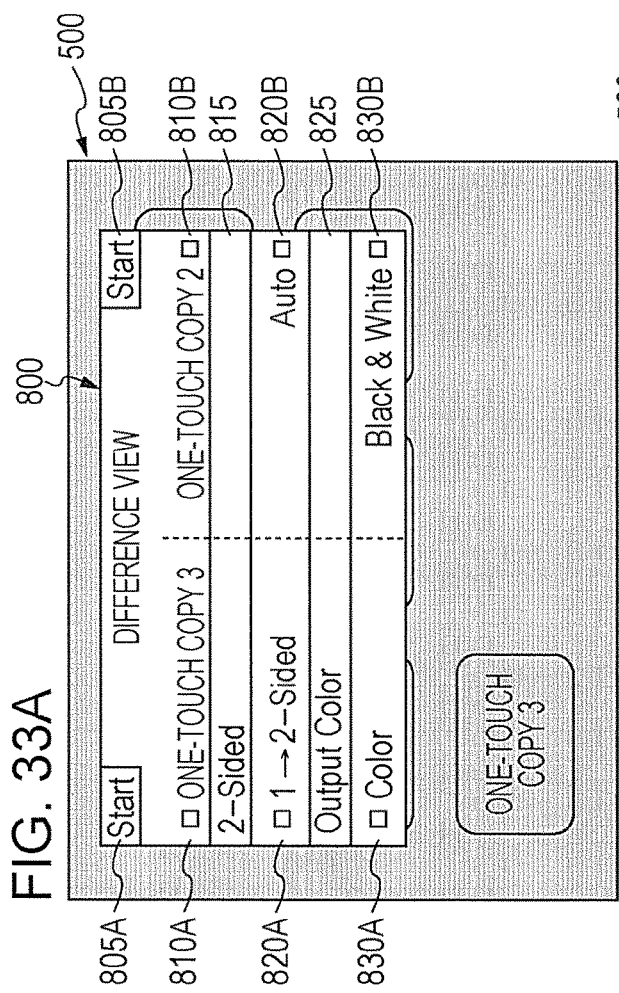

In step S3220, a one-touch application name change confirmation screen is displayed. This operation will be described with reference to an example illustrated in FIG. 33B. The screen 500 shows, for example, the message "One-touch application name changing is recommended to avoid making a mistake. Do you want to change?", and also displays a Change button 3310 and an Unchanged button 3320.

In step S3222, it is determined whether the user has agreed to change of the name of the one-touch application. If the user has agreed, the process proceeds to step S3224. Otherwise, the process returns to step S3202. When the Change button 3310 is selected in the example illustrated in FIG. 33B, the user agrees, and when the Unchanged button 3320 is selected in the example illustrated in FIG. 33B, the user does not agree.

Figure 33C:
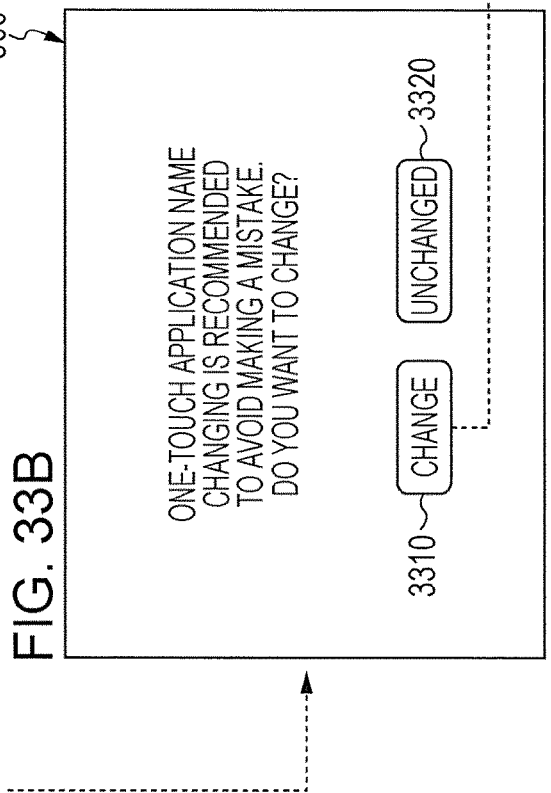

In step S3224, a one-touch application name change screen is displayed. This operation will be described with reference to an example illustrated in FIG. 33C. A screen 3330 shows an icon A area 3340A, an icon B area 3340B, an OK button 3360, and a close button 3362.

In step S3226, a one-touch application name including different parameter name_value is displayed as a default value. In the example illustrated in FIG. 33C, the icon A area 3340A shows an icon A name editing field 3342A, and the icon A name editing field 3342A shows, for example, "Copy_2Sided_1to2sided_Output_Color". The icon B area 3340B shows an icon B name editing field 3342B, and the icon B name editing field 3342B shows, for example, "Copy_2Sided_Auto_Output_B&W". Icon names of two icons are generated so as to include different settings and different set values between the two icons.

Figure 34:
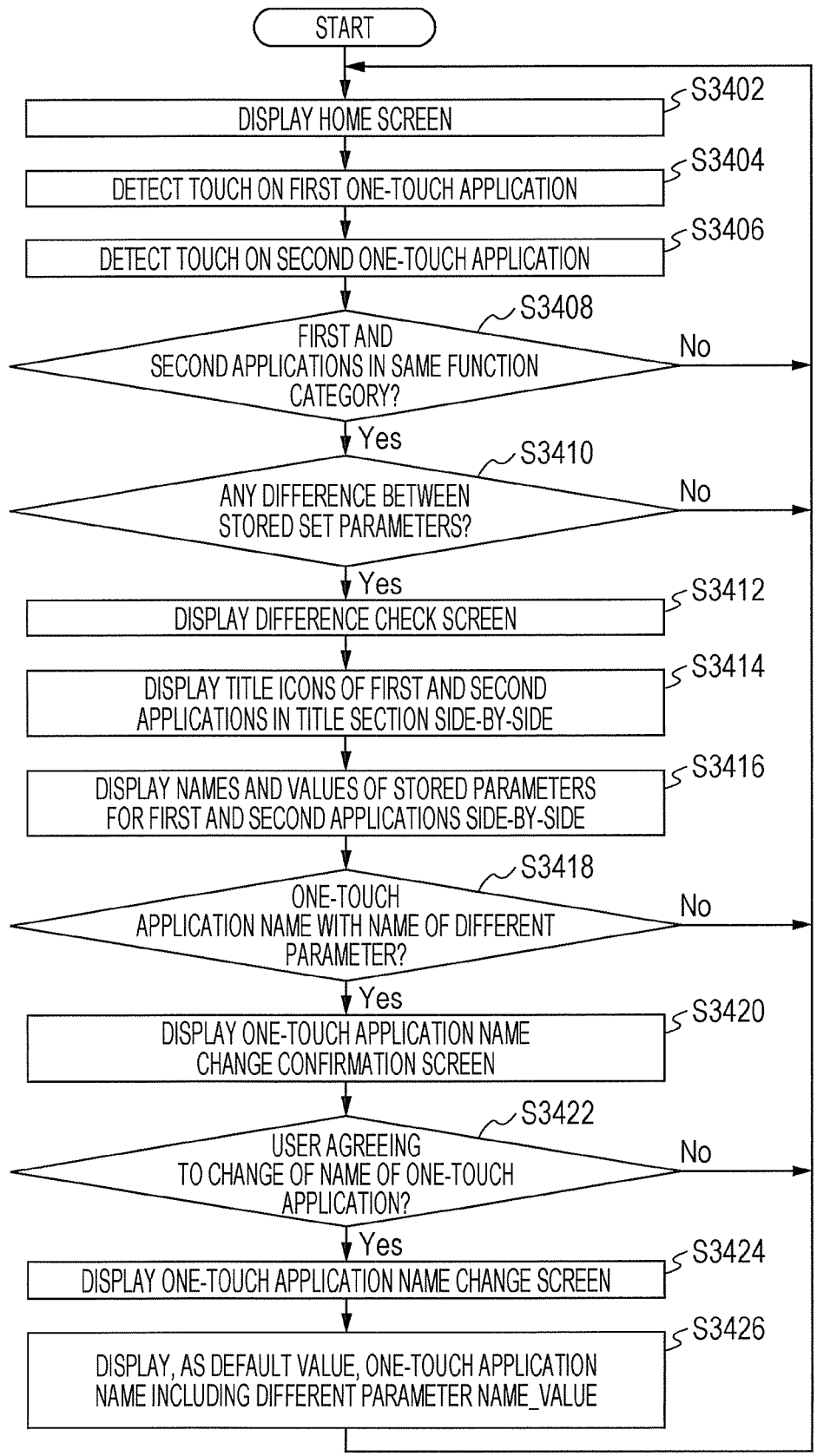
FIG. 34 is a flowchart illustrating an example process according to this exemplary embodiment.

FIG. 34 is a flowchart illustrating an example process according to this exemplary embodiment.

In the flowchart in the example illustrated in FIG. 34, steps S404 and S406 in the flowchart in the example illustrated in FIG. 4 are replaced with steps S3404 and S3406, respectively, and steps S3418 to S3426 are added. In the example illustrated in FIG. 32, two icons are selected by using a drag-and-drop operation, whereas in the example illustrated in FIG. 34, two icons are selected by using a multi-touch operation.

In step S3402, a home screen is displayed. The display is performed in a manner as in the example illustrated in FIG. 5 described above.

In step S3404, a touch on a first one-touch application is detected.

In step S3406, a touch on a second one-touch application is detected.

In step S3408, it is determined whether the first and second applications are in the same function category. If both applications are in the same function category, the process proceeds to step S3410. Otherwise, the process returns to step S3402.

In step S3410, it is determined whether there is any difference between stored set parameters. If there is a difference, the process proceeds to step S3412. Otherwise, the process returns to step S3402.

In step S3412, a difference check screen is displayed.

In step S3414, the title icons of the first and second applications are displayed in a title section side-by-side.

In step S3416, the names and values of the stored parameters for the first and second applications are displayed side-by-side. The display is performed in a manner as in the example illustrated in FIG. 33A described above.

In step S3418, it is determined whether a one-touch application name with the name of a different parameter is present. If a one-touch application name with the name of a different parameter is present, the process proceeds to step S3422. Otherwise, the process returns to step S3402.

In step S3420, a one-touch application name change confirmation screen is displayed. The display is performed in a manner as in the example illustrated in FIG. 33B described above.

In step S3422, it is determined whether the user has agreed to change of the name of the one-touch application. If the user has agreed, the process proceeds to step S3424. Otherwise, the process returns to step S3402.

In step S3424, a one-touch application name change confirmation screen is displayed. The display is performed in a manner as in the example illustrated in FIG. 33C described above.

In step S3426, a one-touch application name including different parameter name_value is displayed as a default value.

Figure 35:
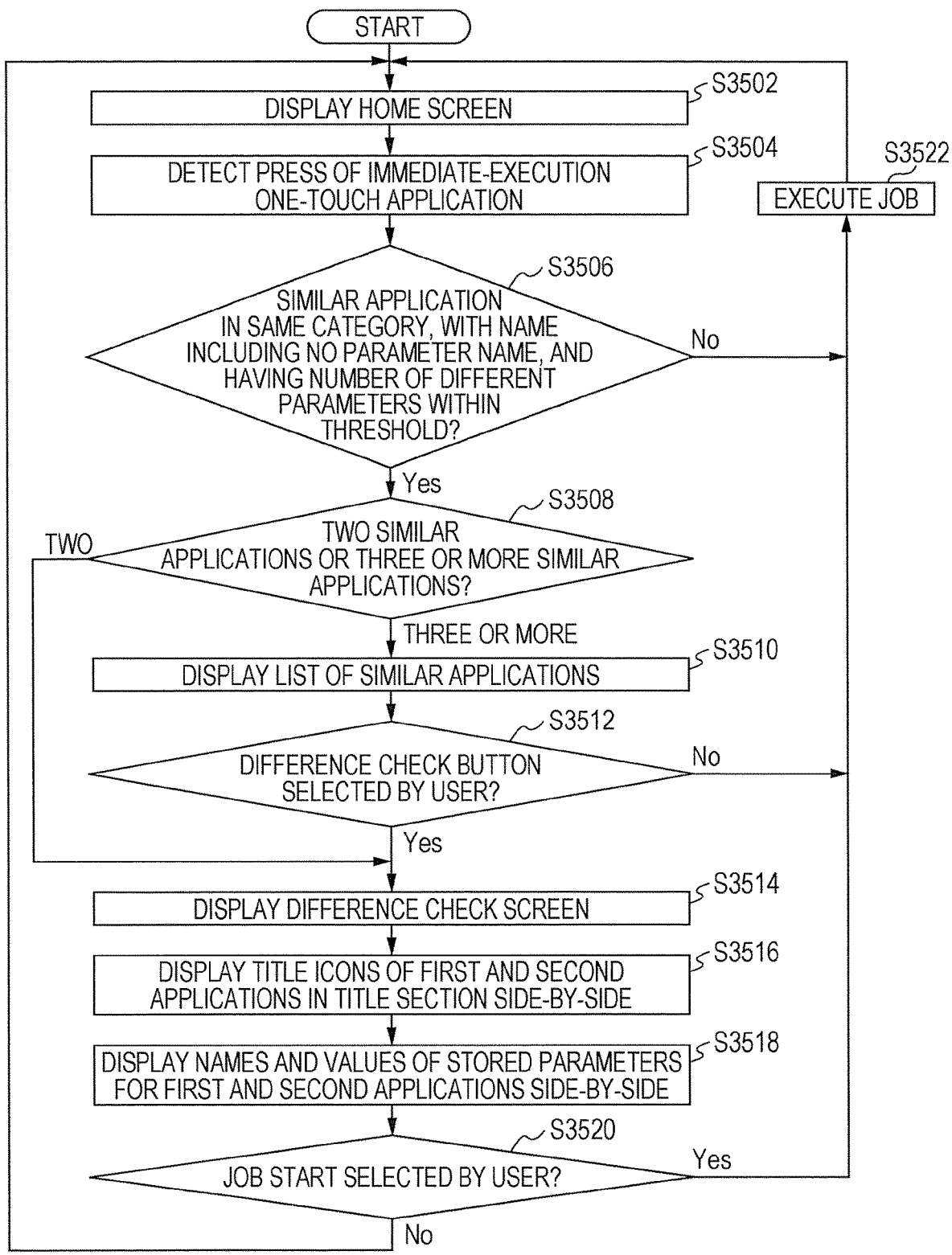
FIG. 35 is a flowchart illustrating an example process according to this exemplary embodiment.

FIG. 35 is a flowchart illustrating an example process according to this exemplary embodiment. When a selected icon indicates a one-touch application, the application indicated by the selected icon and an application having a similar set value are displayed in a comparable way to promote confirmation of an application to be executed.

In step S3502, a home screen is displayed. The display is performed in a manner as in the example illustrated in FIG. 5 described above.

Figure 36A:
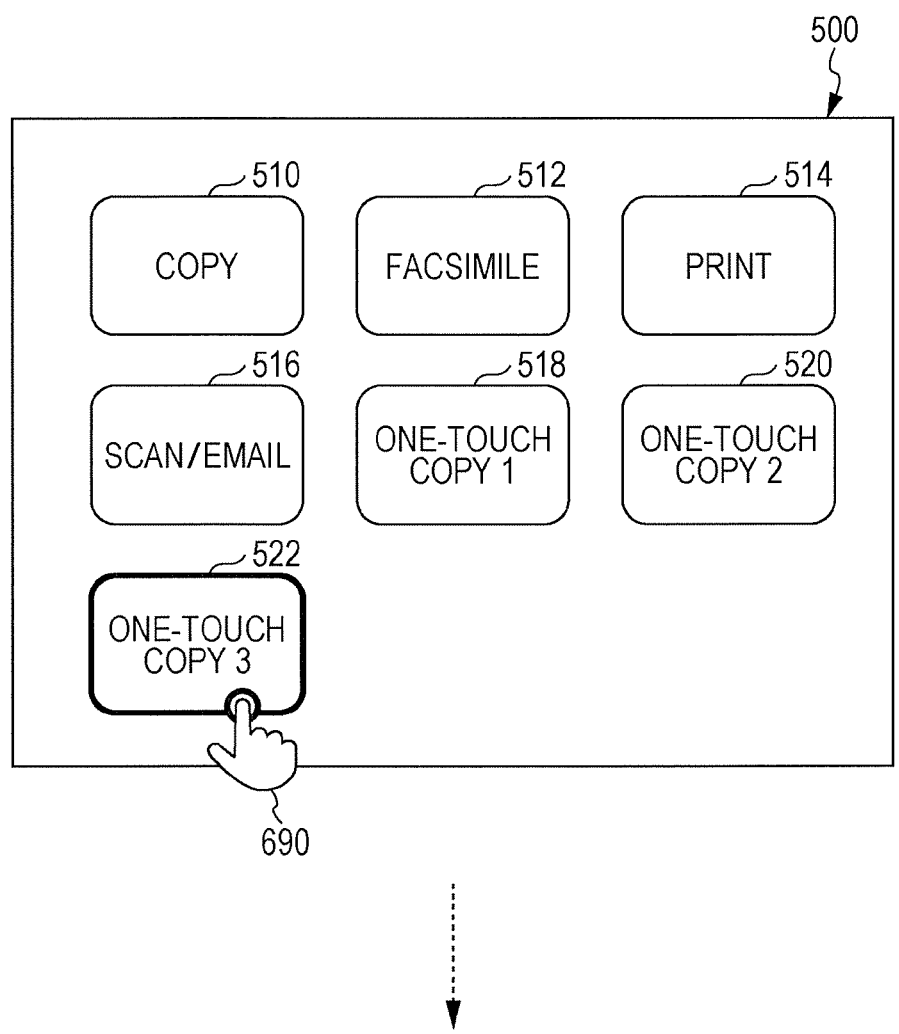

In step S3504, a press of an immediate-execution one-touch application is detected. This operation will be described with reference to an example illustrated in FIG. 36A. In the illustrated example, the one-touch copy 3 button 522 is selected using the operating finger 690 of the user, by way of example. The one-touch copy 3 button 522 indicates a one-touch application.

In step S3506, it is determined whether there is a similar application in the same category, with the name including no parameter name, and having a number of different parameters within a threshold. If such a similar application is present, the process proceeds to step S3508. Otherwise, the process proceeds to step S3522. In this determination, whether there is a plurality of icons that are indistinguishable to the user only by icon name is determined.

In step S3508, it is determined whether two similar applications or three or more similar applications are present. If three or more similar applications are present, the process proceeds to step S3510. If two similar applications are present, the process proceeds to step S3514. The number of similar applications is counted including the application indicated by the icon detected in step S3504. The term "similar application", as used here, refers to a one-touch application for which the number of set values different from values set for the application indicated by the icon detected in step S3504 is less than or equal to a predetermined number or is less than the predetermined number. In addition, as a condition of a similar application, one or more of the following conditions may be added: (1) the similar application is in the same category as that of the application indicated by the icon detected in step S3504; (2) the similar application for which the number of set values different from values set for the application indicated by the icon detected in step S3504 is within a threshold; and (3) the name of the similar application does not include a parameter name.

In step S3510, a list of similar applications is displayed. This operation will be described with reference to an example illustrated in FIG. 36C. In the illustrated example, three or more similar applications are present. A difference/application display area 3600 shows an icon A area 3662A, an icon B area 3662B, a "Check difference" button 3664A, a "Check difference" button 3664B, an "Execute one-touch copy 3" button 3670, a "Cancel" button 3672, and a "Do not show this screen again" button 3674. A multiple-application display area 3660 shows, for example, the message "Similar applications exist. Do you want to execute any application?". In the illustrated example, the one-touch copy 1 button 518 and the one-touch copy 2 button 520 are determined to be applications similar to the application indicated by the one-touch copy 3 button 522. When the "Check difference" button 3664B is selected by the user with an operating finger 3690, a transition to a comparison screen given in an example illustrated in FIG. 36B occurs. It is to be understood that when the "Check difference" button 3664A is selected, a transition to a screen for comparing the set values for the one-touch copy 3 button 522 with those for the one-touch copy 1 button 518 occurs in a way similar to that to the screen given in the example illustrated in FIG. 36B. When the "Execute one-touch copy 3" button 3670 is selected, the application indicated by the icon detected in step S3504 is executed. When the "Cancel" button 3672 is selected, the selection of the icon detected in step S3504 is canceled. When the "Do not show this screen again" button 3674 is selected, if the icon detected in step S3504 is selected thereafter, the application indicated by the selected icon is executed without showing the difference/application display area 3600.

In step S3512, it is determined whether a difference check button is selected by the user. If the difference check button is selected by the user, the process proceeds to step S3514. Otherwise, the process proceeds to step S3522.

In step S3514, a difference check screen is displayed. In step S3516, the title icons of the first and second applications are displayed in a title section side-by-side.

In step S3518, the names and values of the stored parameters for the first and second applications are displayed side-by-side. This operation will be described with reference to the example illustrated in FIG. 36B. The example illustrated in FIG. 36B provides an example display when two similar applications are present or when the "Check difference" button 3664B is selected in the example illustrated in FIG. 36C. The difference/application display area 3600 shows an icon A area 3610A, an icon B area 3610B, an item display area 3615, a set value display area 3620A, a set value display area 3620B, an "Execute one-touch copy 3" button 3650, an "Execute one-touch copy 2" button 3652, a "Cancel" button 3654, and a "Do not show this screen again" button 3656. The difference/application display area 3600 shows, for example, the message "Similar applications exist. Do you want to execute any application?". The item display area 3615 shows, for example, the item "2-Sided". The set value display area 3620A shows the setting of "1→2-Sided" as a set value of the item "2-Sided". The set value display area 3620B shows the setting of "Auto" as a set value of the item "2-Sided". When the "Execute one-touch copy 3" button 3650 is selected, the application of one-touch copy 3, which is indicated by the icon detected in step S3504, is executed. When the "Execute one-touch copy 2" button 3652 is selected, the application of one-touch copy 2, which is similar to the application indicated by the icon detected in step S3504, is executed. When the "Cancel" button 3654 is selected, the selection of the icon detected in step S3504 is canceled. When the "Do not show this screen again" button 3656 is selected, if the icon detected in step S3504 is selected thereafter, the application indicated by the selected icon is executed without showing the difference/application display area 3600.

In step S3520, it is determined whether a job start is selected by the user. If a job start is selected, the process proceeds to step S3522. Otherwise, the process returns to step S3502. For example, "a job start is selected" when the "Execute one-touch copy 3" button 3670 is selected in the example illustrated in FIG. 36C or when the "Execute one-touch copy 3" button 3650 or the "Execute one-touch copy 2" button 3652 is selected in the example illustrated in FIG. 36B.

In step S3522, a job for the application related with the target icon is executed. Then, the process returns to step S3502.

Figure 37A:
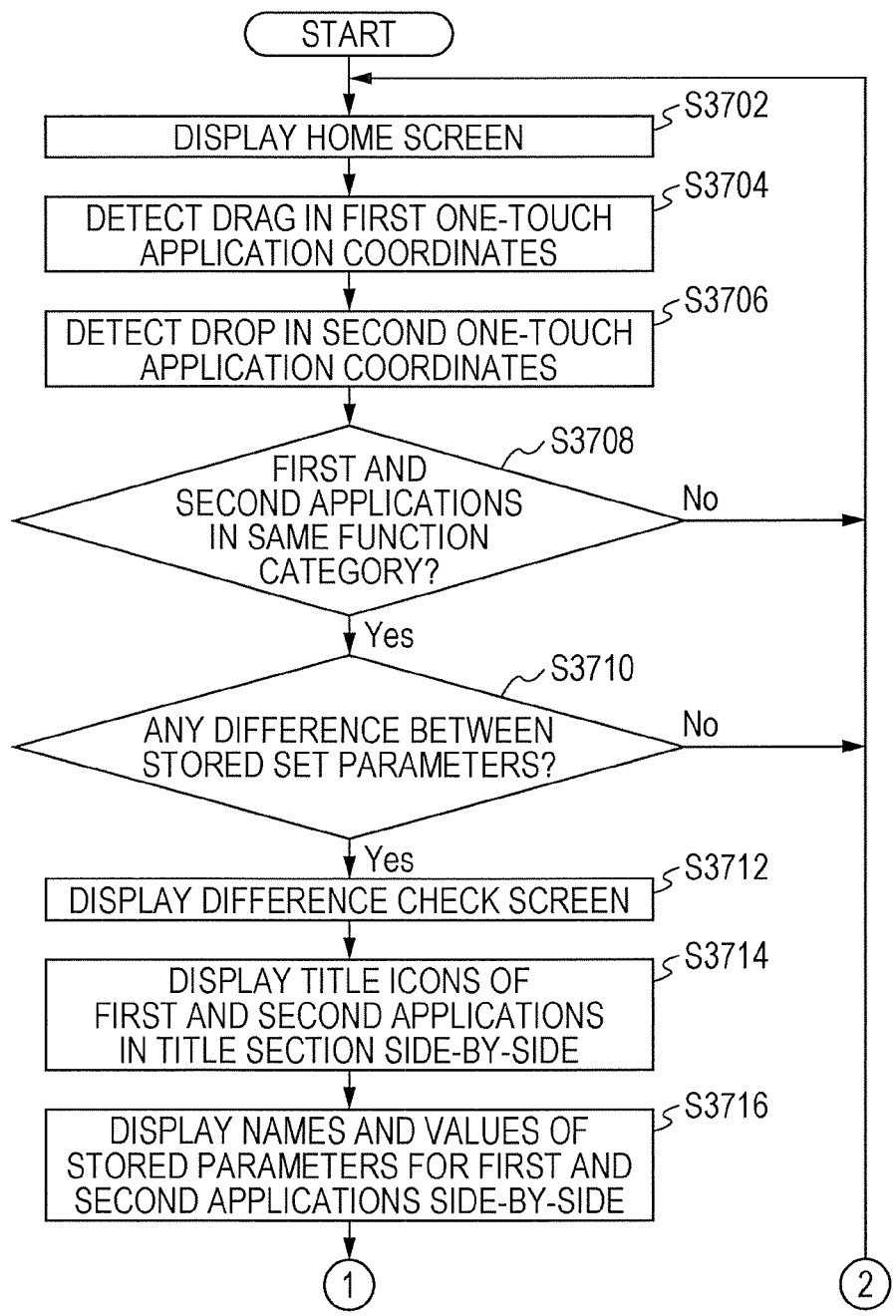
FIGS. 37A and 37B are a flowchart illustrating an example process according to this exemplary embodiment.
Figure 37B:
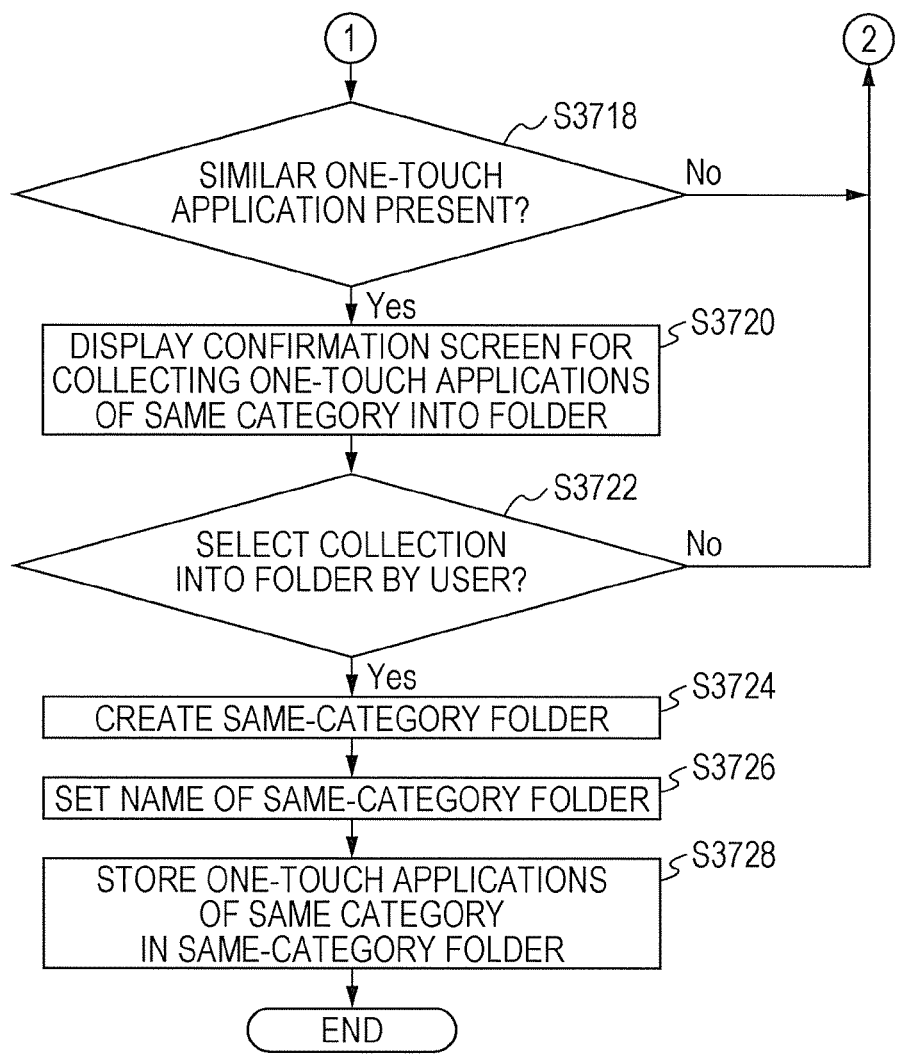

FIGS. 37A and 37B are a flowchart illustrating an example process according to this exemplary embodiment.

In the flowchart in the example illustrated in FIGS. 37A and 37B, steps S3718 to S3728 are added to the flowchart in the example illustrated in FIG. 4. A process for grouping icons for similar one-touch applications is performed.

In step S3702, a home screen is displayed. The display is performed in a manner as in the example illustrated in FIG. 5 described above.

In step S3704, a drag is detected in the coordinates of a first one-touch application. The display is performed in a manner as in the example illustrated in FIG. 6 described above.

In step S3706, a drop is detected in the coordinates of a second one-touch application. The display is performed in a manner as in the example illustrated in FIG. 7 described above.

In step S3708, it is determined whether the first and second applications are in the same function category. If both applications are in the same function category, the process proceeds to step S3710. Otherwise, the process returns to step S3702.

In step S3710, it is determined whether there is any difference between stored set parameters. If there is a difference, the process proceeds to step S3712. Otherwise, the process returns to step S3702.

In step S3712, a difference check screen is displayed. In step S3714, the title icons of the first and second applications are displayed in a title section side-by-side.

Figure 38A:
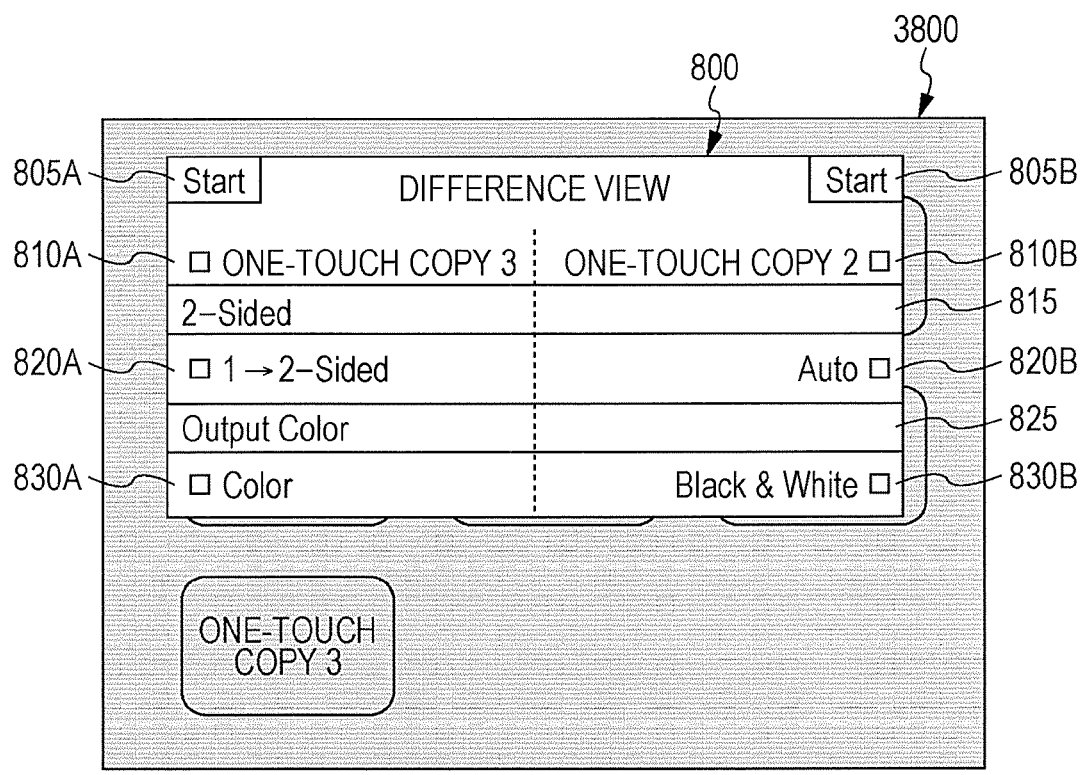
FIGS. 38A to 38C illustrate an example process according to this exemplary embodiment.

In step S3716, the names and values of the stored parameters for the first and second applications are displayed side-by-side. As in an example illustrated in FIG. 38A, a screen 3800 shows a difference view region 800. The screen 3800 is equivalent to the screen 500 in the example illustrated in FIG. 8.

In step S3718, it is determined whether a similar one-touch application is present. If a similar one-touch application is present, the process proceeds to step S3720. Otherwise, the process returns to step S3702.

Figure 38B:
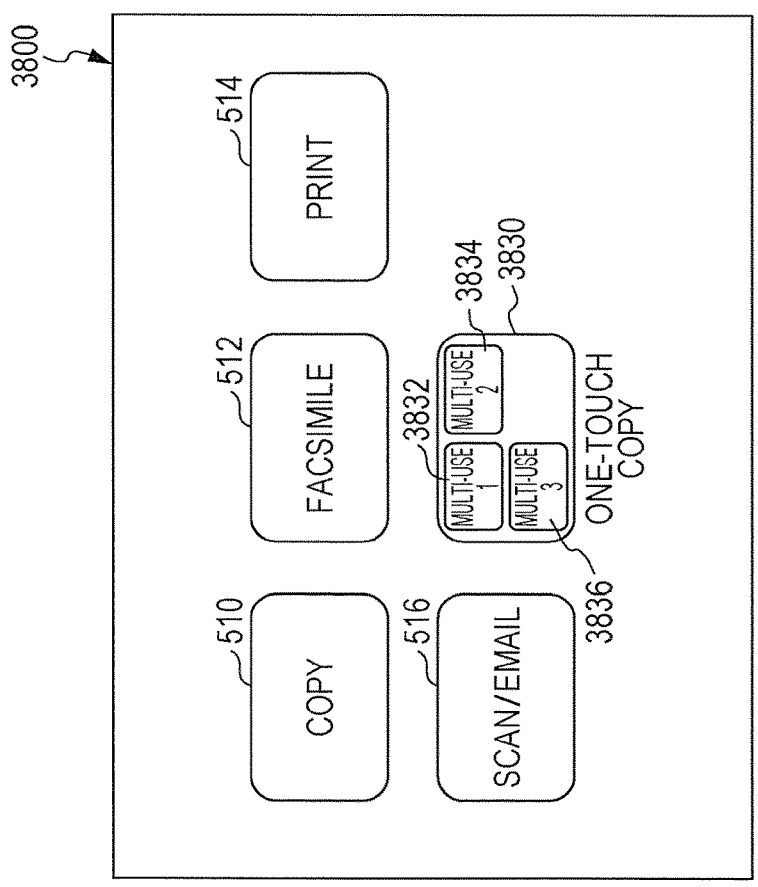

In step S3720, a confirmation screen for collecting one-touch applications of the same category into a folder is displayed. This operation will be described with reference to an example illustrated in FIG. 38B. The screen 3800 shows, for example, the message "Multiple similar applications exist. Do you want to collect the one-touch applications of the same category into a folder?", and also displays a "Yes" button 3810 and a "No" button 3820.

In step S3722, it is determined whether the user has selected collection of one-touch applications into a folder. If the collection of one-touch applications into a folder is selected, the process proceeds to step S3724. Otherwise, the process returns to step S3702. When the "Yes" button 3810 is selected in the example illustrated in FIG. 38B, "the collection of one-touch applications into a folder is selected", and when the "No" button 3820 is selected in the example illustrated in FIG. 38B, "the collection of one-touch applications into a folder is not selected".

In step S3724, a same-category folder is created.

In step S3726, the name of the same-category folder is set.

Figure 38C:
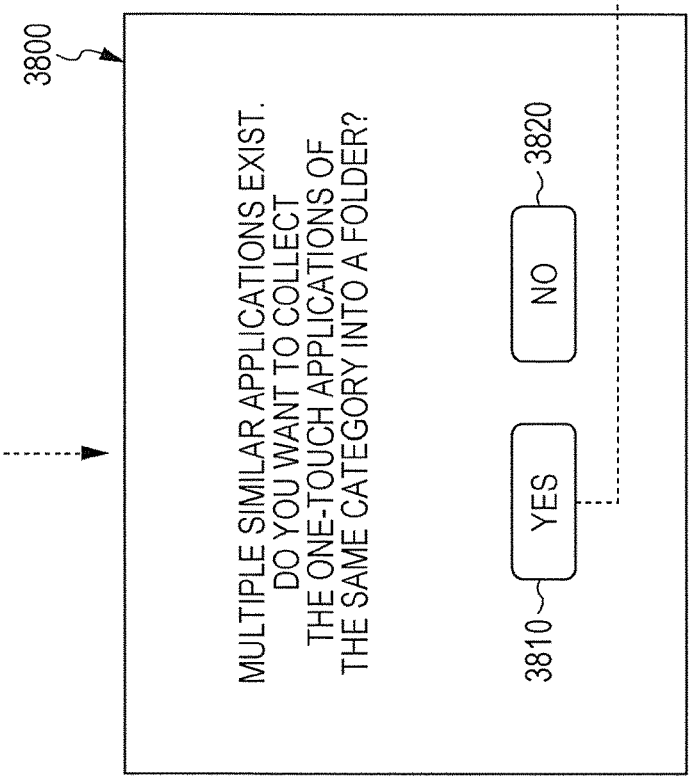

In step S3728, one-touch applications of the same category are stored in the same-category folder. This operation will be described with reference to an example illustrated in FIG. 38C. The screen 3800 shows a group button 3830 in addition to the copy button 510, the facsimile button 512, the print button 514, and the scan/email button 516. The group button 3830 appears to include a multi-use 1 button 3832, a multi-use 2 button 3834, and a multi-use 3 button 3836. That is, the multi-use 1 button 3832, the multi-use 2 button 3834, and the multi-use 3 button 3836 are grouped to generate the group button 3830.

The multi-use 1 button 3832 corresponds to the one-touch copy 1 button 518, the multi-use 2 button 3834 corresponds to the one-touch copy 2 button 520, and the multi-use 3 button 3836 corresponds to the one-touch copy 3 button 522.

Figure 39A:
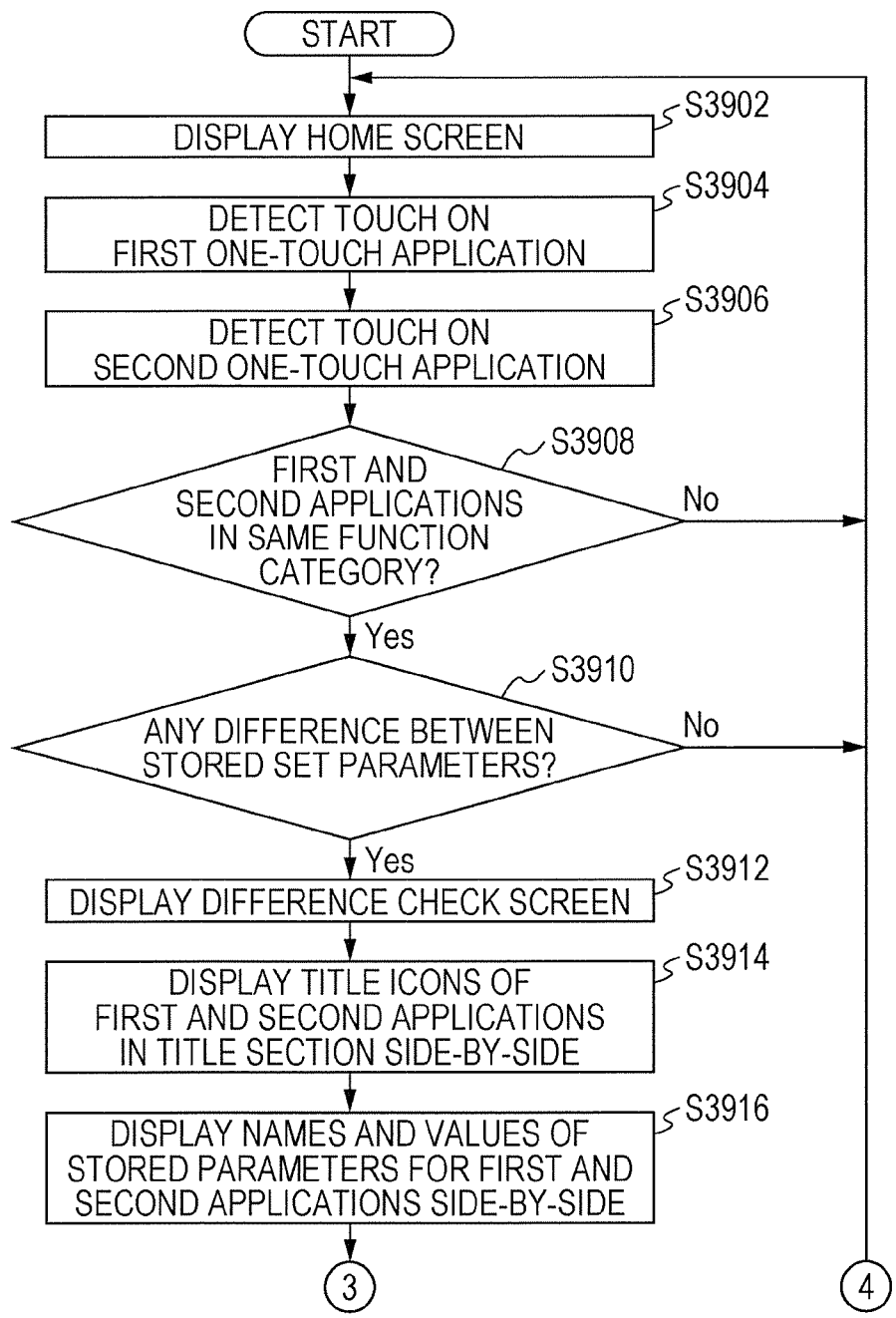
FIGS. 39A and 39B are a flowchart illustrating an example process according to this exemplary embodiment.
Figure 39B:
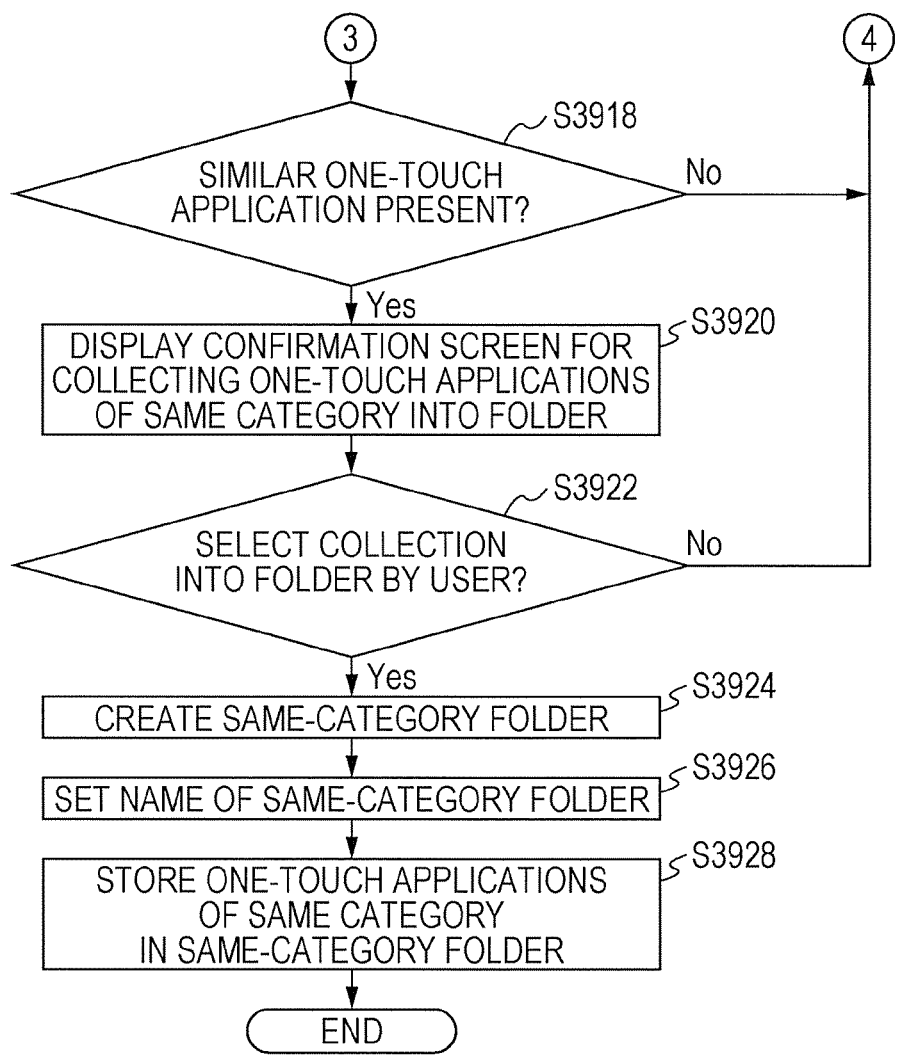

FIGS. 39A and 39B are a flowchart illustrating an example process according to this exemplary embodiment.

In the flowchart in the example illustrated in FIGS. 39A and 39B, steps S404 and S406 in the flowchart in the example illustrated in FIG. 4 are replaced with steps S3904 and S3906, respectively, and steps S3918 to S3928 are added. In the example illustrated in FIGS. 37A and 37B, two icons are selected by using a drag-and-drop operation, whereas in the example illustrated in FIGS. 39A and 39B, two icons are selected by using a multi-touch operation.

In step S3902, a home screen is displayed. The display is performed in a manner as in the example illustrated in FIG. 5 described above.

In step S3904, a touch on a first one-touch application is detected.

In step S3906, a touch on a second one-touch application is detected.

In step S3908, it is determined whether the first and second applications are in the same function category. If both applications are in the same function category, the process proceeds to step S3910. Otherwise, the process returns to step S3902.

In step S3910, it is determined whether there is any difference between stored set parameters. If there is a difference, the process proceeds to step S3912. Otherwise, the process returns to step S3902.

In step S3912, a difference check screen is displayed.

In step S3914, the title icons of the first and second applications are displayed in a title section side-by-side.

In step S3916, the names and values of the stored parameters for the first and second applications are displayed side-by-side. The display is performed in a manner as in the example illustrated in FIG. 38A described above.

In step S3918, it is determined whether a similar one-touch application is present. If a similar one-touch application is present, the process proceeds to step S3920. Otherwise, the process returns to step S3902.

In step S3920, a confirmation screen for collecting one-touch applications of the same category into a folder is displayed. The display is performed in a manner as in the example illustrated in FIG. 38B described above.

In step S3922, it is determined whether the user has selected collection of one-touch applications into a folder. If the collection of one-touch applications into a folder is selected, the process proceeds to step S3924. Otherwise, the process returns to step S3902.

In step S3924, a same-category folder is created.

In step S3926, the name of the same-category folder is set.

In step S3928, one-touch applications of the same category are stored in the same-category folder. The display is performed in a manner as in the example illustrated in FIG. 38C described above.

Figure 40:
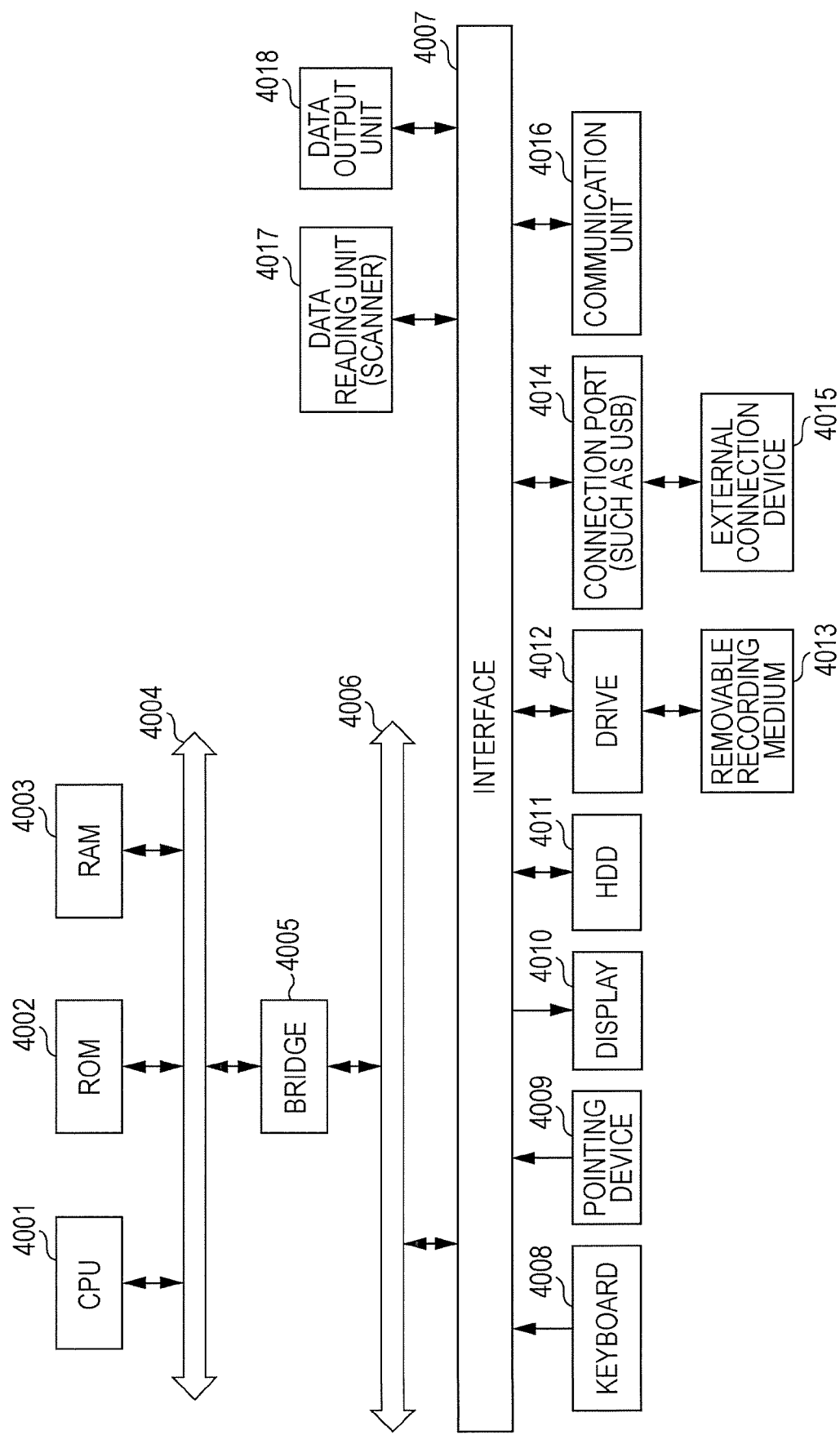
FIG. 40 is a block diagram illustrating an example hardware configuration of a computer according to this exemplary embodiment.

An example hardware configuration of the information processing apparatus 100 according to this exemplary embodiment will be described with reference to FIG. 40. The configuration illustrated in FIG. 40 is constituted by, for example, a personal computer, and includes a data reading unit 4017 such as a scanner, and a data output unit 4018 such as a printer.

A CPU 4001 is a controller that executes processing in accordance with a computer program describing the execution sequence of the various modules described in the exemplary embodiment described above, namely, modules such as the operation detection module 105, the graphic image management module 110, the name proposal module 115, the extraction module 120, the grouping module 125, the display module 130, and the graphic image placement module 135.

A read only memory (ROM) 4002 stores a program computation parameters, and other data used by the CPU 4001. A RAM 4003 stores a program to be executed by the CPU 4001 and parameters and the like that change as appropriate in accordance with the execution of the program. The CPU 4001, the ROM 4002, and the RAM 4003 are connected to one another via a host bus 4004 such as a CPU bus.

The host bus 4004 is connected to an external bus 4006, such as a Peripheral Component Interconnect/Interface (PCI) bus, via a bridge 4005.

A keyboard 4008 and a pointing device 4009 such as a mouse are devices that are operated by an operator. A display 4010, examples of which include a liquid crystal display device and a cathode ray tube (CRT), displays various information as text and/or image information. Alternatively, the display 4010 may be a touch screen or any other device having the functions of both the pointing device 4009 and the display 4010. In this case, to implement a keyboard function, physical connection such as for the keyboard 4008 may not necessarily be used. Instead of this, a keyboard may be drawn on a screen (e.g., a touch screen) by using software (such a keyboard is also referred to as a so-called software keyboard or on-screen keyboard) to implement a keyboard function.

A hard disk drive (HDD) 4011 contains a hard disk (which may be a flash memory or the like, instead of a hard disk). The HDD 4011 drives the hard disk to record or reproduce information and a program to be executed by the CPU 4001. The HDD 4011 also stores the icon management table 300, the data of results of the processing performed by the graphic image management module 110, and so on. The HDD 4011 further stores other information such as various data and various computer programs.

A drive 4012 reads data or a program recorded on a removable recording medium 4013 placed in the drive 4012, such as a magnetic disk, an optical disk, a magneto-optical disk, or a semiconductor memory, and provides the read data or program to the RAM 4003 connected thereto via an interface 4007, the external bus 4006, the bridge 4005, and the host bus 4004. The removable recording medium 4013 is also available as a data recording area.

A connection port 4014 is a port to which an external connection device 4015 is connected. The connection port 4014 includes a connection part supporting a standard such as the Universal Serial Bus (USB) or the Institute of Electrical and Electronics Engineers (IEEE) 1394. The connection port 4014 is connected to the CPU 4001 and so on via the interface 4007, the external bus 4006, the bridge 4005, the host bus 4004, and so on. A communication unit 4016 is connected to a communication line to execute a process for data communication with an external device. The data reading unit 4017, examples of which include a scanner, executes a process for reading a document. The data output unit 4018, examples of which include a printer, executes a process for outputting document data.

Part of the exemplary embodiment described above that is implemented by a computer program is implemented by causing a system having the hardware configuration illustrated in FIG. 40 to read a computer program, which is software, and the software and the hardware resources to cooperate with each other to realize the exemplary embodiment described above.

The hardware configuration of the information processing apparatus 100 illustrated in FIG. 40 is an example configuration. This exemplary embodiment is not limited to the configuration illustrated in FIG. 40 and may employ a configuration in which the modules described in this exemplary embodiment are executable. For example, some of the modules may be implemented as dedicated hardware (such as an application specific integrated circuit (ASIC)) or a reconfigurable integrated circuit, specific examples of which include a field-programmable gate array (FPGA). Some of the modules may be located in an external system and may be connected to the system illustrated in FIG. 40 via a communication line. In addition, a plurality of systems, each of which has the configuration illustrated in FIG. 40, may be connected to each other via a communication line and may operate in cooperation with each other. Additionally, the modules may be incorporated in, in particular, a personal computer or any other device such as a mobile information communication device (examples of the mobile information communication device include a mobile phone, a smartphone, a mobile device, and a wearable computer), an information home appliance, a robot, a copying machine, a facsimile machine, a scanner, a printer, a multifunction peripheral, or the like.

In a comparison process in the description of the exemplary embodiment described above, the expressions "greater than or equal to", "less than or equal to", "greater than (larger than)", and "smaller than (less than)" are for illustrative purposes only, and may be "greater than (larger than)", "smaller than (less than)", "greater than or equal to", and "less than or equal to", respectively, as long as consistency in the combination is maintained.

The program described above may be stored in a recording medium and the recording medium may be provided. Alternatively, the program may be provided via a communication means. In this case, for example, the program described above may be implemented as a "computer-readable recording medium storing the program".

The term "computer-readable recording medium storing the program" refers to a recording medium readable by a computer and having the program recorded thereon, which is used for installing and executing the program, distributing the program, or any other purpose.

Examples of the recording medium include digital versatile discs (DVDs), such as discs based on standards created by the DVD Forum, namely, DVD-R, DVD-RW, and DVD-RAM, and discs based on standards created by the DVD+RW Alliance, namely, DVD+R and DVD+RW, compact discs (CDs), such as a compact disc read-only memory (CD-ROM), a CD-Recordable (CD-R) disc, and a CD-Rewritable (CD-RW) disc, Blu-ray Disc (registered trademark), a magneto-optical (MO) disk, a flexible disk (FD), a magnetic tape, a hard disk, a ROM, an electrically erasable programmable read-only memory (EEPROM (registered trademark)), a flash memory, a RAM, and a secure digital (SD) memory card.

All or part of the program described above may be recorded on the recording medium described above for storage or distribution, for example. Alternatively, all or part of the program described above may be transmitted via communication by using a transmission medium such as a wired network, a wireless communication network, or a combination thereof that is used for a communication architecture such as a local area network (LAN), a metropolitan area network (MAN), a wide area network (WAN), the Internet, an intranet, or an extranet, or may be carried on carrier waves.

Additionally, the program described above may be part or all of another program, or may be recorded on a recording medium together with an individual program. Alternatively, the program may be divided into pieces which are recorded on a plurality of recording media. Moreover, the program may be recorded in any form that is restorable, such as in compressed or encrypted form.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a controller configured to:
   control a panel of a display to display different values set for a first graphic image and a second graphic image side-by-side in a pair in response to detecting a predetermined operation performed on the first graphic image and the second graphic image, each of the first graphic image and the second graphic image being a graphic image for which at least a value corresponding to the first graphic image and a value corresponding to the second graphic image are set by a user, wherein the value corresponding to the first graphic image and the value corresponding to the second graphic image set by the user are displayed side-by-side in a pair when the value corresponding to the first graphic image is different with the value corresponding to the second graphic image,
   control a panel of a second display to hide, in response to detecting selection of the first graphic image, a graphic image in a different category from a category of the first graphic image,
   control a panel of a third display to display, in response to detecting selection of the first graphic image, the number of values set for a graphic image other than the first graphic image, which are different from values set for the first graphic image, on top of or near the graphic image other than the first graphic image, wherein the panel of the third display is controlled to rearrange and display graphic images other than the first graphic image in ascending order from the smallest to the largest number of different set values,
   control a panel of a fourth display, in response to detecting selection of the first graphic image, wherein control the panel of the fourth display comprising:
      to display a graphic image for which the number of set values different from values set for the first graphic image is greater than a predetermined number and a graphic image for which the number of set values different from the values set for the first graphic image is less than or equal to the predetermined number in different styles, or
      to display a graphic image for which the number of set values different from values set for the first graphic image is greater than or equal to the predetermined number and a graphic image for which the number of set values different from the values set for the first graphic image is less than the predetermined number in different styles.

2. The information processing apparatus according to claim 1, wherein the predetermined operation is an operation of selecting the second graphic image while an operation is being performed on the first graphic image.

3. The information processing apparatus according to claim 2, wherein the predetermined operation is one of an operation of selecting the first graphic image and the second graphic image or an operation of moving the first graphic image to overlay the first graphic image on top of the second graphic image.

4. The information processing apparatus according to claim 1, wherein the controller is further configured to control the panel of the display to display a set value associated with the first graphic image and a set value associated with the second graphic image in a comparable way on condition that a function set for the first graphic image and a function set for the second graphic image are in the same category.

5. The information processing apparatus according to claim 4, wherein when the set value associated with the first graphic image and the set value associated with the second graphic image are identical, the controller configured to control the panel of the display not to display the set value associated with the first graphic image and the set value associated with the second graphic image.

6. The information processing apparatus according to claim 1,
   wherein the controller is configured to place, in response to detecting selection of the first graphic image, a graphic image in the same category as a category of the first graphic image near the first graphic image.

7. The information processing apparatus according to claim 6, wherein after the controller places the graphic image in the same category as the category of the first graphic image near the first graphic image, in response to canceling the selection of the first graphic image without performing an operation on the placed graphic image, an original state before the controller is configured to place the graphic image is restored.

8. The information processing apparatus according to claim 1,
   wherein the controller is further configured to control a panel of the second display to display, in response to detecting selection of the first graphic image, only a graphic image in the same category as a category of the first graphic image.

9. The information processing apparatus according to claim 8, wherein after the controller is configured to control the panel of the second display to display only the graphic image in the same category as the category of the first graphic image, in response to canceling the selection of the first graphic image without performing an operation on a graphic image other than the first graphic image including the displayed graphic image, an original state before the second display displays the graphic image is restored.

10. The information processing apparatus according to claim 1, wherein after the controller s configured to control the panel of the second display to hide the graphic image in the different category from the category of the first graphic image, in response to canceling the selection of the first graphic image without performing an operation on a graphic image other than the first graphic image, an original state before the second display hides the graphic image is restored.

11. The information processing apparatus according to claim 1,
wherein the controller is configured to propose a name of the first graphic image or the second graphic image.

12. The information processing apparatus according to claim 11, wherein the controller is configured to propose different names of values set for the first graphic image and the second graphic image or proposes different names including values set for the first graphic image and the second graphic image.

13. The information processing apparatus according to claim 1, wherein
the first graphic image is configured such that, when selected, a function associated with the first graphic image is executed immediately,
the controller is further configured to extract a graphic image for which the number of set values different from values set for the first graphic image is less than or equal to or less than a predetermined number, and
in response to selection of the first graphic image, the controller is configured to control the panel of the display to display a set value associated with the first graphic image and a set value associated with the graphic image extracted in a comparable way before the function associated with the first graphic image is executed.

14. The information processing apparatus according to claim 1,
wherein the controller is further configured to extract a graphic image associated with a function in the same category as a category of a function set for the first graphic image; and
group the first graphic image and the graphic image extracted into a single group.

15. A non-transitory computer readable medium storing a program causing a computer to:
control a panel of a display to display different values set for a first graphic image and a second graphic image side-by-side in a pair in response to detecting a predetermined operation performed on the first graphic image and the second graphic image, each of the first graphic image and the second graphic image being a graphic image for which at least a value corresponding to the first graphic image and a value corresponding to the second graphic image are set by a user, wherein the value corresponding to the first graphic image and the value corresponding to the second graphic image set by the user are displayed side-by-side in a pair when the value corresponding to the first graphic image is different with the value corresponding to the second graphic image,
control a panel of a second display to hide, in response to detecting selection of the first graphic image, a graphic image in a different category from a category of the first graphic image,
control a panel of a third display to display, in response to detecting selection of the first graphic image, the number of values set for a graphic image other than the first graphic image, which are different from values set for the first graphic image, on top of or near the graphic image other than the first graphic image, wherein the panel of the third display is controlled to rearrange and display graphic images other than the first graphic image in ascending order from the smallest to the largest number of different set values,
control a panel of a fourth display, in response to detecting selection of the first graphic image, wherein control the panel of the fourth display comprising:
to display a graphic image for which the number of set values different from values set for the first graphic image is greater than a predetermined number and a graphic image for which the number of set values different from the values set for the first graphic image is less than or equal to the predetermined number in different styles, or
to display a graphic image for which the number of set values different from values set for the first graphic image is greater than or equal to the predetermined number and a graphic image for which the number of set values different from the values set for the first graphic image is less than the predetermined number in different styles.

16. An information processing apparatus comprising:
controlling means for:
controlling a display means to display different values set for a first graphic image and a second graphic image side-by-side in a pair in response to detecting a predetermined operation performed on the first graphic image and the second graphic image, each of the first graphic image and the second graphic image being a graphic image for which at least a value corresponding to the first graphic image and a value corresponding to the second graphic image are set by a user, wherein the value corresponding to the first graphic image and the value corresponding to the second graphic image set by the user are displayed side-by-side in a pair when the value corresponding to the first graphic image is different with the value corresponding to the second graphic image,
controlling a second display means to hide, in response to detecting selection of the first graphic image, a graphic image in a different category from a category of the first graphic image,
controlling a third display means to display, in response to detecting selection of the first graphic image, the number of values set for a graphic image other than the first graphic image, which are different from values set for the first graphic image, on top of or near the graphic image other than the first graphic image, wherein the third display means is controlled to rearrange and display graphic images other than the first graphic image in ascending order from the smallest to the largest number of different set values,
controlling a fourth display means, in response to detecting selection of the first graphic image, wherein controlling the fourth display means comprising:
to display a graphic image for which the number of set values different from values set for the first graphic image is greater than a predetermined number and a graphic image for which the number of set values different from the values set for the first graphic image is less than or equal to the predetermined number in different styles, or to display a graphic image for which the number of set values different from values set for the first graphic image is greater than or equal to the predetermined number and a graphic image for which the number of set values different from the values set for the first graphic image is less than the predetermined number in different styles.

\* \* \* \* \*